(12) United States Patent
Orfano

(10) Patent No.: US 9,076,185 B2
(45) Date of Patent: *Jul. 7, 2015

(54) SYSTEM AND METHOD FOR MANAGING ELECTRONIC REAL ESTATE REGISTRY INFORMATION

(76) Inventor: Michael Dell Orfano, Amherst, NH (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/449,094

(22) Filed: Apr. 17, 2012

(65) Prior Publication Data

US 2012/0254045 A1 Oct. 4, 2012

Related U.S. Application Data

(63) Continuation-in-part of application No. 12/754,576, filed on Apr. 5, 2010, now Pat. No. 8,160,944, which is a continuation of application No. 11/291,358, filed on Nov. 30, 2005, now Pat. No. 7,693,765.

(60) Provisional application No. 60/632,473, filed on Nov. 30, 2004.

(51) Int. Cl.
*G06Q 40/00* (2012.01)
*G06Q 50/16* (2012.01)
*G06Q 30/06* (2012.01)
*G06Q 40/02* (2012.01)

(52) U.S. Cl.
CPC ........... *G06Q 50/16* (2013.01); *G06Q 40/00* (2013.01); *G06Q 30/06* (2013.01); *G06Q 40/02* (2013.01)

(58) Field of Classification Search
CPC ..... G06Q 40/00; G06Q 10/10; G06Q 200/02; G06Q 20/023; G06Q 20/10; G06Q 40/02; G06Q 40/08; G06Q 50/16; G06Q 20/04; G06Q 20/12; G06Q 20/123; G06Q 20/1235; G06Q 20/24; G06Q 20/389; G06Q 20/401; G06Q 30/02; G06Q 30/0301; G06Q 40/025; G06Q 99/00; G06Q 10/0635; G06Q 10/08; G06Q 10/087; G06Q 20/00; G06Q 20/06; G06Q 20/382; G06Q 20/40; G06Q 20/4016; G06Q 20/403; G06Q 30/00; G06Q 30/018; G06Q 30/06; G06Q 40/04; G06Q 50/163; G06Q 50/167; G06Q 50/265; G06F 17/30241; G06F 17/30997; G06F 12/1408; G06F 17/3087; G06F 21/10; G06F 21/31; G06F 21/32; G06F 21/33; G06F 21/6209; G06F 2211/007; G06F 2216/01; G06F 2221/0737; G06F 2221/0797; G06F 2221/2101; G06F 2221/2115; G06F 2221/2135; G06F 2221/2151; G06F 17/30067; G06F 17/30115; G06F 17/30286; G06F 17/30864; G06F 17/30867; G06F 3/067; G01C 21/20; G01C 21/26; G01C 15/00; G06T 1/0021; G06T 17/05; G06T 19/20; G06T 2219/2016; G06T 3/0006; G07F 9/026; G07F 7/08; G09B 29/106; H04L 2209/56; H04L 2209/60; H04L 2209/805; H04L 2463/101; H04L 2463/102; H04L 2463/103; H04L 29/06; H04L 29/12009; H04L 29/12047; H04L 61/15; H04L 63/08; H04L 63/20; H04L 67/02; H04L 67/04; H04L 67/16; H04L 67/18; H04L 67/42; H04L 69/329; H04L 9/3231; H04L 9/3263; H04L 29/12216; H04L 29/12311; H04L 29/12594; H04L 29/12783; H04L 61/2007; H04L 61/2084; H04L 61/303; H04L 61/35; H04N 21/2347; H04N 21/235; H04N 21/2362; H04N 21/2541; H04N 21/2543; H04N 21/2547; H04N 21/25875; H04N 21/4143; H04N 21/4345; H04N 21/435; H04N 21/4405; H04N 21/44204; H04N 21/443; H04N 21/4627; H04N 21/6581; H04N 21/8166; H04N 21/835; H04N 21/83555; H04N 21/8358; H04N 7/162; H04N 7/17309; G01S 19/04; H04M 15/47; H04M 2215/0148; H04W 80/04; H04W 8/26
USPC ........ 705/1, 26, 35, 39, 51, 64; 701/208, 522, 701/532; 702/14; 707/1, 200; 713/176; 235/585
See application file for complete search history.

(56) References Cited

U.S. PATENT DOCUMENTS

| | | | | |
|---|---|---|---|---|
| 4,742,457 | A | 5/1988 | Leon et al. | |
| 4,870,576 | A | 9/1989 | Tornetta | |
| 4,876,648 | A | 10/1989 | Lloyd | |
| 5,032,989 | A | 7/1991 | Tornetta | |
| 5,126,936 | A | 6/1992 | Champion | |
| 5,361,201 | A | 11/1994 | Jost et al. | |
| 5,414,621 | A | 5/1995 | Hough | |
| 5,500,793 | A | 3/1996 | Deming, Jr. et al. | |
| 5,584,025 | A | 12/1996 | Keithley et al. | |
| 5,636,117 | A | 6/1997 | Rothstein | |
| 5,644,726 | A | 7/1997 | Oppenheimer | |
| 5,664,115 | A | 9/1997 | Fraser | |
| 5,680,305 | A | 10/1997 | Apgar, IV | |
| 5,704,045 | A | 12/1997 | King et al. | |
| 5,742,775 | A | 4/1998 | King | |
| 5,754,850 | A | 5/1998 | Janssen | |
| 5,794,216 | A | 8/1998 | Brown | |
| 5,802,501 | A | 9/1998 | Graff | |
| 5,870,720 | A | 2/1999 | Chusid et al. | |
| 5,911,136 | A | 6/1999 | Atkins | |
| 5,930,775 | A | 7/1999 | McCauley et al. | |
| 5,950,175 | A | 9/1999 | Austin | |
| 5,966,700 | A | 10/1999 | Gould et al. | |
| 5,983,206 | A | 11/1999 | Oppenheimer | |
| 5,991,745 | A | 11/1999 | Kiritz | |
| 5,995,947 | A | 11/1999 | Fraser et al. | |
| 6,006,207 | A | 12/1999 | Mumick et al. | |
| 6,012,047 | A | 1/2000 | Mazonas et al. | |
| 6,023,687 | A | 2/2000 | Weatherly et al. | |
| 6,049,784 | A | 4/2000 | Weatherly et al. | |
| 6,058,369 | A | 5/2000 | Rothstein | |
| 6,058,377 | A | 5/2000 | Traub et al. | |
| 6,067,533 | A | 5/2000 | McCauley et al. | |
| 6,070,151 | A | 5/2000 | Frankel | |
| 6,115,694 | A | 9/2000 | Cheetham et al. | |
| 6,141,648 | A | 10/2000 | Bonissone et al. | |
| 6,148,293 | A | 11/2000 | King | |
| 6,167,384 | A | 12/2000 | Graff | |
| 6,178,406 | B1 | 1/2001 | Cheetham et al. | |
| 6,192,347 | B1 | 2/2001 | Graff | |
| 6,233,566 | B1 | 5/2001 | Levine et al. | |
| 6,253,191 | B1 | 6/2001 | Hoffman | |
| 6,269,347 | B1 | 7/2001 | Berger | |
| 6,292,788 | B1 | 9/2001 | Roberts et al. | |
| 6,321,202 | B1 | 11/2001 | Raveis, Jr. | |
| 6,321,212 | B1 | 11/2001 | Lange | |
| 6,323,885 | B1 | 11/2001 | Wiese | |
| 6,330,546 | B1 * | 12/2001 | Gopinathan et al. | 705/35 |
| 6,334,107 | B1 | 12/2001 | Gale et al. | |
| 6,345,262 | B1 | 2/2002 | Madden | |
| 6,385,541 | B1 | 5/2002 | Blumberg et al. | |
| 6,397,208 | B1 | 5/2002 | Lee | |
| 6,401,070 | B1 | 6/2002 | McManus et al. | |
| 6,438,526 | B1 | 8/2002 | Dykes et al. | |
| 6,484,176 | B1 | 11/2002 | Sealand et al. | |
| 6,519,618 | B1 | 2/2003 | Snyder | |
| 6,564,190 | B1 | 5/2003 | Dubner | |
| 6,594,633 | B1 | 7/2003 | Brierman | |
| 6,597,983 | B2 | 7/2003 | Hancock | |
| 6,609,109 | B1 | 8/2003 | Bradley et al. | |
| 6,609,118 | B1 | 8/2003 | Khedkar et al. | |
| 6,615,187 | B1 | 9/2003 | Ashenmil et al. | |
| 6,633,875 | B2 | 10/2003 | Brady | |
| 6,636,803 | B1 | 10/2003 | Hartz et al. | |
| 6,671,677 | B2 | 12/2003 | May | |
| 6,684,196 | B1 | 1/2004 | Mini et al. | |
| 6,711,554 | B1 | 3/2004 | Salzmann et al. | |
| 6,751,596 | B1 | 6/2004 | Hastings | |
| 6,760,707 | B2 | 7/2004 | Provost | |
| 6,760,709 | B2 | 7/2004 | Graff | |
| 6,766,322 | B1 | 7/2004 | Bell | |
| 6,768,788 | B1 | 7/2004 | Langseth et al. | |
| 6,847,943 | B2 | 1/2005 | Dubner | |
| 6,847,946 | B2 | 1/2005 | Blanz et al. | |
| 6,871,140 | B1 | 3/2005 | Florance et al. | |
| 6,876,955 | B1 | 4/2005 | Fleming et al. | |
| 6,883,002 | B2 | 4/2005 | Faudman | |
| 6,898,574 | B1 | 5/2005 | Regan | |
| 6,904,412 | B1 | 6/2005 | Broadbent et al. | |
| 6,904,414 | B2 | 6/2005 | Madden | |
| 6,973,432 | B1 | 12/2005 | Woodard et al. | |
| 6,983,313 | B1 | 1/2006 | Korkea-Aho | |
| 6,985,881 | B2 | 1/2006 | Johnson et al. | |
| 6,985,886 | B1 | 1/2006 | Broadbent et al. | |
| 6,985,902 | B2 | 1/2006 | Wise et al. | |
| 7,024,397 | B1 | 4/2006 | Donahue | |
| 7,028,005 | B2 | 4/2006 | Messner et al. | |
| 7,028,007 | B1 | 4/2006 | Abrahams et al. | |
| 7,054,741 | B2 * | 5/2006 | Harrison et al. | 701/522 |
| 7,076,448 | B1 | 7/2006 | Snyder | |
| 7,076,452 | B2 | 7/2006 | Florance et al. | |
| 7,082,411 | B2 | 7/2006 | Johnson et al. | |
| 7,085,735 | B1 | 8/2006 | Hall et al. | |
| 7,089,503 | B1 | 8/2006 | Bloomquist et al. | |
| 7,107,239 | B2 | 9/2006 | Graff | |
| 7,107,241 | B1 | 9/2006 | Pinto | |
| 7,110,970 | B2 | 9/2006 | Dingman et al. | |
| 7,130,810 | B2 | 10/2006 | Foster et al. | |
| 7,143,048 | B1 | 11/2006 | Ruben et al. | |
| 7,143,290 | B1 * | 11/2006 | Ginter et al. | 713/176 |
| 7,146,337 | B1 | 12/2006 | Ward et al. | |
| 7,152,037 | B2 | 12/2006 | Smith | |
| 7,152,044 | B2 | 12/2006 | Graff | |
| 7,158,956 | B1 | 1/2007 | Himmelstein | |
| 7,162,445 | B2 | 1/2007 | Johnson et al. | |
| 7,171,383 | B2 | 1/2007 | Johnson et al. | |
| 7,171,389 | B2 * | 1/2007 | Harrison | 705/51 |
| 7,174,301 | B2 | 2/2007 | Florance et al. | |
| 7,203,661 | B1 | 4/2007 | Graff | |
| 7,356,406 | B2 * | 4/2008 | Harrison et al. | 701/532 |
| 7,376,516 | B2 * | 5/2008 | Jones | 702/14 |
| 2001/0005829 | A1 | 6/2001 | Raveis, Jr. | |
| 2001/0034701 | A1 | 10/2001 | Fox et al. | |
| 2001/0037273 | A1 | 11/2001 | Greenlee, Jr. | |
| 2001/0039506 | A1 | 11/2001 | Robbins | |
| 2002/0004737 | A1 | 1/2002 | McVeigh | |
| 2002/0007336 | A1 | 1/2002 | Robbins | |
| 2002/0010674 | A1 | 1/2002 | Kent | |
| 2002/0013746 | A1 | 1/2002 | Bibas et al. | |
| 2002/0013750 | A1 | 1/2002 | Roberts et al. | |
| 2002/0019793 | A1 | 2/2002 | Frattalone | |
| 2002/0035494 | A1 | 3/2002 | Eckes et al. | |
| 2002/0038223 | A1 | 3/2002 | Niitsuma et al. | |
| 2002/0040335 | A1 | 4/2002 | De Veux et al. | |
| 2002/0046144 | A1 | 4/2002 | Graff | |
| 2002/0046159 | A1 | 4/2002 | Raveis, Jr. | |
| 2002/0049624 | A1 | 4/2002 | Raveis, Jr. | |
| 2002/0052835 | A1 | 5/2002 | Toscano | |
| 2002/0055905 | A1 | 5/2002 | Jannah et al. | |
| 2002/0062218 | A1 | 5/2002 | Pianin | |
| 2002/0062277 | A1 | 5/2002 | Foster et al. | |
| 2002/0065739 | A1 | 5/2002 | Florance et al. | |
| 2002/0082903 | A1 | 6/2002 | Yasuzawa | |
| 2002/0087389 | A1 | 7/2002 | Sklarz et al. | |
| 2002/0091623 | A1 | 7/2002 | Daniels | |
| 2002/0099592 | A1 | 7/2002 | Donahue | |
| 2002/0099650 | A1 | 7/2002 | Cole | |
| 2002/0103669 | A1 | 8/2002 | Sullivan, Sr. et al. | |
| 2002/0103744 | A1 | 8/2002 | Llewelyn | |
| 2002/0107764 | A1 | 8/2002 | McCoy | |
| 2002/0128961 | A1 | 9/2002 | Dwight | |
| 2002/0133371 | A1 | 9/2002 | Cole | |
| 2002/0133427 | A1 | 9/2002 | Shu | |
| 2002/0138419 | A1 | 9/2002 | Melone et al. | |
| 2002/0145617 | A1 | 10/2002 | Kennard et al. | |
| 2002/0169641 | A1 | 11/2002 | Wallace | |
| 2002/0174090 | A1 | 11/2002 | Dexter | |
| 2003/0023462 | A1 | 1/2003 | Heilizer | |
| 2003/0023610 | A1 | 1/2003 | Bove et al. | |
| 2003/0033176 | A1 | 2/2003 | Hancock | |
| 2003/0036922 | A1 | 2/2003 | Fries | |
| 2003/0036963 | A1 | 2/2003 | Jacobson et al. | |
| 2003/0041018 | A1 | 2/2003 | DeSane | |
| 2003/0041063 | A1 | 2/2003 | Brady | |

| Publication No. | Date | Inventor |
|---|---|---|
| 2003/0046129 A1 | 3/2003 | Brecher |
| 2003/0046205 A1 | 3/2003 | Brier et al. |
| 2003/0064705 A1 | 4/2003 | Desiderio |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110111 A1 | 6/2003 | Nalebuff et al. |
| 2003/0110122 A1 | 6/2003 | Nalebuff et al. |
| 2003/0126052 A1 | 7/2003 | Rademaekers et al. |
| 2003/0130865 A1 | 7/2003 | Fitzgibbon et al. |
| 2003/0130928 A1 | 7/2003 | Chozick |
| 2003/0144945 A1 | 7/2003 | Opsahl-Ong et al. |
| 2003/0149658 A1 | 8/2003 | Rossbach et al. |
| 2003/0177071 A1* | 9/2003 | Treese et al. .................. 705/26 |
| 2003/0187756 A1 | 10/2003 | Klivington et al. |
| 2003/0191723 A1 | 10/2003 | Foretich et al. |
| 2003/0200102 A1 | 10/2003 | Tao |
| 2003/0204406 A1 | 10/2003 | Reardon et al. |
| 2003/0216985 A1 | 11/2003 | Kurimoto |
| 2003/0220734 A1* | 11/2003 | Harrison et al. .............. 701/208 |
| 2003/0225656 A1 | 12/2003 | Aberman et al. |
| 2003/0225665 A1 | 12/2003 | Gross et al. |
| 2003/0229504 A1 | 12/2003 | Hollister |
| 2003/0229592 A1 | 12/2003 | Florance et al. |
| 2003/0233324 A1 | 12/2003 | Hammour et al. |
| 2003/0236733 A1 | 12/2003 | Weeks |
| 2004/0010451 A1 | 1/2004 | Romano et al. |
| 2004/0015389 A1 | 1/2004 | Dubner |
| 2004/0015434 A1 | 1/2004 | McCue et al. |
| 2004/0019517 A1 | 1/2004 | Sennott |
| 2004/0024605 A1 | 2/2004 | Morris |
| 2004/0030616 A1 | 2/2004 | Florance et al. |
| 2004/0030631 A1 | 2/2004 | Brown et al. |
| 2004/0039581 A1 | 2/2004 | Wheeler |
| 2004/0044696 A1* | 3/2004 | Frost ........................... 707/200 |
| 2004/0046798 A1 | 3/2004 | Alen |
| 2004/0049440 A1 | 3/2004 | Shinoda et al. |
| 2004/0049445 A1 | 3/2004 | Kishore |
| 2004/0049450 A1 | 3/2004 | Lussler |
| 2004/0054605 A1 | 3/2004 | Whittet |
| 2004/0059653 A1 | 3/2004 | Verkuylen et al. |
| 2004/0078323 A1 | 4/2004 | Johnston et al. |
| 2004/0088181 A1 | 5/2004 | Romanin et al. |
| 2004/0098269 A1 | 5/2004 | Wise et al. |
| 2004/0117376 A1 | 6/2004 | Lavin |
| 2004/0133493 A1 | 7/2004 | Ford et al. |
| 2004/0139049 A1* | 7/2004 | Hancock et al. .................. 707/1 |
| 2004/0143543 A1 | 7/2004 | Goldman |
| 2004/0153330 A1 | 8/2004 | Miller et al. |
| 2004/0158515 A1 | 8/2004 | Schoen |
| 2004/0167797 A1 | 8/2004 | Goncalves |
| 2004/0177033 A1 | 9/2004 | Weeks |
| 2004/0205020 A1 | 10/2004 | Halawi |
| 2004/0220820 A1 | 11/2004 | Brush et al. |
| 2004/0220823 A1 | 11/2004 | Brush et al. |
| 2004/0220885 A1 | 11/2004 | Salzmann et al. |
| 2004/0220906 A1 | 11/2004 | Gargi et al. |
| 2004/0254803 A1 | 12/2004 | Myr |
| 2004/0260578 A1 | 12/2004 | Jin |
| 2004/0267657 A1 | 12/2004 | Hecht |
| 2005/0004861 A1 | 1/2005 | Bancroft |
| 2005/0004927 A1 | 1/2005 | Singer |
| 2005/0010423 A1 | 1/2005 | Bagbey et al. |
| 2005/0010425 A1 | 1/2005 | Mazzochi |
| 2005/0010506 A1 | 1/2005 | Bachann |
| 2005/0015326 A1 | 1/2005 | Terry |
| 2005/0021453 A1 | 1/2005 | Lyman |
| 2005/0038726 A1 | 2/2005 | Salomon et al. |
| 2005/0049953 A1 | 3/2005 | Vu |
| 2005/0071376 A1 | 3/2005 | Modi |
| 2005/0075961 A1 | 4/2005 | McGill |
| 2005/0080700 A1 | 4/2005 | Bancroft |
| 2005/0080702 A1 | 4/2005 | Modi |
| 2005/0096926 A1 | 5/2005 | Eaton et al. |
| 2005/0096996 A1 | 5/2005 | Hall et al. |
| 2005/0102152 A1 | 5/2005 | Hodges |
| 2005/0108025 A1 | 5/2005 | Cagan |
| 2005/0108029 A1 | 5/2005 | Schneider |
| 2005/0108122 A1 | 5/2005 | Schneider |
| 2005/0108123 A1 | 5/2005 | Schneider |
| 2005/0108136 A1 | 5/2005 | Schneider |
| 2005/0114259 A1 | 5/2005 | Almeida |
| 2005/0119908 A1 | 6/2005 | Hippe et al. |
| 2005/0131713 A1 | 6/2005 | Hammond |
| 2005/0144119 A1 | 6/2005 | Monsen et al. |
| 2005/0144121 A1 | 6/2005 | Mayo |
| 2005/0154657 A1 | 7/2005 | Kim et al. |
| 2005/0160022 A1 | 7/2005 | Chesney |
| 2005/0160033 A1 | 7/2005 | VanKirk et al. |
| 2005/0177508 A1 | 8/2005 | Pembroke |
| 2005/0187778 A1 | 8/2005 | Mitchell |
| 2005/0198077 A1* | 9/2005 | Van Der Heijden .......... 707/200 |
| 2005/0199716 A1* | 9/2005 | Shafer et al. .................. 235/385 |
| 2005/0216292 A1 | 9/2005 | Ashlock |
| 2005/0216384 A1 | 9/2005 | Partlow et al. |
| 2005/0222947 A1* | 10/2005 | Regan .............................. 705/39 |
| 2005/0240419 A1 | 10/2005 | Collins et al. |
| 2005/0240426 A1 | 10/2005 | Smith |
| 2005/0240425 A1 | 10/2005 | Dieden et al. |
| 2005/0246267 A1 | 11/2005 | Nichols |
| 2005/0246270 A1 | 11/2005 | Goodman |
| 2005/0262016 A1 | 11/2005 | Hill et al. |
| 2005/0273346 A1* | 12/2005 | Frost ................................. 705/1 |
| 2005/0283503 A1* | 12/2005 | Hancock et al. .............. 707/200 |
| 2005/0288955 A1 | 12/2005 | Lewiss-Hachmeister |
| 2005/0289009 A1 | 12/2005 | Martirena et al. |
| 2005/0289014 A1 | 12/2005 | Butler |
| 2005/0289046 A1 | 12/2005 | Conyack |
| 2006/0009992 A1* | 1/2006 | Cwiek et al. ...................... 705/1 |
| 2006/0015357 A1 | 1/2006 | Cagan |
| 2006/0015364 A1 | 1/2006 | Hays |
| 2006/0020518 A1 | 1/2006 | Lovison et al. |
| 2006/0026136 A1 | 2/2006 | Drucker et al. |
| 2006/0069575 A1 | 3/2006 | Watkins |
| 2006/0074781 A1 | 4/2006 | Leano et al. |
| 2006/0074794 A1 | 4/2006 | Nespola, Jr. |
| 2006/0080204 A1 | 4/2006 | Schaub |
| 2006/0080228 A1 | 4/2006 | McGill et al. |
| 2006/0080229 A1 | 4/2006 | Masella et al. |
| 2006/0085207 A1 | 4/2006 | Carey et al. |
| 2006/0089842 A1 | 4/2006 | Medawar |
| 2006/0089847 A1 | 4/2006 | Dale-Thiebout |
| 2006/0100950 A1 | 5/2006 | Hecht |
| 2006/0106625 A1 | 5/2006 | Brown |
| 2006/0106632 A1 | 5/2006 | Stark |
| 2006/0111945 A1 | 5/2006 | Timsley et al. |
| 2006/0136231 A1 | 6/2006 | Thomas |
| 2006/0149663 A1 | 7/2006 | Nichols |
| 2006/0161482 A1 | 7/2006 | Jacobson et al. |
| 2006/0167776 A1* | 7/2006 | Conaty .............................. 705/35 |
| 2006/0178976 A1 | 8/2006 | Vu |
| 2006/0190272 A1 | 8/2006 | Chun |
| 2006/0190285 A1 | 8/2006 | Harris et al. |
| 2006/0200492 A1 | 9/2006 | Villena et al. |
| 2006/0218069 A1 | 9/2006 | Aberman et al. |
| 2006/0242054 A1 | 10/2006 | Himmelstein |
| 2006/0259419 A1 | 11/2006 | Monsen et al. |
| 2006/0282378 A1 | 12/2006 | Gotfried |
| 2006/0294002 A1 | 12/2006 | Brett |
| 2007/0061270 A1* | 3/2007 | Seto et al. ........................ 705/64 |
| 2007/0271463 A1* | 11/2007 | Ginter et al. .................. 713/176 |
| 2008/0167883 A1* | 7/2008 | Thavildar Khazaneh ......... 705/1 |

FOREIGN PATENT DOCUMENTS

| | | |
|---|---|---|
| AU | 2005237519 | 11/2005 |
| AU | 2005239401 | 11/2005 |
| CA | 2529644 | 12/2004 |
| CA | 2552803 | 8/2005 |
| CA | 2564440 | 11/2005 |
| CA | 2485927 | 5/2006 |
| EP | 1743292 | 1/2007 |
| GB | 2359390 | 8/2001 |
| GB | 2410100 | 7/2005 |
| JP | 10222488 | 8/1998 |
| JP | 11161699 | 6/1999 |
| JP | 2000353198 | 12/2000 |
| JP | 2001195487 | 7/2001 |

| | | |
|---|---|---|
| JP | 2001319046 | 11/2001 |
| JP | 2002007691 | 1/2002 |
| JP | 2002015130 | 1/2002 |
| JP | 2002024527 | 1/2002 |
| JP | 2002041782 | 2/2002 |
| JP | 2002056192 | 2/2002 |
| JP | 2002092338 | 3/2002 |
| JP | 2002117124 | 4/2002 |
| JP | 2002183430 | 6/2002 |
| JP | 2002183448 | 6/2002 |
| JP | 2002189791 | 7/2002 |
| JP | 2002215901 | 8/2002 |
| JP | 2002245239 | 8/2002 |
| JP | 2002312574 | 10/2002 |
| JP | 2002373250 | 12/2002 |
| JP | 2003058616 | 2/2003 |
| JP | 2003067566 | 3/2003 |
| JP | 2003067567 | 3/2003 |
| JP | 2003099615 | 4/2003 |
| JP | 2003108776 | 4/2003 |
| JP | 2003223559 | 8/2003 |
| JP | 2003308378 | 10/2003 |
| JP | 2003331036 | 11/2003 |
| JP | 2003345979 | 12/2003 |
| JP | 2004070762 | 3/2004 |
| JP | 2004070891 | 3/2004 |
| JP | 2004126747 | 4/2004 |
| JP | 2004265192 | 9/2004 |
| JP | 2005018801 | 1/2005 |
| JP | 2005084994 | 3/2005 |
| JP | 2005242676 | 9/2005 |
| JP | 2005276138 | 10/2005 |
| JP | 2006053897 | 2/2006 |
| JP | 2006134275 | 5/2006 |
| JP | 2006154936 | 6/2006 |
| KR | 20060108061 | 10/2006 |
| WO | 9506917 | 3/1995 |
| WO | 0075828 | 12/2000 |
| WO | 0152089 | 7/2001 |
| WO | 0152091 | 7/2001 |
| WO | 0152153 | 7/2001 |
| WO | 0159659 | 8/2001 |
| WO | 0207048 | 1/2002 |
| WO | 0212984 | 2/2002 |
| WO | 0223788 | 3/2002 |
| WO | 02102131 | 12/2002 |
| WO | 03017057 | 2/2003 |
| WO | 03048993 | 6/2003 |
| WO | 03090130 | 10/2003 |
| WO | 2004029761 | 4/2004 |
| WO | 2004040484 | 5/2004 |
| WO | 2004057442 | 7/2004 |
| WO | 2004072771 | 8/2004 |
| WO | 2008086179 | 10/2004 |
| WO | 2005003908 | 1/2005 |
| WO | 2005019995 | 3/2005 |
| WO | 2005104710 | 11/2005 |
| WO | 2006053247 | 5/2006 |

* cited by examiner

*Primary Examiner* — James Trammell
*Assistant Examiner* — Sanjeev Malhotra
(74) *Attorney, Agent, or Firm* — Loginov & Associates, PLLC; William A. Loginov

(57) ABSTRACT

Electronic real estate registration systems include property transaction and location characteristic databases communicating via computer networks providing information related to transactions associated with registered real property interests linked to publicly recorded documentation that protect legal interests of parties and counterparties engaged in the public exchange of real property rights. Real property rights can be held or owned by a managed asset-titling entity thus share a registered asset identifier providing locational coordinates identifying real property interest assignments and transactional documentation in association with asset underwriting, asset performance, and asset class rating systems. Electronic real estate registry database devices capture, process, store, retrieve, transmit, and report useful and timely information concerning registered property interests, responding in a manner typically associated with exchange traded securities, providing borrowers, creditors, investors and governing regulators ready access to fair and clear valuation, underwriting and transactional records delineated by time, apportionments, and pricing of real property interests.

8 Claims, 40 Drawing Sheets

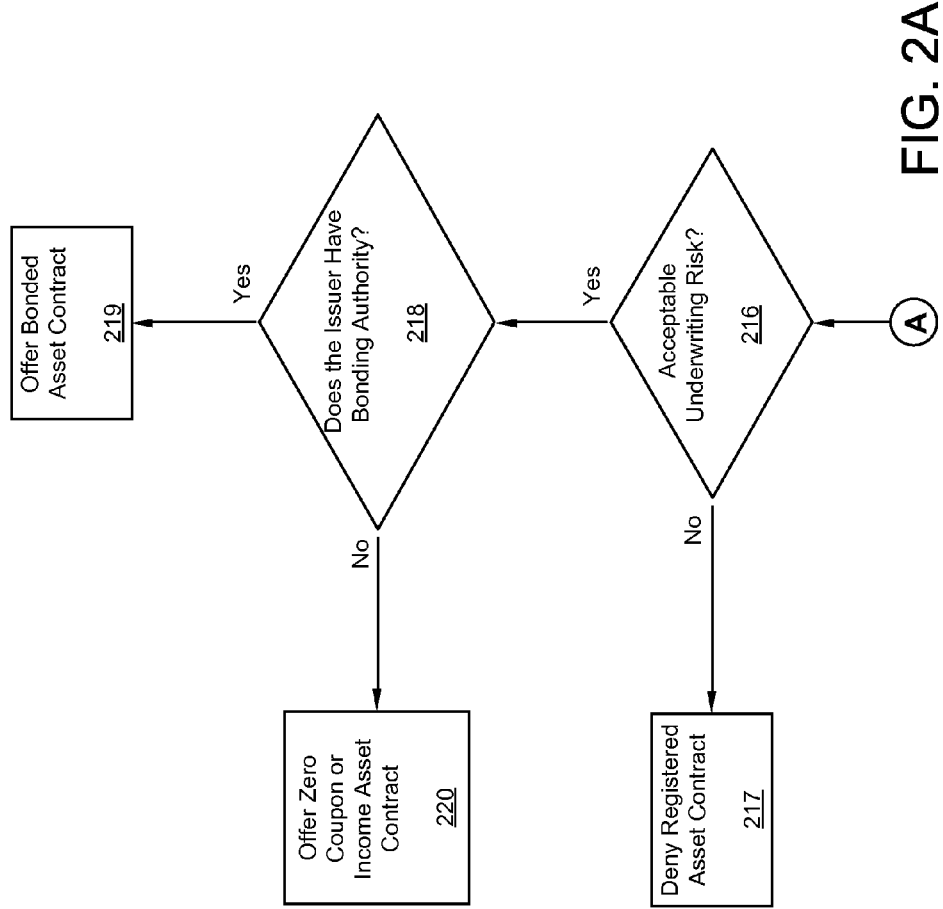

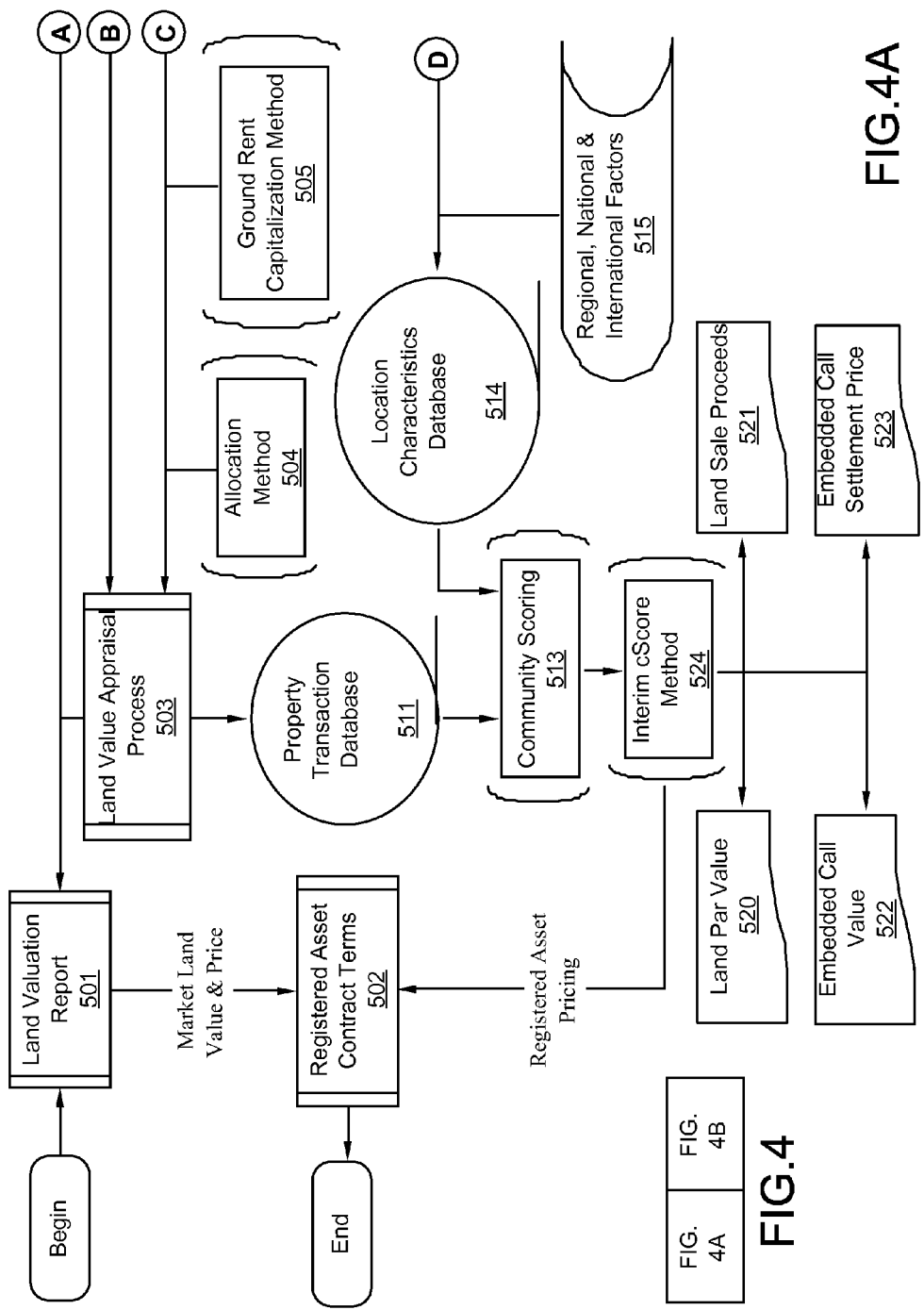

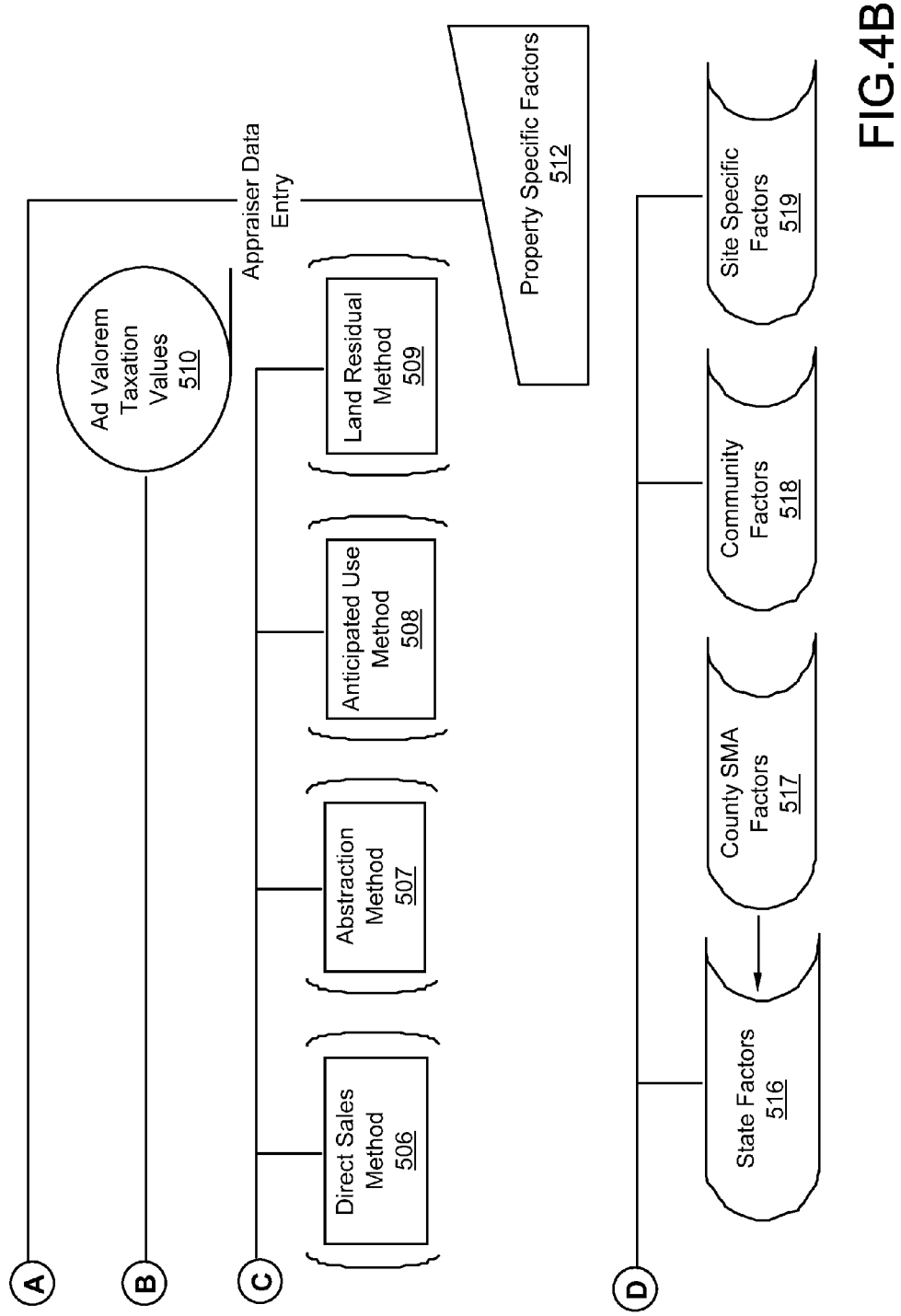

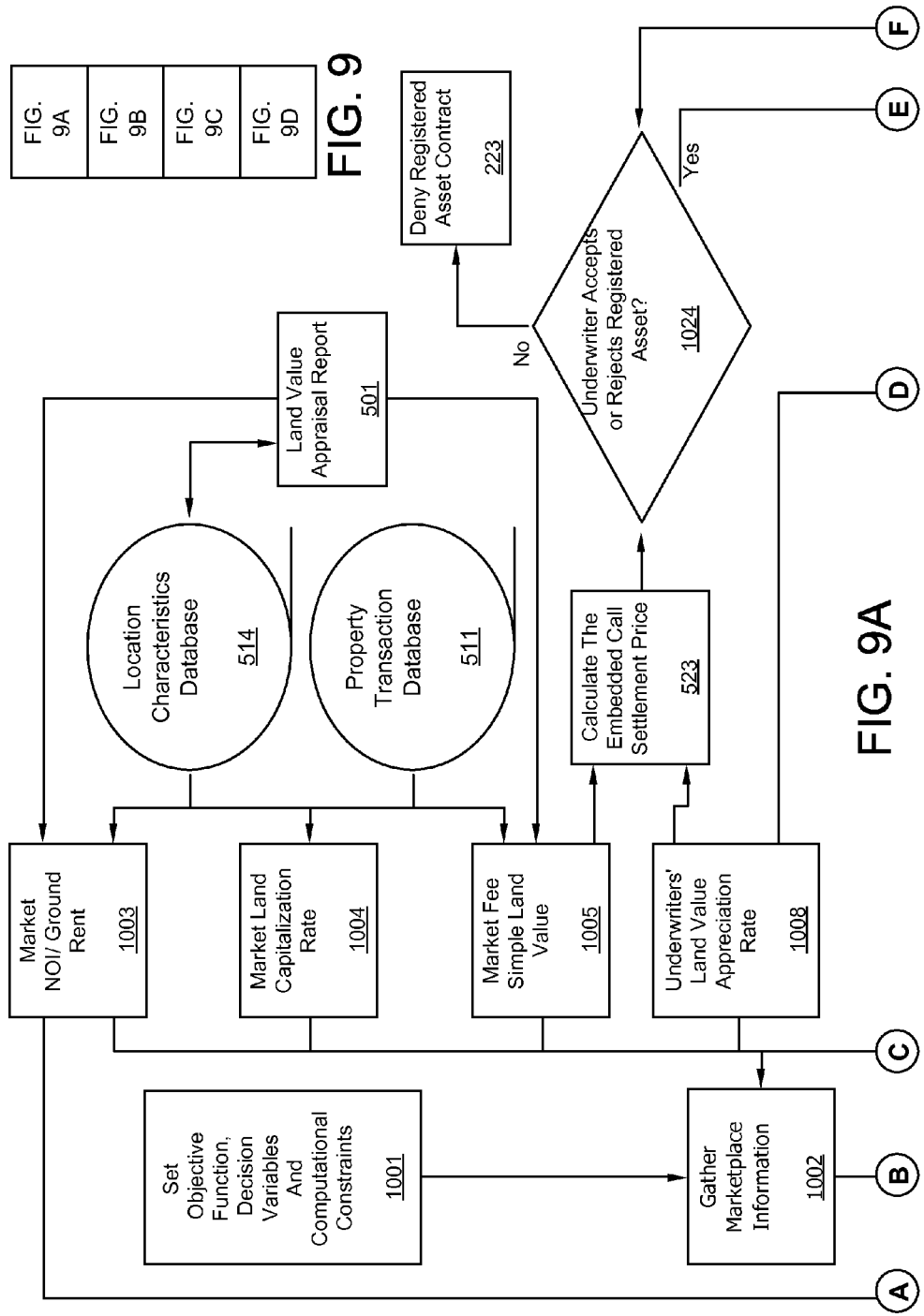

FIG. 10

| FIG. 10A | FIG. 10B |

FIG. 10A

- General Public (Accessing Party) 1108
- Registered Asset Originator (Accessing and Appending Party) 1103 — (A)
- Registered Asset Servicing Agent (Accessing and Appending Party) 1105 — (B), (C)
- Registered Asset Indentured Trustee (Accessing, Appending and Recording Party) 1104 — (D), (E)
- Electronic Land Title Trustee (Accessing, Appending and Recording Party) 1106
- Electronic Land Title Registry 1101
- Network — (F)
- Property Transaction Database 511
- Location Characteristics Database 514

*Private Property Ownership
Or Real Property Capital Market Investment Product*

SYSTEM AND METHOD FOR MANAGING ELECTRONIC REAL ESTATE REGISTRY INFORMATION

RELATED APPLICATIONS

This application is a continuation-in-part of U.S. patent application Ser. No. 12/754,576, filed Apr. 5, 2010, entitled SYSTEM AND METHOD FOR CREATING ELECTRONIC REAL ESTATE REGISTRATION, which is a continuation of U.S. patent application Ser. No. 11/291,358, filed Nov. 30, 2005, entitled SYSTEM AND METHOD FOR CREATING ELECTRONIC REAL ESTATE REGISTRATION, now U.S. Pat. No. 7,693,765, which claims the benefit of U.S. Provisional Application 60/632,473, filed Nov. 30, 2004, entitled SYSTEM AND METHOD FOR CREATING ELECTRONIC REAL ESTATE REGISTRATION, the entire disclosure of each of which applications is herein incorporated by reference.

FIELD OF THE INVENTION

The present invention relates to systems and methods for capturing, processing, storing, retrieving, transmitting, reporting and electronically displaying useful and timely real property information by way of an electronic real estate registry system in communication over a computer network with database storage devices that electronically stores useful and timely information available for research or for present or future executions and registrations of computerized public assignment(s), exchange(s), swap(s), or trade(s) of real property investment interests, such as, for example, in book entry form, in association with identified real property assets that can be held or owned by a managed asset-titling entity.

BACKGROUND ART

Land is the first economic hedge for mankind. Land is a place to begin and to try again. Land underlies all and land is limited. As Mark Twain once said, "Buy land. They've stopped making it."

Government-sponsored enterprises ("GSEs"), such as Fannie Mae (the Federal National Mortgage Association), Freddie Mac (the Federal Home Loan Mortgage Corporation), and the Federal Home Loan Bank System are shareholder-owned corporations, working under a Congressional corporate charter. Each of these entities serves as an instrument of national housing policy to facilitate homeownership. They provide funds for low-cost mortgages to low/moderate and middle-income Americans. Fannie Mae and Freddie Mac are the two largest entities of their kind and their rapidly increasing debt load currently represents nearly all of the investment grade mortgage bond market.

GSEs use derivative instruments to supplement their debt issuance, to hedge their interest rate and prepayment risks, and to manage their bond duration profile. They use interest rate swaps to transform short-term debt into synthetic long-term debt, and option-based derivatives to hedge prepayment and loan default activity on their assets. Fannie Mae reported that the aggregate notional amount of its derivatives portfolio as of year-end 2003 was $1.04 trillion, accounting for approximately 0.5% of the entire global derivatives market.

At that time, it was observed by public policy makers that given the extraordinary volume of derivatives on GSE balance sheets, any instability GSEs can experience is likely to cause systemic ripples among its counterparties. Extensive use of derivative instruments and the lack of transparency of the derivative instruments raised concerns among policy makers who were uneasy with the growth in debt load and counterparty hedge exposures. The numbers were large and the interest rate swaps, options, and caps counterparties used as financial tools might no longer be sufficient to offset the expanding debt the GSEs carry and the counterparties (e.g., the several largest United States banks) ensure.

Low interest rates and the continued rise of homeownership have led to rapid growth in the mortgage market along with an increasing rate at which mortgages were being refinanced. Since Fannie Mae and Freddie Mac dominate the mortgage markets, any instability among these entities would cause significant financial stress in the United States. Instability in similar international enterprises could cause stress in financial systems worldwide.

In 1994, the U.S. General Accounting Office expressed concern that failure by a large end-user of derivatives could lead to the following sequence of events: 1) one or more dealers who are counterparties could default, causing a chain reaction of counterparty defaults; 2) the opaqueness of derivatives and increased uncertainty associated with these derivatives could result in a general lack of liquidity or a freeze-up of over-the-counter derivatives markets, forcing dealers and others to use the more liquid exchange-traded futures and options markets, and leading to price breaks in those markets; and 3) price breaks in such markets could spread to markets for other assets and create widespread uncertainty about asset values, which could generate widespread panic which, in turn, could lead to widespread selling and plunging asset values throughout the world.

A systematic collapse of financial markets began in the second quarter of 2006 leading to a rescission one year later in 2007. Over this year, growing levels of unemployment transformed into a cascade of mortgage defaults, which triggered a sharp fall in US housing prices. The interest rate swaps, options, caps and credit default swaps that counterparties used as hedging instruments, long considered a reliable offset to low-quality mortgage underwriting and future mortgage delinquencies, proved ineffective. The scale of mortgage defaults soon overwhelmed the balance sheets that hedge-counterparties relied on to cover claims and this started a credit market meltdown, which created an atmosphere of fear, uncertainty and distrust. The credit markets froze.

The subsequent liquidity crisis depleted sources of short-term investment capital essential to the refinancing of highly leveraged long-term mortgage-backed securities. The credit freeze caused money center banks to fail and Freddie Mac and Fannie Mae to become insolvent. Their insolvency forced an explicit US government to guarantee billions of dollars in mortgage liabilities to halt world-wide economic panic. The resulting credit freeze-up, complicated by an acute failure of the over-the-counter derivatives markets, brought about such uncertainty and counterparty distrust that the US Taxpayer was forced to pump trillions of US dollars into US and foreign banks to prevent a world-wide depression. The US Government's credit rating was dropped to AA from AAA due to the unprecedented liabilities assumed by taxpayers. Many sovereign credit ratings have fallen as well due to excessive sovereign debt liabilities. The four key central banks put nearly $9 trillion on their combined balance sheets while interest rates remain stuck near record lows.

By 2012, after nearly six years of US bank failures and international credit market dysfunction and for the first time since the Great Depression of the 1930's, house prices fell nationally an average of about 33 percent, 40% in some areas of the country, from their 2006 peak. This amounts to a loss of about $7 trillion in household wealth, which is the same as driving down property values to mid-2003 levels. Home prices have fallen 4% over the most recent year and are expected to continue deflating for several more years. Financial markets struggle to recover as the US Treasury continues to subsidize its banks with near zero-cost money rates and mortgage bond purchases, which is driving the national debt to historic highs while lowering the purchasing power of the US dollar.

Housing was the trigger to the crisis, not necessarily the cause. Systemic economic problems originated from massive fraud within the financial system. Fraud on borrowers, on capital market investors and to a lesser extent fraud by borrowers froze mortgage markets. Prolonging this market's dysfunction, examination of industry foreclosure practices reveals a pattern of mishandled and improperly perfected legal interests in mortgage collateral were churned out by a hegemony of banks with a history of disputable statutory compliance practices. Millions of investors and homeowners now hold questionable legal interests in their homes or in bonds based on dubious property titles. This will dampen economic prospects of our nation, our communities, and the allure of housing as way to grow wealth, even with long-term, low-cost home financing to support mortgage borrowing.

Currently, an unprecedented number of households have lost, or are on the verge of losing, their homes. The extraordinary problems plaguing the housing market reflect in part the effect of weak demand due to high unemployment and heightened uncertainty. Three key forces originate from within the housing market itself: a persistent excess supply of vacant homes on the market, many of which stem from foreclosures; a marked and potentially long-term downshift in the supply of private capital and mortgage credit; and the costs that an unwieldy and inefficient foreclosure process imposes on lenders, homeowners, and communities. It is thus desirable to provide various systems and methods that address the disadvantages of the current system for transacting in real property and financing such transactions.

SUMMARY OF THE INVENTION

This invention overcomes disadvantages of prior art by providing illustrative embodiments that include systems and methods for electronic real estate registration, provide a mechanism for assigned interests in real property and related transactional documentation to be associated with a geospatial identification system, which further provides borrowers, creditors, investors, regulators and the general public ready access to fair and clear valuation, underwriting and transactional records delineated by time, relative to apportionments, pricing and conveyance of real property and related chattel property. The systems and methods according to illustrative embodiments are implemented using a system that includes one or more computer processors, such as computer servers that interact with databases. Such servers communicate over a communication network with one or more client processing devices (e.g. personal computers) that include various user interface devices and/or displays that allow users to interact with the servers. These servers can be in one location or distributed over a wider area, interconnected by an appropriate network, such as a dedicated communication channel or the well-known Internet. The servers and/or clients include operating software in the form of a non-transitory computer-readable medium of program instructions that perform various operations of the illustrative system and method. Clients can operate using a dedicated software application that provided the interactive functions required by the system and method, or can operate using conventional interface applications, such as a web browser that sends and receives content from web-enabled servers.

By reference to embodiments of prior inventions, systems and methods can form two fixed-income investment products out of any real property conveyance between a buyer and seller. By further reference to embodiments of prior inventions, systems and methods prepare these investment products for public trade between capital markets and the real estate markets. One such investment product is a mortgage title deed and note. The other investment product is a Registered Land Asset (the "land asset"). The land asset is a fee simple interest in a specific land title deed, unencumbered by debt but can be subject to recorded lease and land purchase rights. By terms, land assets lower investment risk, which can include re-pricing at preset call dates. Land assets are intermediate term, fixed-income capital assets. In practice, for example, residential land assets when originated in combination with an improvements mortgage title deed and note lower the amount of debt and the borrower's cost of money needed to finance a home or residential investment property. Invested land assets monies can be applied to reduce the size of mortgage loans borrowers must give and support. Furthermore, real property conveyances financed in combination with land assets reduce debt faster than traditional fixed-rate mortgage products. The land asset investor typically owns the land title deed subject to a land asset contract rather than a mortgage collateral interest. Land assets are not collateral for mortgage debt and land pricing is not impacted by credit scores. Land rents and repurchase rights are fixed to earn appropriate risk-based returns in balance with capital risk. Flexible contract options help borrowers eliminate end-of-term shock without forcing a loss of equity growth, land use and ownership rights, which can limit the opportunity for real estate market price breaks. Financing real property ownership rights by employing systems and methods to originate and register land asset interests creates land sale economics such that a homeowner gains economic advantage by maximizing the use of private capital and mortgage credit. Widespread use of land assets will help absorb excess inventory of vacant and available homes currently on the market.

In accordance with and by reference to embodiments of prior inventions, a method and system of electronic land title registration includes determining a geo-referenced address based on a global coordinate position of the land subject to a land title deed and causing a land title deed and registered asset identifier to be recorded in association with one another in an electronic database. The Registered Asset Identifier (the "RAI") represents the geo-referenced address of the land (described in the corresponding embodiment "Registered Asset Identifier (RAI)" of U.S. Pat. No. 7,693,765 and incorporated by reference herein). The geo-referenced address can include a Universal Transverse Mercator (the "UTM") grid code other similar geospatial coordinate or reference such as a set of alphanumeric characters that permanently correlate to a geo-referenced address. The method can also include causing a land title deed registered to the electronic real estate registry to be recorded in association with the RAI. In accordance with a related embodiment, the method can also include causing a land title deed and the RAI to be recorded in association with one another in the local land court having jurisdiction over the land. In accordance with another related embodiment, the method can also include allowing the stored RAI to be appended to include other information relating to a land title deed and related documentation, which can further include documentation such as financial documents pertaining to mortgage loans or other liens, encumbrances and land claims. Additionally, the RAI can be appended with a Sequential Equity Allocation Lien (the "SEAL") identifier and the SEAL identifier can include one of: a date associated with the SEAL identifier, a time associated with the SEAL identifier, a document associated with the SEAL identifier, document type associated with the SEAL identifier and a document preparer associated with the SEAL identifier. The RAI can also be appended with a Vendor Identification Number (the "VIN").

In accordance with an embodiment of the present invention, systems and methods associate a RAI to a managed asset-titling entity (the "MATE") and to all attendant title deeds, financial instruments and supporting documentation necessary to facilitate a conveyance of interests in such property. All documentation and underlying real property assets can be held or owned by the MATE. The MATE is governed under an indenture agreement or other contract agreements that provide an agent or trustee powers to manage and dispose of property held or owned by the MATE for the benefit of one or several third parties.

In accordance with another embodiment of the present invention, systems and methods produce an Asset Underwriting Score (the "AU-score"), a product that derives its numeric value from the quality and quantity of useful, relevant and timely information used to establish and support real property valuations, typically a result of real asset evaluation performed prior to conveyance of a property title to a buyer from a seller, whereby land valuations reflect land rights and interests as though the land were unimproved, available and ready to be put to its highest and best legal uses that are physically possible, and socially and environmentally acceptable. In addition, mortgage collateral valuation reports and the loan origination process used by a creditor, which can include compliance with regulatory standards, are evaluated by computer programming designed to score underwriting quality.

In accordance with a related embodiment of the present invention, systems and methods controlling computer software with programming code to produce an Asset Performance Score (the "AP-score") a product that derives its numeric value from data collected from serving activity, electronic real estate registry activity and other pertinent transactional information related to registered assets of similar type recorded in association with an RAI to the electronic real estate registration system. Whereby information is processed, stored and retrieved by computer software running electronic code that creates and stores an AP-score on computers with data storage devises for subsequent dissemination via computer networks in communication with an electronic real estate registration system of both a numeric AP-score and a numeric AU-score in association with an RAI. Each numeric AU-score reflects the impacts of identified externalities at a specific point in time, typically upon origination and prior to conveyance of a property title to a buyer from a seller and the quality of loan underwriting applied to the evaluation and determination of value estimates associated with real assets established in part from information obtained by appraisal or value opinion which is permanently associated with an RAI. The AP-score measures and scores historic registered asset performance in terms of regularity and frequency of payment due counterparties, the timeliness of contract executions or other events such as certain SEAL transactions that indicate default or other activities that are material to sponsors, creditors, investors, regulators or other interested parties.

In accordance with embodiments of the present invention, systems and methods provide software processes to enable the electronic real estate registration mechanism to ensure that liens are discharged when an underlying loan is paid off, provide subsequent purchasers and lenders notice of recorded liens, and permit creditors to give notice of their secured interest in real property. The electronic real estate registration invention protects the legal interests of parties and counterparties that can be lineholders who seek to give notice of their secured status, prospective purchasers and creditors seeking information about prior liens, and owners of property seeking release of liens once debts are paid off. Furthermore, the electronic real estate registration system is in communication with an electronic network enabling an accessing party, an appending party, or a recording party remote access over a computer network such as the Internet to reach associated systems and methods. These associated systems can include a Property Transaction Database and/or a Location Characteristics Database or other storage devices that maintain reliable, timely and useful information relative to each real property and chattel property transaction, assignment, or other recordings identified by a SEAL in combined with a VIN assigned to a recording party or and appending party and made in association with an RAI. For example, transactions pertaining to a MATE identified with an RAI shall be registered to the electronic real estate registration system by a SEAL in association with an RAI to ensure a fair and clear, time sensitive transactional history remains transparent and permanently available.

In accordance with another embodiment of the present invention, systems and methods generate a MATE identified by an RAI to hold registered assets pertaining to any real property conveyance with associated documents, which can include a mortgage title deed, improvements title deed, a land title deed, deeds of trust or notes evidencing financings, a lease, a purchase option, or representations and warrantees by counterparties to a transaction. A MATE can be a trust or other entity suitable for the purpose of protecting the legal and collateral integrity of real property and chattel assets to the benefit of one or several beneficiaries of the entity. A MATE is subject to controls set by an indenture or other contractual agreement empowering an agent or trustee to act as title nominee or in a fiduciary capacity for one or several beneficial interests associated with real property and chattel assets. A separate MATE is formed for each real property conveyance recorded to a local land court in association with an RAI. Thereafter, the MATE known by the recorded RAI is chartered to hold, own or manage real and chattel property conveyed to it thereafter, together with all original and subsequent documentation pertaining to activities involving these registered assets until such time when activities cease and the MATE is dissolved. Upon dissolution, according to preset indenture or other contractual agreements, its agent or trustee distributes all registered assets to registered holders of specified beneficial interests, each provided an estoppel certification, lien releases, and/or deed and title transfer documents necessary to convey clear title, which the agent or trustee can certify officers of a contracted servicing agent or others qualified to execute and cause to be recorded to public records.

In accordance with an embodiment of the present invention, systems and methods improve the efficiency of the foreclosure process for lenders and for loan servicers, who can hold rights to implement a foreclosure, while providing mortgage borrowers a consistent and fair process to remediate and resolve mortgage loan deficiencies, or to ensure a final settlement that is equitable under prevailing law.

In accordance with an embodiment of the present invention, systems and methods enable real property market participants to sell, assign, trade or otherwise transfer real property and chattel interests via a computer network system in communication with an electronic real estate registration system in association with data storage devices. Sponsors, property holders or investors, in exchange for capital, can cause the registration of a SEAL in association with an RAI to the electronic real estate registry system database for the purpose of conveying real property and chattel interests via a computer network system. For example, a conveyance of a land title deed registered to an electronic real estate registration system in association with a unique RAI would make it possible for buyers and sellers to cause a subsequent registration assignment evidenced by a SEAL memorializing an exchange for monetary consideration of the registered beneficial interests related to property associated with an RAI that can be held in or owned by a MATE.

BRIEF DESCRIPTION OF THE DRAWINGS

The foregoing features of the invention will be more readily understood by reference to the following detailed description, taken with reference to the accompanying drawings, in which:

FIGS. 4-4B are collectively a block diagram illustrating a method for determining values and prices associated with a registered land asset.

FIGS. 10-10B are collectively a block diagram illustrating a system for providing a registered land asset.

DETAILED DESCRIPTION OF ILLUSTRATIVE EMBODIMENTS

Figure 1:
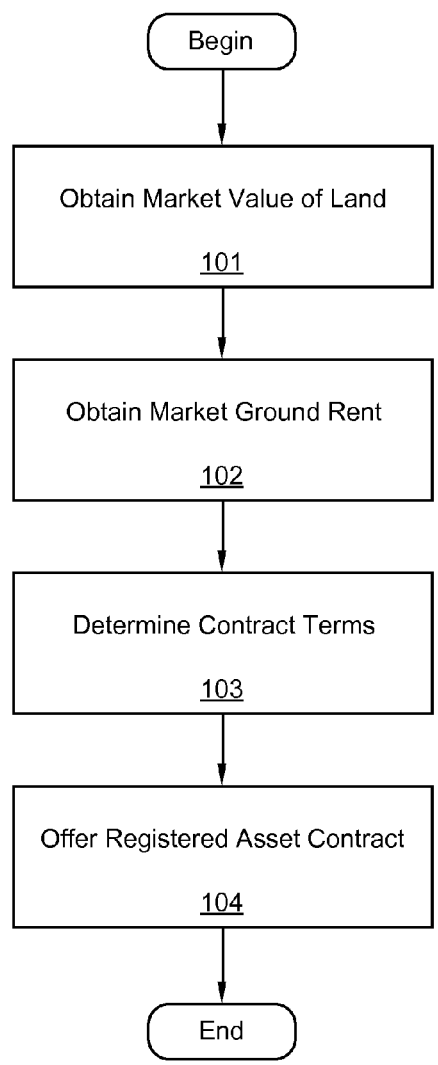
FIG. 1 is a flow chart illustrating one method for originating a registered land asset in accordance with one embodiment of the invention.

The systems for electronic real estate registration derived herein protect the legal and economic interests of parties and counterparties engaged in the exchange of real property rights and interests for money or other consideration. The present invention promotes the free exchange of real property investments over a computer network such as the worldwide web or other electronic communication system connecting computers operated by individual, real estate market and capital market participants to an electronic real estate registration system in association with various information storage systems.

Systems and methods derived herein provide a computer user useful title and registered asset information management systems and methods that prepare and enable real property interests for public exchange by capturing, processing, storing, retrieving, transmitting and reporting useful and timely real property information in a manner typically associated with securities. Provided herein are systems and methods to generate registered asset identification and information in an arrangement suitable for delivery in electronic documentation; registered asset title identification, management, retention and recovery mechanisms; registered asset underwriting scoring, registered asset performance scoring and registered asset classification mechanisms; and, registered asset analysis software tools for investment decision-making. Embodiments further provide systems and methods that promote registered asset trade, exchange and settlement techniques made available to accessing, appending and recording parties over a computer network in communication with devices that capture, register, store, transmit and report information required for rapid settlement of real property transactions. Singularly and severally these devices and methods stimulate the opportunity for a long-term improvement in the supply of private capital and mortgage credit to real estate markets by enhancing the accessibility and transparency of information.

As used herein, registered land assets are interests in real property land titles that can be held in book entry (or other) form such that they are suitable for sale or resale, assignment, transfer or exchange into and between both capital market and real estate market participants. Registered land assets can offer a fixed rate of return under contract as well as equal or superior collateral value and yield when compared to high-grade corporate bonds and certain mortgage-backed debt instruments of equal duration.

Furthermore, systems and methods derived herein improve document management and information transparency necessary to lower the costs associated with an unwieldy and inefficient foreclosure process in a manner that can improve the outcomes of mortgage loan foreclosures. Foreclosure process management offers borrowers, lenders and capital investors a fair and meaningful process to reduce economic risks such as those that brought about market shifts and other economic influences that have left borrowers subject to excessive and often prejudicial foreclosure practices, which have left behind millions of questionable land title claims due to poor documentation management. The several embodiments of the present invention improve information and transactional transparency and limit the opportunity for real estate market price breaks.

DEFINITIONS

As used in this description and the accompanying claims, the following terms shall have the meanings indicated, unless the context otherwise requires:

Agent or Trustee: see "Land Agent"

Bonded Asset: A registered land asset wherein the issuer guarantees the performance of registered land asset contract terms directly and/or through an insurance policy, which guarantees the embedded call settlement price at maturity. A government agency, a qualified non-profit enterprise and a local housing authority are examples of issuers that can guarantee registered land asset contract terms directly.

Community Score: A factor representing the effect externalities have on the value of real property by aggregating multiple RAI references and associated criteria across a user-defined geographic range of RAI references to form a community of identified investments.

Document: Information that is inscribed on a tangible medium or that is stored in an electronic or other medium and is retrievable in perceivable form; and eligible to be recorded in the electronic land title registry records maintained by its agent or trustee.

Electronic: A signal in association with technology carried by electrical, digital, magnetic, wireless, optical, electromagnetic, or similar capabilities.

Electronic Document: A document that is received by the electronic real estate registry in electronic form.

Electronic Signature: Is any electronic communication in the form of a sound, symbol, or an electronic process attached to or logically associated with a document that has been executed or adopted by a person with the intent to sign a document.

Embedded Call: A land purchase option that is part of and trades with the registered land asset owned by a leasehold estate or assignee. Generally, the land can be repurchased at a specific price and time established during registered land asset contract origination.

Free Asset: A registered land asset wherein the embedded call has expired.

Holder: A registered asset contract owner.

Income Asset: A registered land asset wherein land sale proceeds paid in exchange for the land title underlying the registered land asset are greater than the present worth of its calculated land par value, but less than the appraised market land value determined at the time of the exchange, and wherein a ground rent is due to the holder for a period of time.

Interparty Agreement: A body of technical documents that comprise the formal contract between an agent or trustee and the holders of beneficial interests in real property assets controlled or managed by the agent or trustee. Comparable in scope to an indenture agreement that is the formal contract between a bond issuer and the bondholders, the interparty agreement sets forth the details of all the terms and conditions of each contract provision with every detail to include procedures relating to financial and operational covenants that the agent or trustee and the beneficiaries must abide by and the formulas for calculating whether the agent or trustee and the beneficiaries are abiding by the covenants to be followed.

Investor: Investors can include, but are not limited to, high net worth investors that meet the definition of an "accredited investor" as defined in accordance with law, including high net worth investors interested in like-kind property exchanges and institutional investors including, but not limited to insurance companies, pension funds, mutual funds, real estate investors, developers, and dealers. FIG. 7 is a block diagram illustrating registered land asset investor qualifications and considerations, and provides a series of terms and descriptions that should be self-explanatory based upon the included Figure text.

Land Agent: Typically a bank or regulated trust service provider that acts on behalf of holders of beneficial interests in certain situations, including making sure the sponsor is abiding by the covenants, paying interest on time, collecting and distributing certificates, etc. The Land Agent holds or manages registered assets for the benefit of one or several principals who are bound by governing Interparty Agreements. A Land Agent who acts within the scope of its authority based on an Interparty Agreement between principals, who can be beneficiaries to real or chattel property under the control of a Land Agent, cannot be held liable for their actions except for a breach of Interparty Agreement contract terms or actions that are deemed unlawful in a court of law. In the event that an entity is formed to hold or owns real property assets, for example a MATE is formed as a trust, then for purposes herein the term "Trustee" can be used interchangeably with "Land Agent".

Land par value: The sum of all future economic values a leaseholder/issuer might expect as compensation for its land upon conveyance to an investor.

Leaseholder/Issuer: A current or prospective landowner that causes the issuance of a registered land asset.

Leasehold estate: Improvements title deed, subject to a ground lease and/or land purchase rights, claiming all man-made improvements and personal property above the land, including, but not limited to, all existing or proposed buildings, machinery, wells, septic systems, storm drains, driveways, parking lots and landscape features.

Managed Asset-Titling Trust (MATE): A legally formed special purpose entity devised to hold or own real property assets remote from bankruptcy, intervening liens and other encumbrances that might restrict registered asset liquidity, a MATE is governed under an indenture agreement or other contract agreements that provide an agent or trustee powers to manage and dispose of property held or owned by the MATE for the benefit of one or several third party beneficial owners of identified MATE real assets.

Originator: An entity qualified to offer a registered land asset contract.

Purchase Partner Leasehold Mortgage: A mortgage associated with a leasehold estate that is subject to registered land asset contract provisions, and that can be recorded with the registered land asset and be accessed by a registered land asset contract originator or servicing agent.

Real Asset: Any real or attendant chattel property rights and interests or fractional interests thereof.

Real Property Rights and Interests: Real property consists of rights in realty, which are interests, benefits, and rights inherent in the ownership of real estate that are both divisible and separable, meaning that more than one party can have a portion of any given right.

Registered Asset: Any real property interests or rights together with attendant chattel property associated with a registered real asset recorded to the electronic real estate registry.

Registered Asset Identifier: The Registered Asset Identifier (the "RAI") represents the perpetual geo-referenced address of an identified land title deed, which can also be permanently associated with a set of alphanumeric characters in a database that correlate to a geo-referenced address, which can include a Universal Transverse Mercator (the "UTM") grid code or other similar geospatial coordinate or reference. The geo-referenced address linked to an alphanumeric identifier, such as the nine-character CUSIP number that uniquely identifies a particular security as determined by the Committee on Uniform Securities and Identification Procedures, further associates all attendant real and chattel property, contracts, assignments, documentation, entity, or supporting information that is in associated with the identified real asset such that the identifier is suitable to serve as an entry in a bank account, such as a brokerage account.

Registered Land Asset: A "land asset" is a recorded financial product representing a fee simple interest in a specific land title deed and unencumbered by debt, but can be subject to recorded lease and land purchase rights, typically registered to an electronic land title registry, which can be available for sale, transfer or exchange within and between the capital markets and the real estate markets via a bookkeeping and/or book entry method. Typically there is a registered land asset contract associated with the registered land asset product, which defines any terms associated with a land use, ground rent and an embedded call.

Sequential Equity Allocation Lien (SEAL): A SEAL is an electronic tag applied to identify a specific document or electronic document thereby providing pertinent information relating to the associated document without a need to modify the corresponding document or electronic document in any way.

Figures 8, 8A:
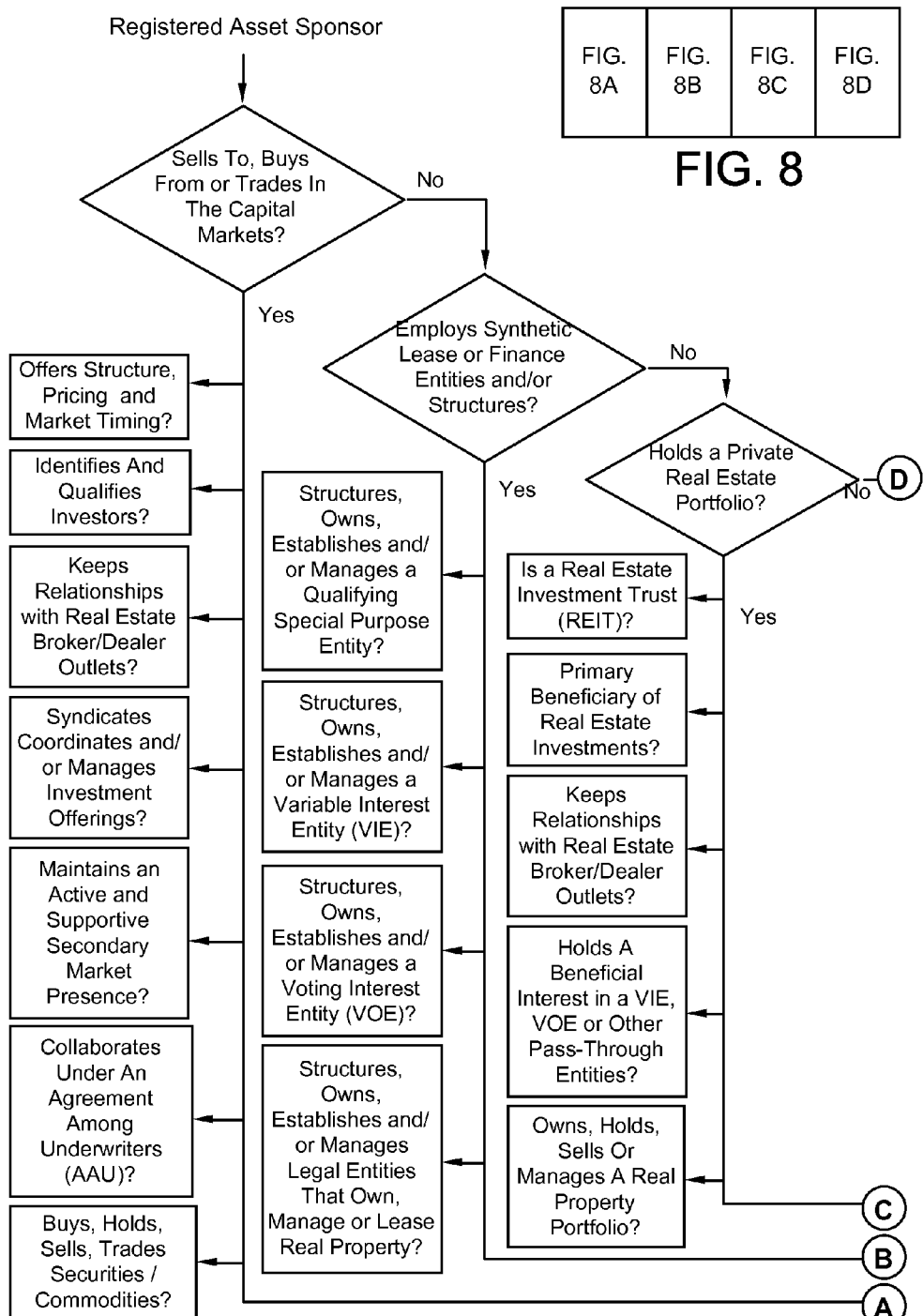
FIGS. 8-8D are collectively a block diagram illustrating examples of registered land asset sponsor qualifications and considerations.
Figure 8B:
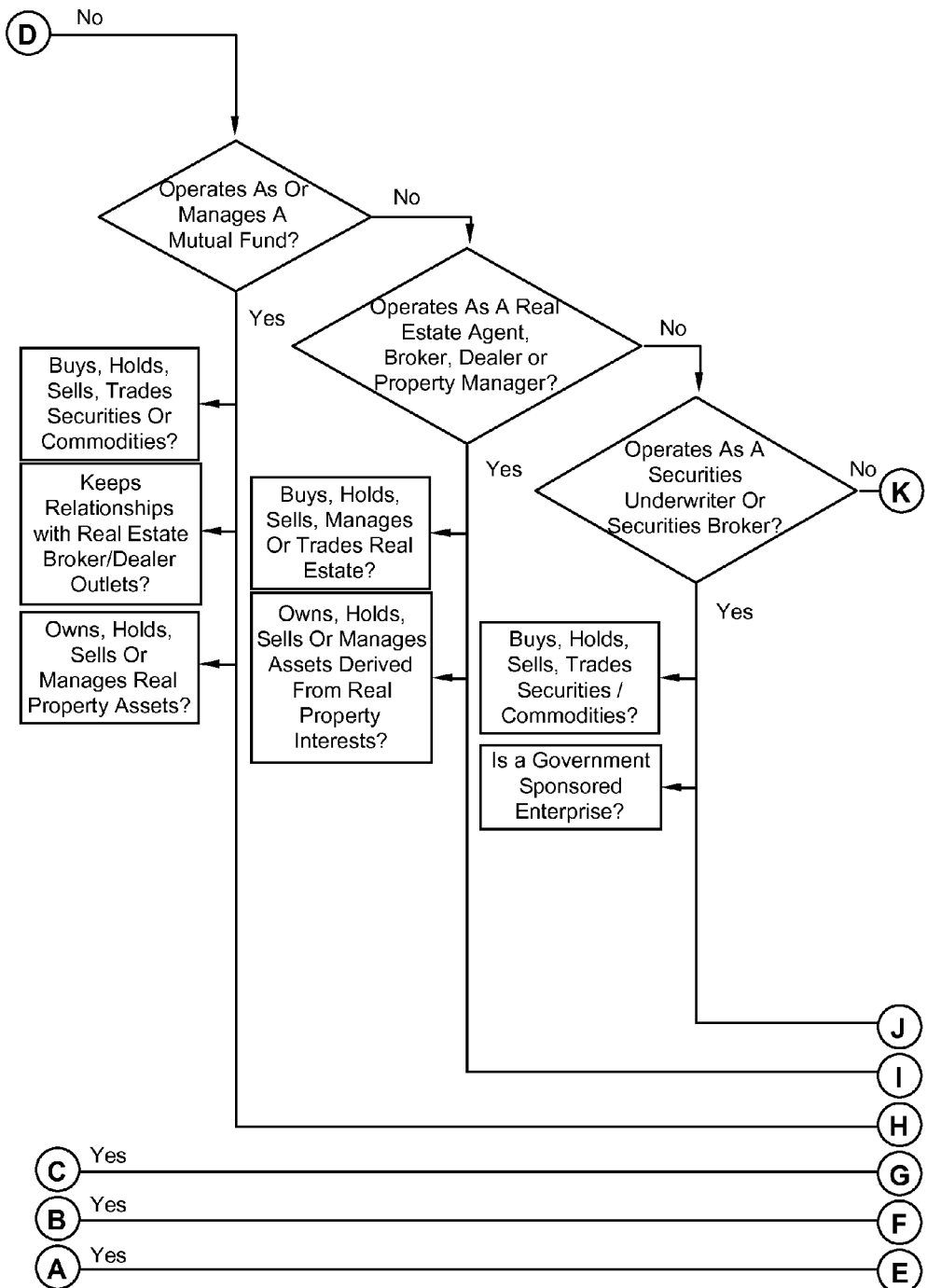
Figure 8C:
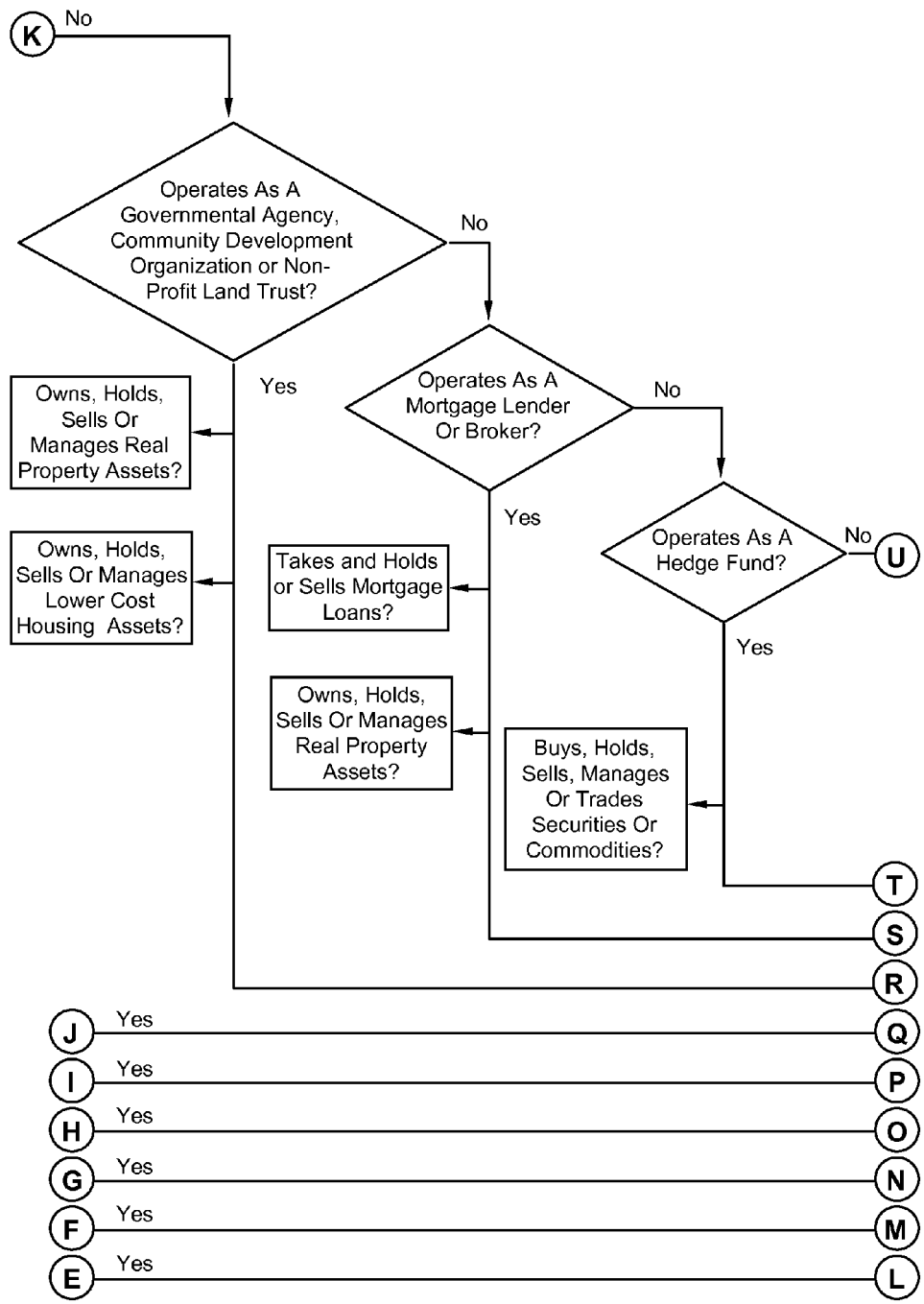

Sponsor: An individual or entity providing capital to consummate the sale of land associated with a registered asset or improvements mortgage title deed. Such an entity can include a special purpose entity. FIG. 8 is a block diagram illustrating registered land asset sponsor qualifications and considerations, and provides a series of terms and descriptions that should be self-explanatory based upon the included Figure text.

Zero Coupon Asset: A registered land asset wherein land sale proceeds paid in exchange for the land title underlying the registered land asset are equal to or less than the present worth associated with land's par value, and wherein no ground rent is due.

The present invention enabled by embodied systems and methods electronically capture, process, store, retrieve, transmit and report useful and timely real property transactional data over a computer network in association with storages devises in further communication with an electronic real estate registration system to which data gets electronically encoded in association with a registered asset identifier (RAI) (1400), whereupon data is processed then stored to interrelated storage devises by RAI as high quality interactive real property investment information and made available to real estate and capital market participants, industry regulators and the general public via a suitable computer networks such as the public Internet and viewed through a client computer (e.g. graphical) user interface (GUI) such as a web browser running software tools that display and report user-defined data. The implementation of an interface and client-based software environment is highly variable and can be implemented in accordance with ordinary skill.

Basic Registered Land Asset Origination

The following Description sections below, which are directed to FIGS. 1-10B describe a general system and method according to an initial embodiment provided in U.S. Pat. No. 7,693,765, entitled SYSTEM AND METHOD FOR REAL ESTATE REGISTRATION, Michael Dell Orfano, which is expressly incorporated herein by reference. The following sections provide a summary of the teachings of the embodiment and a further discussion of applicable details and variations can be found in the incorporated patent.

FIG. 1 is a flow chart described in the corresponding embodiment "Registered Land Asset Origination" of above-incorporated U.S. Pat. No. 7,693,765, is a flow chart illustrating one of many possible mechanisms for real asset originators or their assignees (the "real asset originators") to originate a registered land asset in accordance with embodiments of the present invention. An origination process is a series of steps taken by real asset originators that begins with a determination of market value for the real property (101) associated with the registered land asset. Such information can be obtained via computer network in communication with the electronic real estate registry and related database systems providing an appraiser data validated within an appraisal report conclusion depicting comparable local market data, as detailed in further embodiments of the present invention. Subsequently the real asset originators determine a market ground rent (102) associated with the registered land asset contract, which can also be provided by an appraiser within an appraisal report. The real asset originators determine contract terms (103) associated with a land lease and/or purchase option rights documenting such terms in electronic forms suitable for presentation of a registered land asset contract to the leaseholder (104).

Property, Owner and Buyer/Borrower Qualification

Figure 2B:
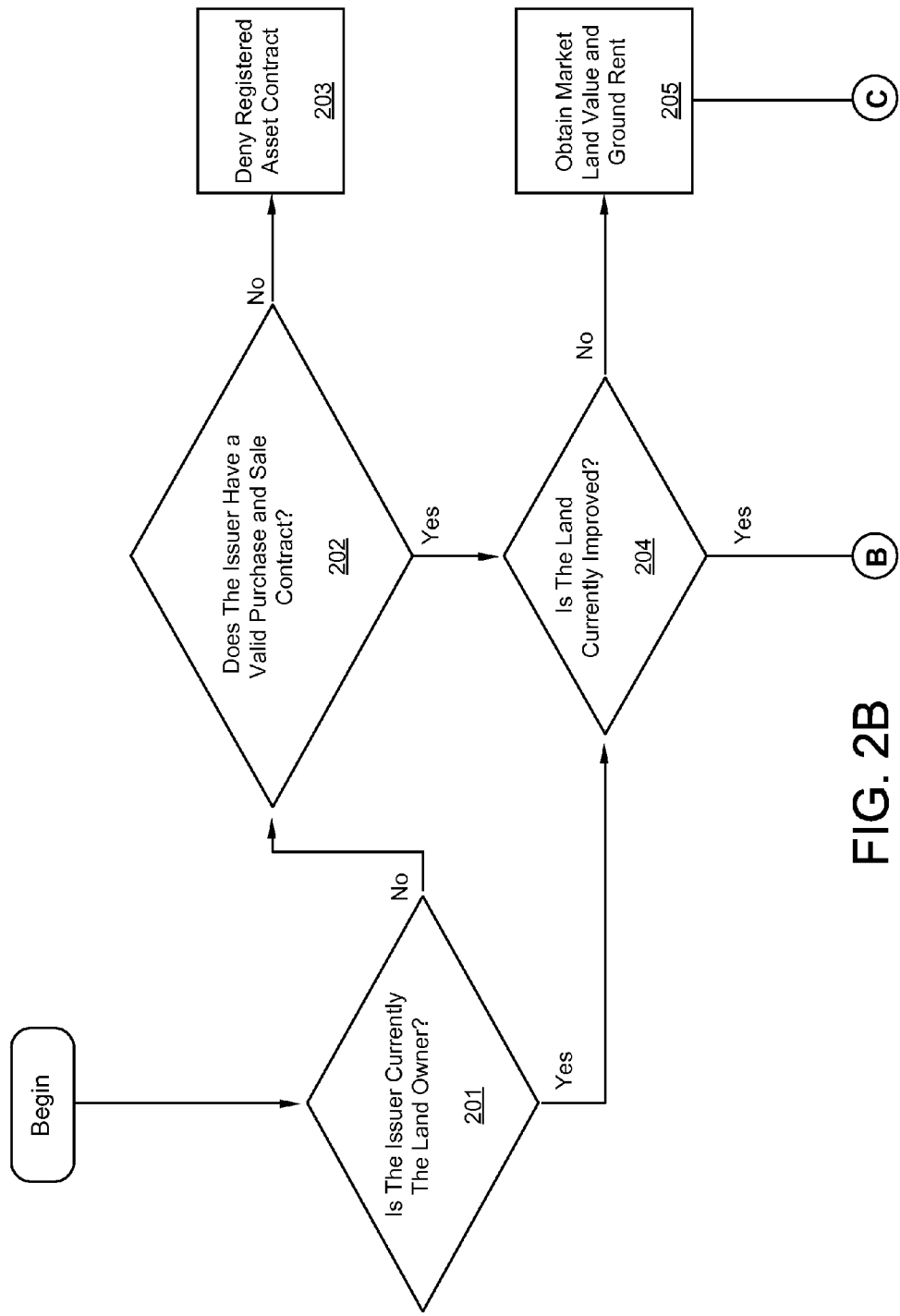
FIGS. 2-2D are collectively a flow chart illustrating a method for determining a prospective leaseholder's qualifications to participate in a registered land asset contract in accordance with another embodiment of the invention.
Figure 2C:
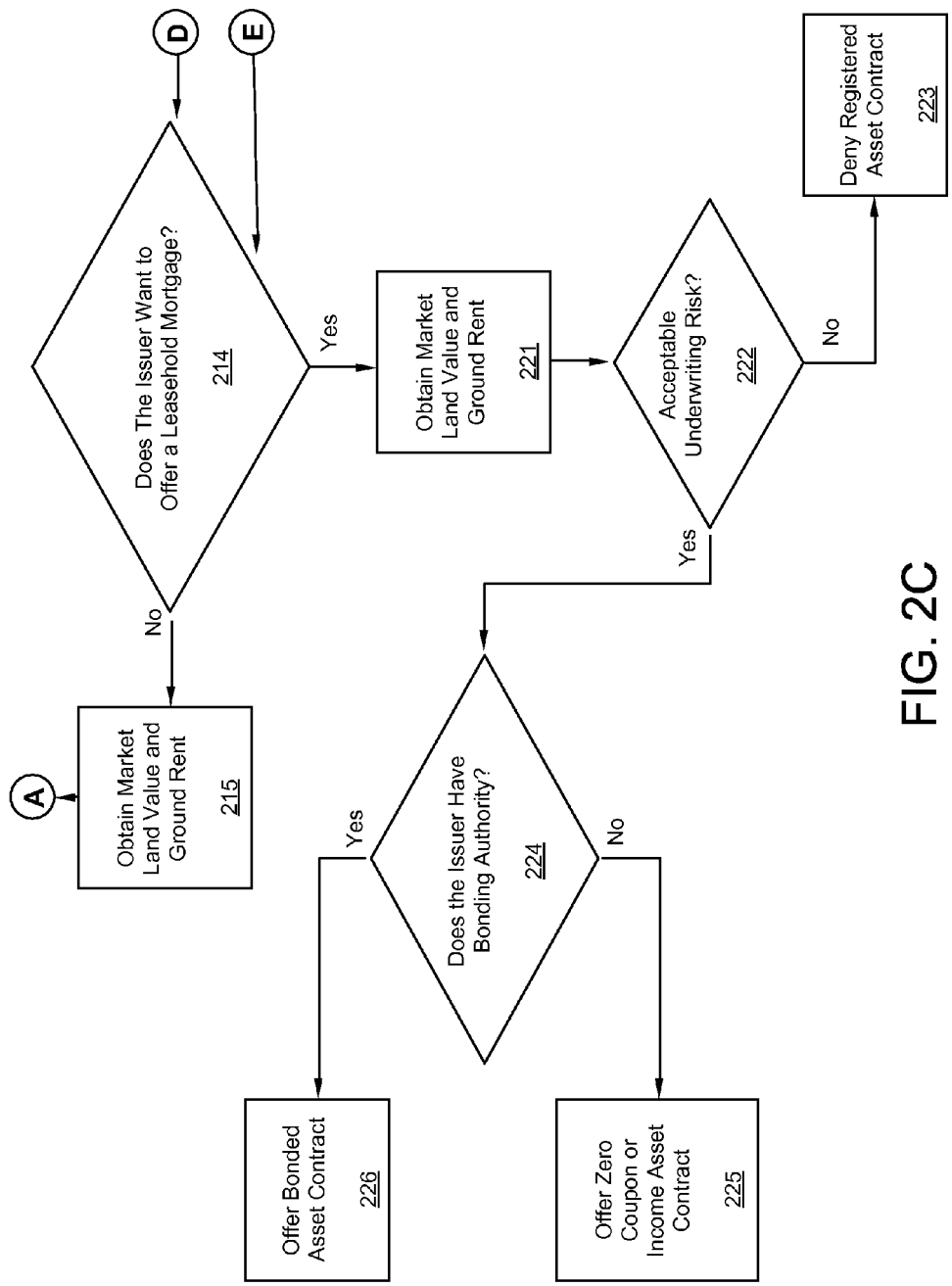

FIGS. 2-2C illustrate a method for real asset originators to determine if a prospective property owner or buyer/borrower qualifies to participate in a registered land asset or other real asset contract origination in accordance with embodiments of the present invention, wherein borrower suitability and product usefulness are among the determinate results of an expanded registered asset underwriting scoring mechanism explained and illustrated in greater detail below.

FIGS. 2-2C is offered as an example of one such assessment process, but the process is subject to change due to underwriting circumstances. Typically, a real asset originator will determine (201) if the prospective leaseholder is the owner of the identified land. If the prospective leaseholder is not the owner of the identified land, the real asset originator will typically determine (202) if the prospective leaseholder has obtained a purchase and sale contract with respect to the identified land. If the prospective leaseholder has not obtained a purchase and sale agreement, the prospective leaseholder can be denied (203) a registered asset. If the real asset originator determines the prospective leaseholder has a purchase and sale agreement, or if the prospective leaseholder is the current landowner, the real asset originator will determine (204) if the land has existing improvements. If the land is vacant and suitable for an intended use, the real asset originator can obtain (205) the market land value (typically, the market land value as though the land is available for its highest and best use) and market ground rent associated with the identified land. Alternatively, the real asset originator can obtain a land capitalization rate associated with the identified land and use a pricing mechanism, such as the pricing mechanism described in the corresponding embodiments of the above-incorporated U.S. Pat. No. 7,693,765. It should be noted that the real asset originator can obtain any two of: a market land value, a market ground rent or a land capitalization rate for land associated with the registered land asset. Given any two of these three elements, the other can be calculated.

Figure 2D:
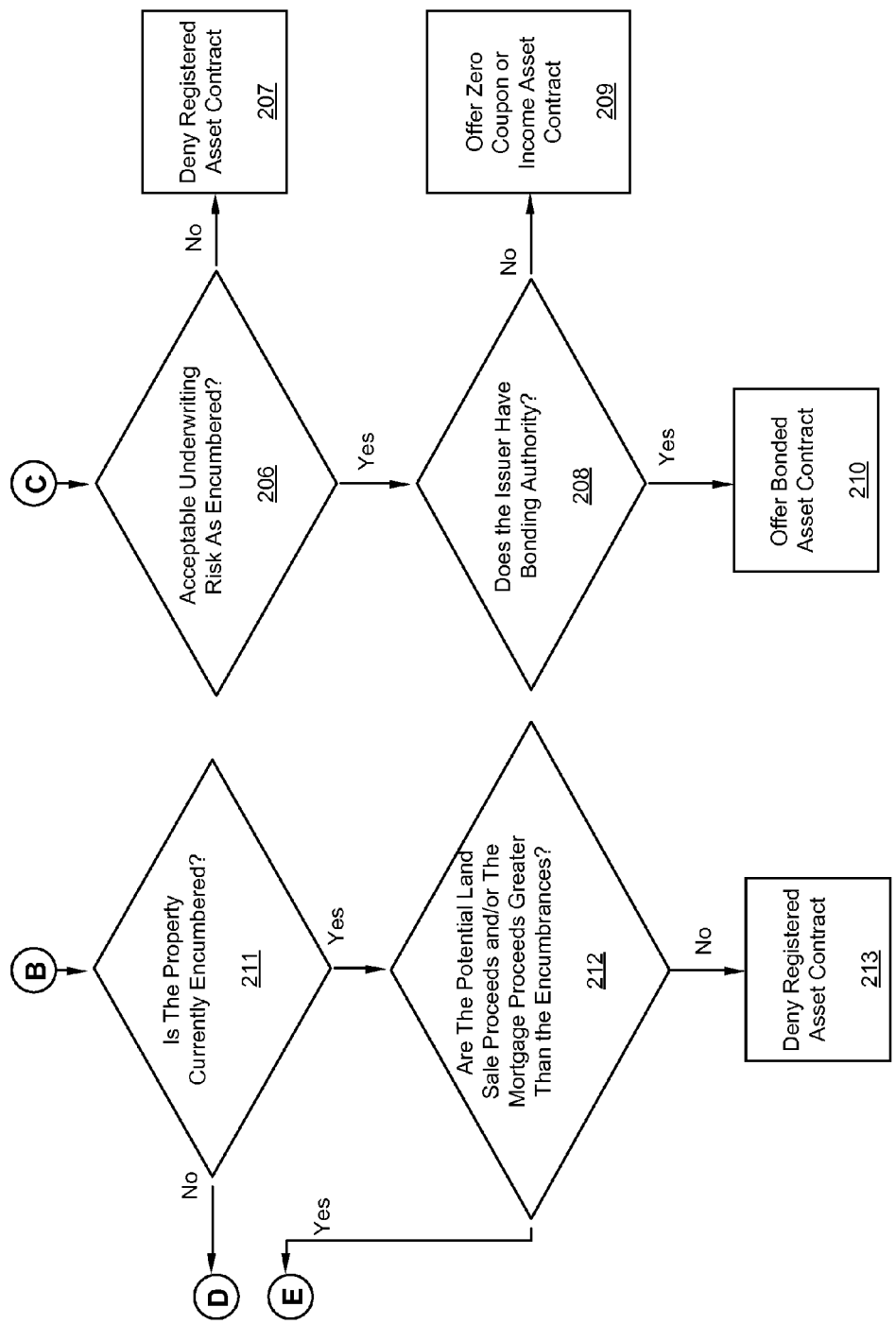

The real asset originator can then determine (206) if, given the market land value and market ground rent, the land purchase creates an acceptable financial and/or underwriting risk (See FIG. 2D). If the market land value and the market ground rent indicate unacceptable financial and/or underwriting risk, the prospective leaseholder can be denied (207) a registered asset. If the risk is acceptable, the real asset originator can determine (208) if the prospective issuer has bonding authority. If the prospective issuer does not have bonding authority, the real asset originator can offer (209) the prospective leaseholder a zero coupon asset or an income asset. If the prospective leaseholder has or a third party will provide bonding authority, that is the third party will guarantee or insure the registered land asset embedded call settlement price, the real asset originator can offer (210) the prospective leaseholder a bonded asset.

If the land is improved, the real asset originator can determine (211) to what extent the property is encumbered (FIG. 2D). If the property is encumbered, the real asset originator can determine (212) if the sum of the land sale proceeds, any outstanding mortgage loan, and the settlement value to clear other encumbrances exceed the underwriting value of the property. If so, the real asset originator can deny (213) the prospective leaseholder a registered asset.

If the property is not encumbered, the real asset originator can determine if the prospective leaseholder would like to or needs to offer a mortgage (214). If the prospective leaseholder does not want or need to offer a mortgage, the real asset originator will obtain (215) the market land value and the market ground rent associated with the registered asset. The real asset originator can determine (216) if the market value of the land and the market ground rent indicate an acceptable financial or underwriting risk. If the market land value and the market ground rent indicate an unacceptable financial and/or underwriting risk, the prospective leaseholder can be denied (217) a registered asset. If the risk is acceptable, the real asset originator can determine (218) if the prospective leaseholder has or a third party will provide bonding authority and will guarantee the registered asset; and if so, offer (219) a bonded asset. If the prospective issuer does not have bonding authority or elects not to insure the payment of the embedded call settlement price, the real asset originator can again offer (220) a zero coupon asset or an income asset.

If the prospective leaseholder would like to offer a mortgage, the real asset originator can obtain (221) the market land value and a corresponding market ground rent. In addition, a mortgage lender can require a market value for proposed or existing improvements on the property. The real asset originator can determine (222) if the market value of the land and market ground rent (and, perhaps, the market value for improvements on the property) indicate an acceptable financial and/or underwriting risk. If the market land value and the market ground rent indicate unacceptable financial and/or underwriting risk, the prospective leaseholder can be denied (223) a registered asset. If the risk is acceptable, the real asset originator can determine (224) if the prospective leaseholder qualifies for or a third party will provide bonding. If the prospective issuer does not have bonding authority, the real asset originator can offer (225) the prospective leaseholder a registered land asset as a zero coupon or income asset that can be accompanied by an optional leasehold mortgage. If the prospective issuer has bonding authority and will or can guarantee the registered land asset contract directly or through a third party, the real asset originator can offer (226) the prospective leaseholder a bonded asset.

Land Sale Distribution Options

Figure 3:
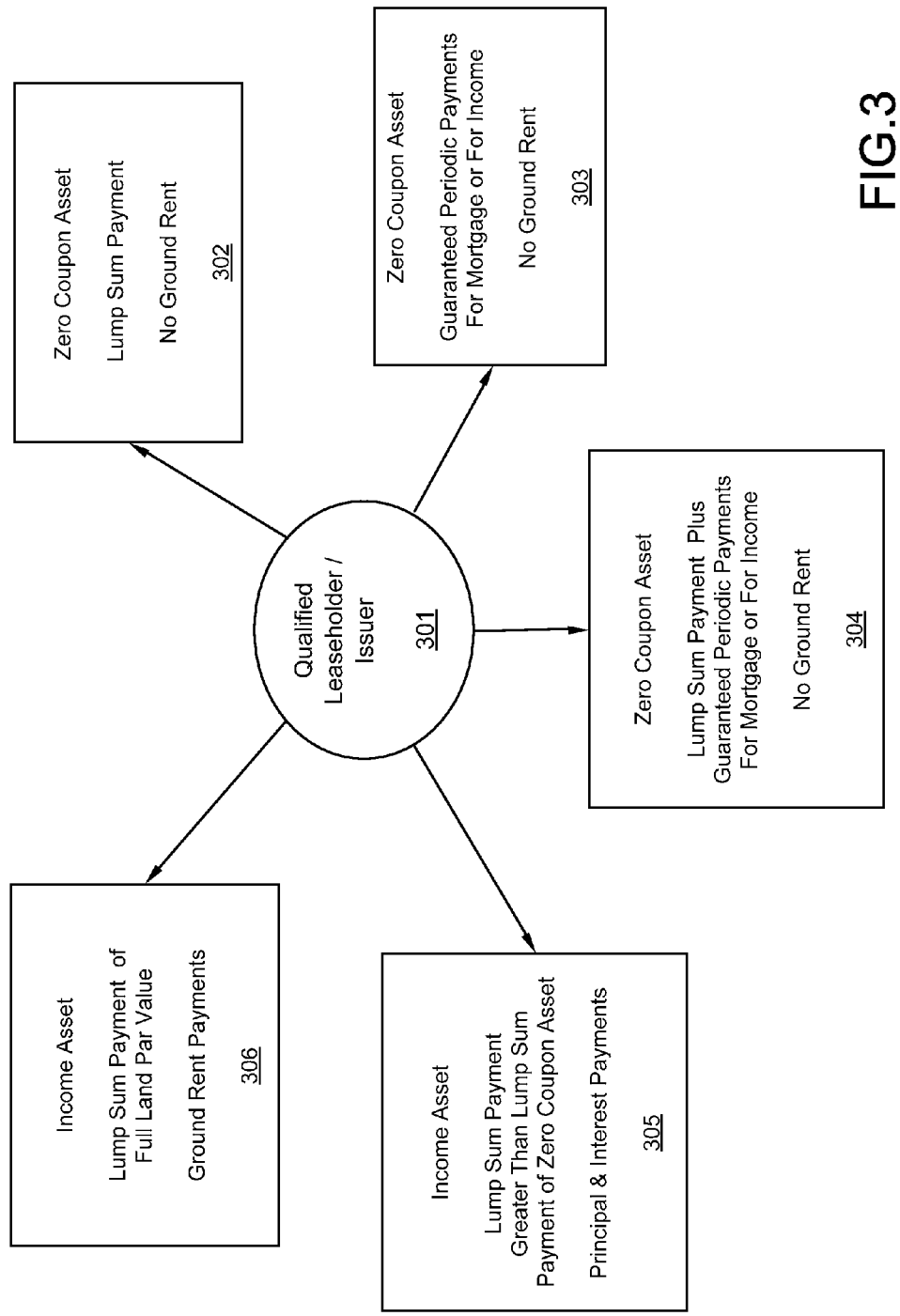
FIG. 3 is a block diagram illustrating land sale distribution options in accordance with a further embodiment of the invention.

FIG. 3 is a block diagram illustrating the several forms of compensation available to suit the needs of current land owners or property buyers who might not want to own land, wherefore they convey real property rights into one of several illustrated remittance structures and in so doing retain a leasehold interest (301), which can include repurchase rights in the conveyed land title deed. The several illustrated payment structures pay the seller's remittance at settlement in the form of either all cash, an annuity over time, or some combination of cash and annuity, with each structure having a differing rental associated with the retained leasehold interest.

Structuring land sale compensation can vary widely and driven by many factors, with the economic needs and circumstances of the transaction participants being the principal criteria in each instance. When the sale of land is made in combination with a repurchase agreement, such as a land purchase option, land pricing and structured remittance strategies depend on the capital needs of the seller and the economic benefits that accrue to the buyer. The following are examples offer different mechanisms to balance a transaction so it delivers a fair and equitable economic benefit to both parties i.e. the land seller soon to become a leaseholder and the land investor who will encumber the land with a lease and perhaps a purchase option that enables the leasehold to re-purchase the land in the future. The detailed formulaic descriptions of each of the following land sale distribution options can be found in the corresponding embodiments of the above-incorporated U.S. Pat. No. 7,693,765.

Block (302) Cash/Lump Sum Payment delivers a lump sum payment to the leaseholder or leasehold estate at the closing of the registered land asset purchase equal to the present worth of the land par value, discounted over the embedded call term, at an effective cost of funds interest rate determined at registered land asset contract origination.

Block (303): Guaranteed Annuity Payments pays a series of level periodic installments based upon the calculated present worth of the land par value, discounted over the embedded call term, at an effective cost of funds interest rate determined at contract origination.

Block (304): Cash/Lump Sum Payment with Guaranteed Annuity Payments pays both a lump sum payment and a series of level periodic installments that together are equal to the present worth of the land par value, discounted over the embedded call term, at an effective cost of funds interest rate determined at origination. No ground rent payments are due during the embedded call term.

Block (305): Cash/Lump Sum Payment—Requires Ground Rent Payments distributes a lump sum payout to a leaseholder that is greater than the lump sum proceeds of a zero coupon asset (304) of equal terms.

Block (306): Land Par Value Requires Ground Rent Payments distributes at land title conveyance the full land par value as a lump sum.

Real asset originators are ethically responsible, if not required under new or pending regulatory laws, to ensure borrowings and/or financing structures offered by them to consumers, such as the land sale-lease back structures given above as examples, are a practical use of real property resources that desirably serve the intended purposes for such financing activities and can be engaged without exposing an owner or borrower (land seller) to unnecessary or unwarranted economic hardship, such as a rental payment that might not be affordable. The registered asset underwriting scoring mechanism explained and illustrated in greater detail below establishes criteria for measuring the usefulness and suitability of a financing structures through captured electronic data fed into software running on a computer server system in communication with a network, which then renders captured data into a registered asset underwriting score.

Property Valuation and Registered Land Asset Pricing

FIGS. 4-4B are collectively a block diagram illustrating the incorporation of a real property appraisal report or other property valuation data with a registered asset scoring process applying prescribed computerized sequences and mechanisms, whereby embodiments herein are expanded upon in detail within embodiments to follow that establish the basis of registered asset underwriting, registered asset valuation, and registered asset performance scoring technologies, that are further incorporated in the creation of additional inventions such as (1) registered asset scoring by real asset type, (2) the associated systems to employ registered asset scoring by real asset type, which is the function of computer coding for software applications that underlie a further embodiment of the present invention, and (3) the development and applicability of real asset classes, which are useful to governing regulators, private investors, sponsors and co-sponsors and capital market investors engaged in the art of real property investing and regulation.

FIG. 4-4B is a block diagram illustrating a method for determining values and prices associated with a registered asset. In accordance with this embodiment, a land valuation report (501) can be used to determine underlying factors for valuing a registered land asset and appropriate land use contract terms (502). The land valuation report reflects attributes and deficiencies of the associated land, such as location, orientation to sun or water, noise levels, vibration factors, odors, wind exposures, flood zones and other attributes and deficiencies observed during a site review. Subsequent appraisals within a specified geographic range have the benefit of preceding appraisal data, gathered, for example, via a computer network, to determine value.

The land valuation report (501) can be produced via a land value appraisal process (503). Under appraisal theory, there are several established methods of deriving land value. These methods are known in the art and include, but are not limited to an allocation method (504), a ground rent capitalization method (505), a direct sales method (506), an abstraction method (507), an anticipated use method (508), or a land residual method (509). Ad valorem taxation information (510) can also be a consideration in the appraisal report. A property transaction database (511) can provide information relating to transactions involving the property for the land value appraisal process (503). Property specific factors (512) influence land values and is thus considered within the results of the land value appraisal process in producing the land valuation report. Such property specific factors generally result from a site visit (for example, by the appraiser), but can also be obtained from a database associated with a network as described below.

Land can be affected by external economies and diseconomies. Governmental controls and regulations, economic circumstances, social forces and environmental conditions all impact land value in different ways. These forces are dynamic and can influence land values in ways that are as unique as each parcel of land within a community. These external influences are measured at contract origination forming one element of several that comprise an underwriting score, which serves together with other data stored by RAI to evaluate a land value derived by an appraisal report or other mechanisms such as automated valuation models. Multiple underwriting scores combine with other data drawn from within a corresponding geography to form a community score "cScore" (513). The cScore represents the diversity of economic impacts shared by a community of properties with common location that share, for example, related externalities, which can be adjusted for time and other material impacts. Historical community information accumulated in the property transaction database (511) over time can be used to provide information that is relevant to the creation of a cScore (513). Absent historical data and useful comparable market data, an Interim Pricing Method (524), an embodiment detailed below, establishes an initial score, which impacts registered land asset contract terms and the land pricing.

Further, each registered land asset contract, in turn, influences a cScore. As registered assets begin to proliferate in and around a community and populate the property transaction database, site-specific uses allowed under registered land asset contracts become an informational resource. Ground lease terms from historical contract references that can be used to establish appropriate land use limitations for new contracts and to ensure the uses will remain in harmony with the location and in tune with the costs of community services. Over time, information derived from registered land asset contracts help measure the economic health and life cycle of a community, which in turn influences the cScore calculation and its improved effectiveness at evaluating land values.

A location characteristics database (514), which can be combined with data from the property transaction database (511), includes socioeconomic information that can be cumulative, eventually influencing the cScore (513) calculations. The location characteristic database also includes private and public information that can be fed from multiple international, national, state, regional and site-specific sources from raw economic data, social data, environmental data and governmental data, which are readily available. Further, data collected on a transactional basis, gathered from electronic documentation relating to registered asset underwriting can be included in the location characteristics database. These can include, but are not limited to:

1) Regional, national and international factors (515): Federal government data is available by states and by region. It is generally uniform, reliable, timely and cost effective public data. Sub-market segmentation, buyer characteristics, pertinent demand factors and pertinent supply factors are available in government data.

2) State factors (516): State economic influences significantly impact land values. Building on federal level data, many states produce a wide array of information available for this purpose.

3) County—SMA Factors (517): Local developments, jobs, and population data influence demand. Regional trend analysis, for example, can contribute useful insight and help anticipate change.

4) Community Factors (518): Social, economic, governmental, and environmental factors influence property values in the vicinity of the targeted property, and as a result the subject property itself. These factors, if any, can be gathered by an appraiser, for example.

5) Site Specific Factors (519): Physical characteristics, legal influences, social influences and the physical and functional obsolescence of the improvements, if any, can also be gathered by an appraiser.

The location characteristics database (514) can also contain public real estate transactional data including liens, municipal bond ratings, foreclosures and other activity useful in analyzing current and future risks and other market expectations.

Any developable land parcel within a community can support some site specific, appropriate land use sufficient to sustain some theoretical minimum net operating income ("NOI"). An appraisal can provide an estimated market NOI for, typically, the highest and best use on the subject land. This minimum NOI is used to calculate the return that the land must produce to justify purchase money funds. Following a title conveyance, the resulting NOI can integrate with all other underwriting information associated with any RAI on file within the property transaction database (511).

Detailed formulaic mathematics described in the corresponding embodiment "Validating Appraisal and Market Evidence" of U.S. Pat. No. 7,693,765 and incorporated by reference herein, are summarized as follows:

The market land value is the basis of the land par value (520), and from the land par value the land sale proceeds (521) is calculated. To calculate these in the absence of useful comparable data, the theoretical NOI is adjusted in accordance with the interim pricing method and in accordance with a formula representing the future worth of this income stream over the embedded call term. The result equals the embedded call value (522), which is subtracted from the market land value to yield the land par value. The land par value (520) is the total of all future land sale funds that flow to the prospective leaseholder over the embedded call term. The present value of the land par value, discounted at the cost of funds rate for the embedded call term, will yield the land sale proceeds (521).

The embedded call settlement price (523) is the cost to discharge a registered land asset contract. The settlement date and price are generally set at registered land asset contract origination. The principal variables used to determine the embedded call settlement price are duration term and anticipated land value change. The embedded call value (522), the land par value (520), the land sale proceeds (521) and the embedded call settlement price (523), as well as the land valuation report (501), are used to determine the registered land asset contract terms (502).

The Registered Asset Contract

Figure 5:
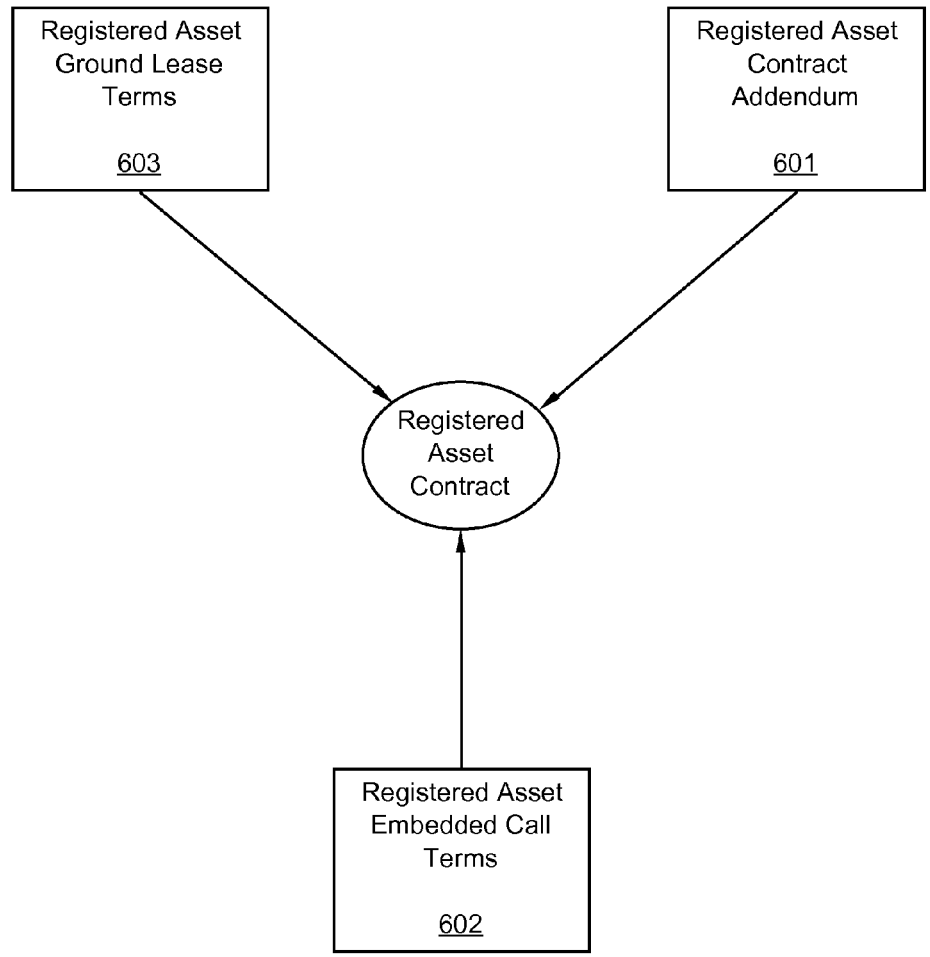
FIG. 5 is a block diagram illustrating possible components of a registered land asset contract.
Figure 14:
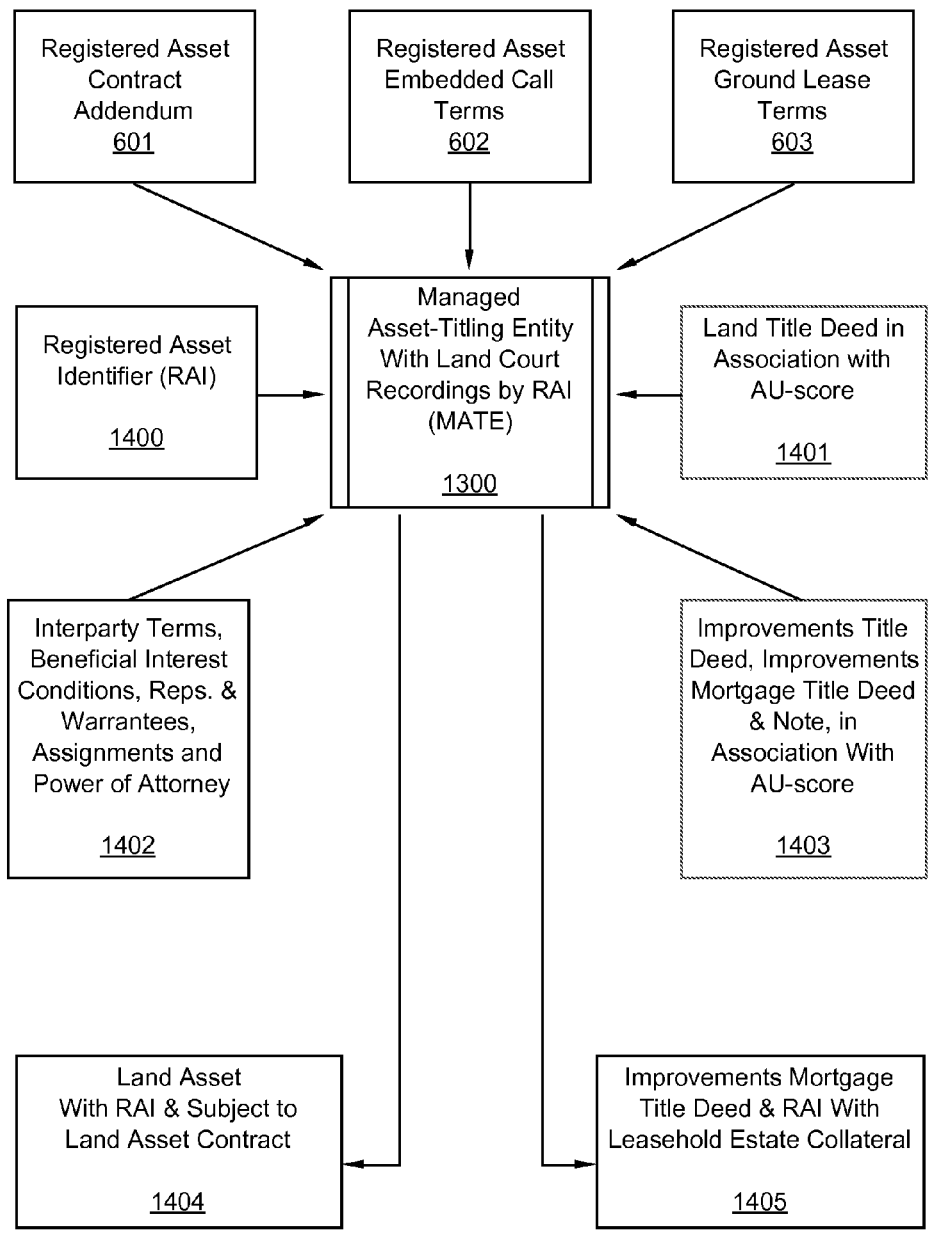
FIG. 14 is a flow chart illustrating two distinct real property interests held or owned by a MATE together with the appropriate contractual documents that make MATE-held or owned real property interests individually assignable to third parties as personal property at any time.
Figure 15:
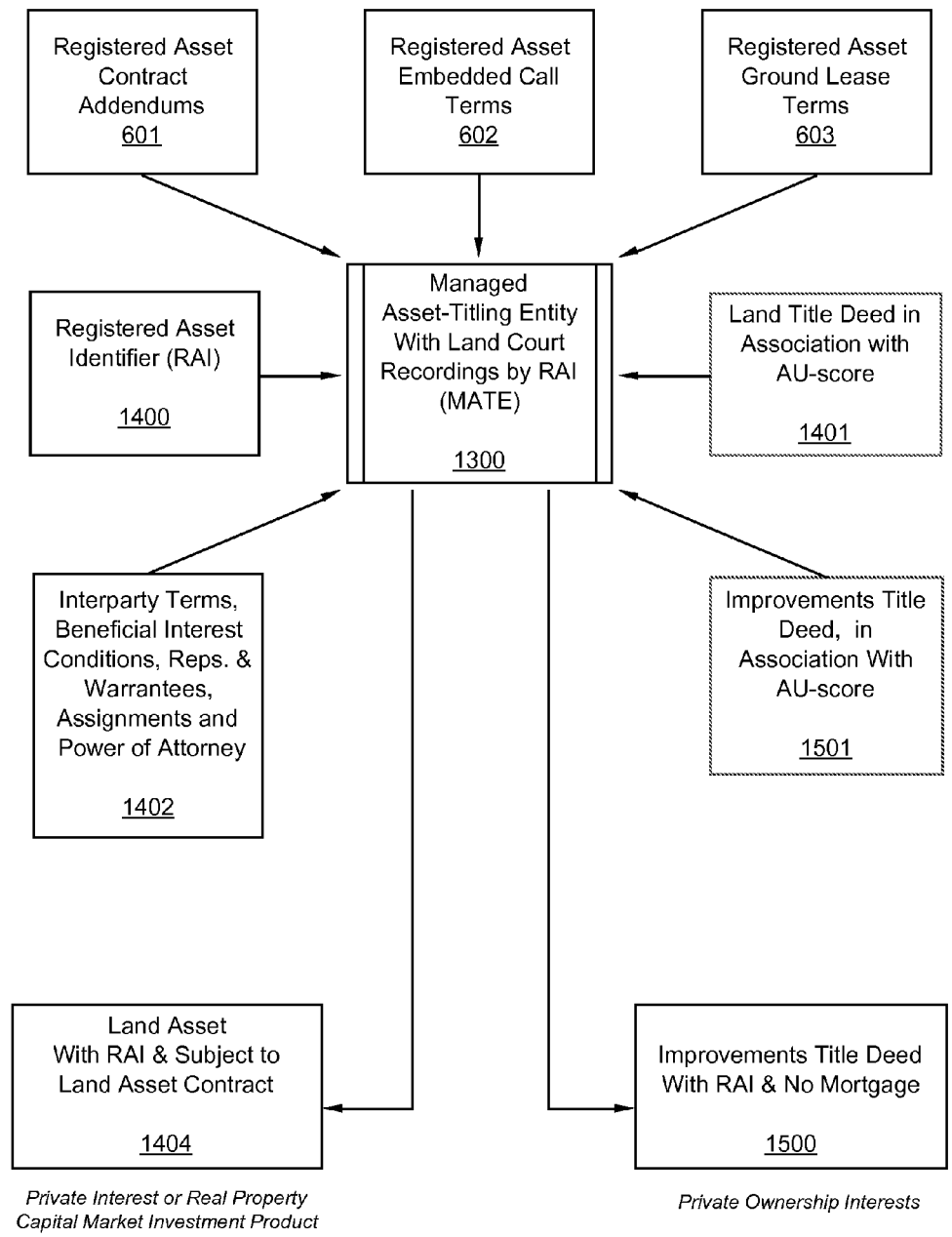
FIG. 15 is a flow chart illustrating two real property interests held or owned by a MATE together with the appropriate contractual documents that make MATE-held or owned real property interests suitable for a lawful private ownership purpose.

Illustrated in FIG. 5 is a block diagram illustrating basic elements of a registered asset contract. The registered asset ground lease (603), the registered asset contract addendum (601) and the registered asset embedded call (602) (also referred to as land purchase options rights), relate to the present invention as embodiments of a managed asset-titling entity, wherein the ground lease, the land purchase option right and contract addendums can be supplemented by additional documentation that are pertinent to the present invention, which can include a certified copy of an RAI (1400), a land title deed with associated registered asset underwriting score (1401), an improvements title deed with associated registered asset underwriting score (1501), and a body of contracts governing the MATE, its beneficiaries, its agent or trustee and various representation and warrantees (1402) should the underlying real property assets can be held or owned by a MATE (1300), as illustrated in FIG. 14 and FIG. 15.

The Registered Land Asset Closing and the Electronic Real Estate Registry

Figure 6:
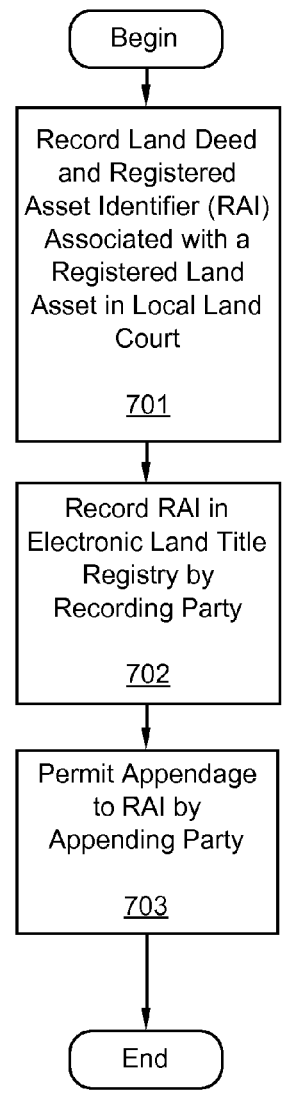
FIG. 6 is a block diagram illustrating a method for establishing an electronic land title registry in accordance with yet a further embodiment of the invention.

Illustrated in FIG. 6 is a block diagram illustrating a basic method for establishing an electronic real estate registry in association with an RAI. Several embodiments of the present invention further develop the systems and methods associated with the electronic real estate registry. Prior to the registration of any real asset to the electronic real estate registry, real property conveyances allowed by law are recorded to the local land court (701) with geographical jurisdiction in association with a certified RAI (702) that is correlated to all attendant documentation subordinated to the land title deed. Subsequent to the land court filings all real assets and attended documentation in association with the certified and recorded RAI can be recorded to the electronic real estate registry (703) wherein subsequent conveyances of registered assets can be assigned in association with a SEAL linked to the RAI associated with the recorded and registered assets.

Figure 11:
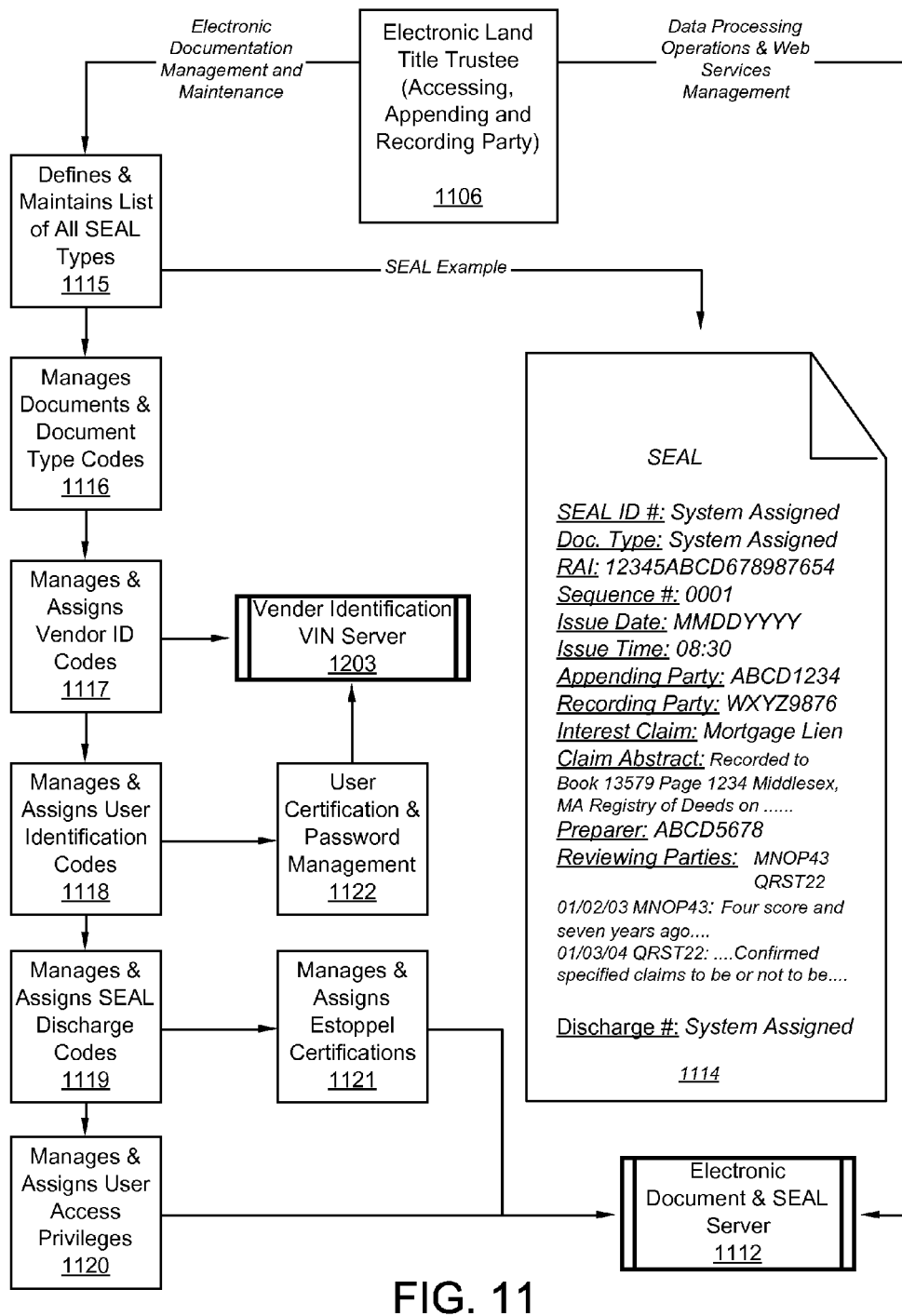
FIG. 11 is a block diagram illustrating electronic documentation management and maintenance, and data processing operations and web services management.
Figure 12:
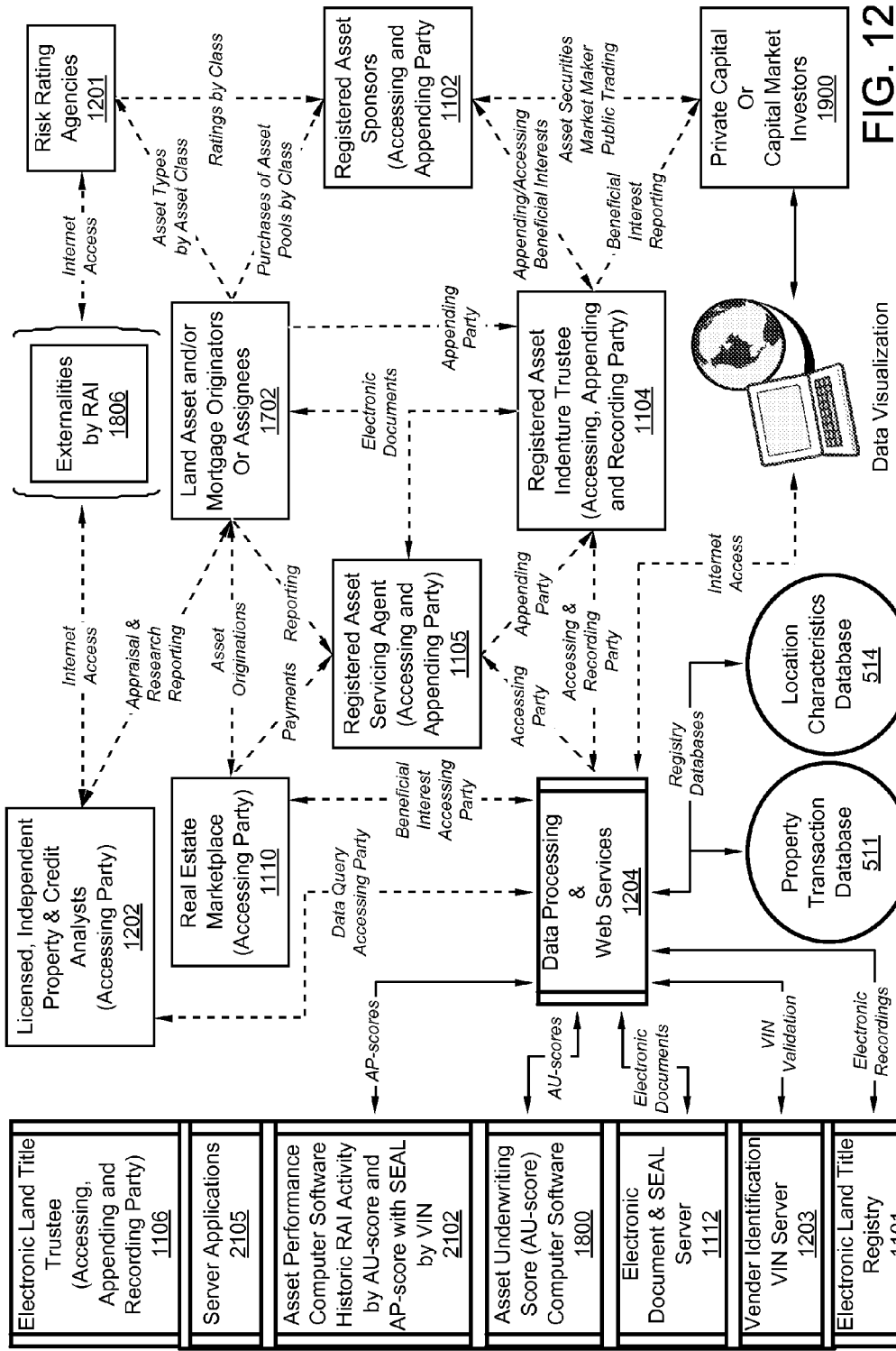
FIG. 12 is a block diagram of various networked electronic computing devices (a computer network) and an associated data flow there between, including various illustrative server applications, delivering software processes, delivering multiple parties interactive data processing, and web services that capture, process, store, retrieve, transmit, report and visually display electronic real estate registry information and documentation according to an illustrative embodiment.
Figure 17:
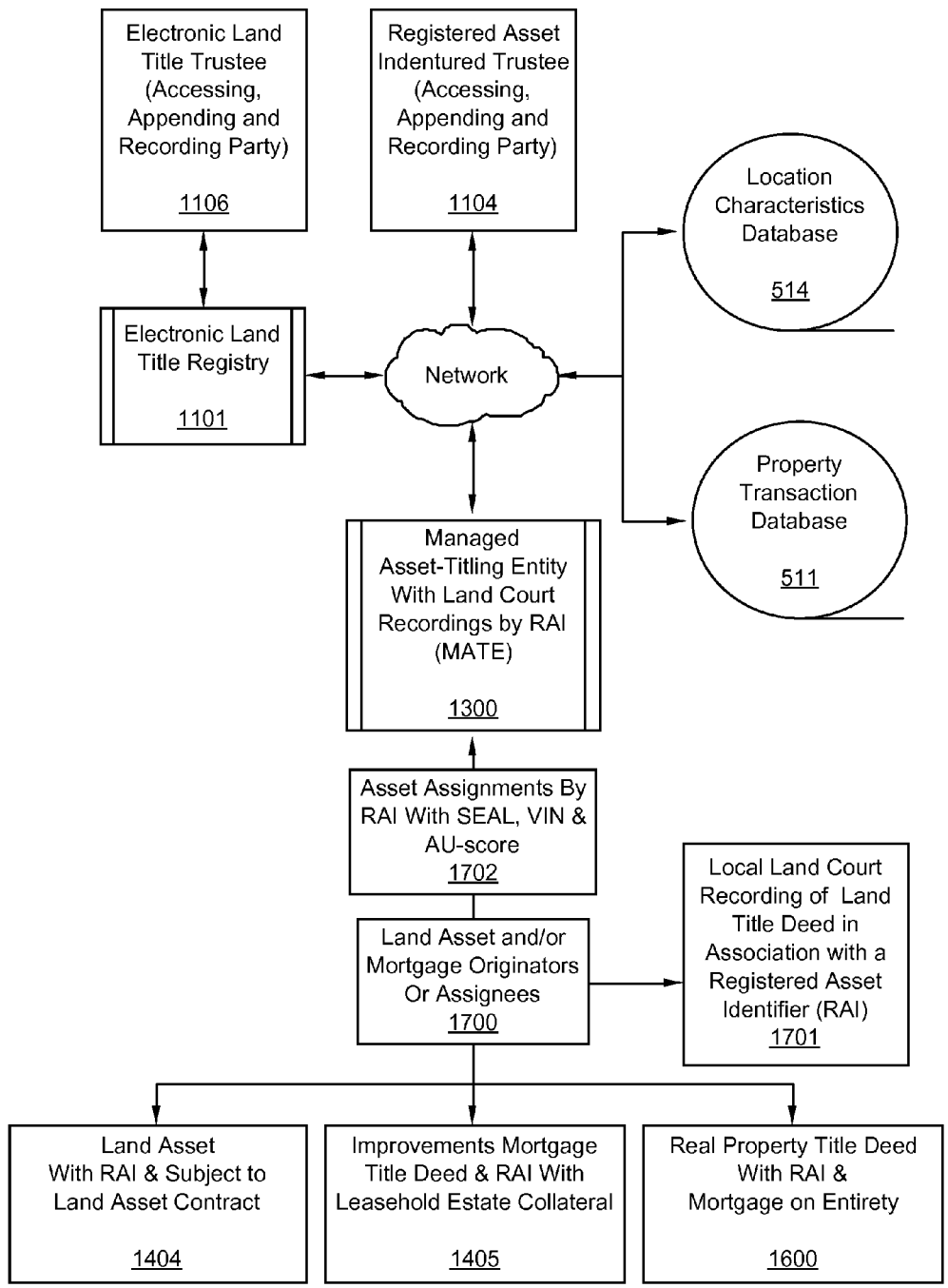
FIG. 17 is a block diagram illustrating three of many possible real property interests that can be personally assigned by way of a MATE for cash or as loan collateral and the mechanism to register real property interests to an electronic land title registry system.
Figure 18A:
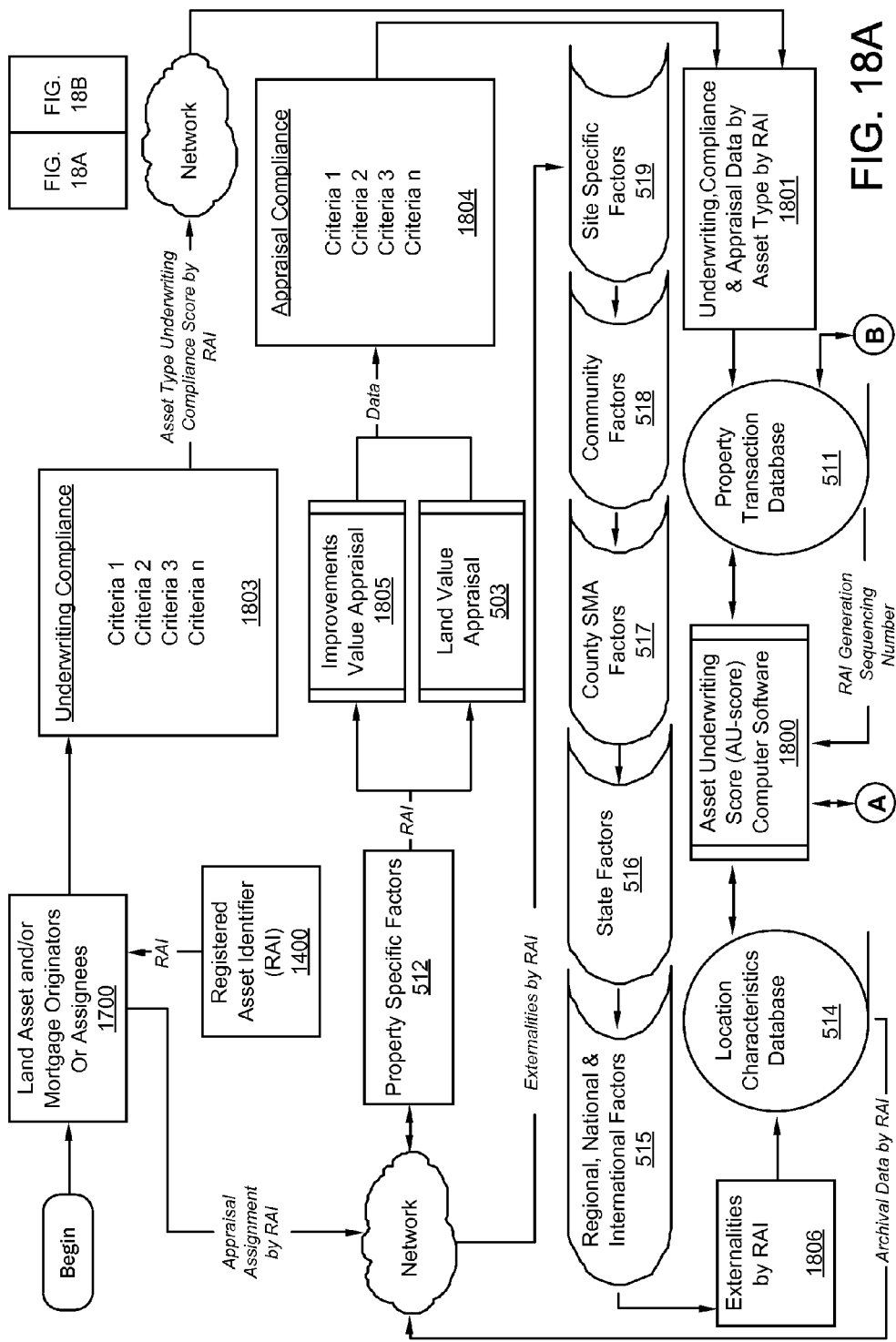
FIGS. 18A and 18B are collectively a block diagram illustrating software products for establishing an Asset Underwriting Score (AU-score) and an Asset Performance Score (AP-score) in conjunction with an Asset Classification Process in association with a land title registry system over a computer network transmitting information and electronic documentation to external database storage devices.
Figure 19:
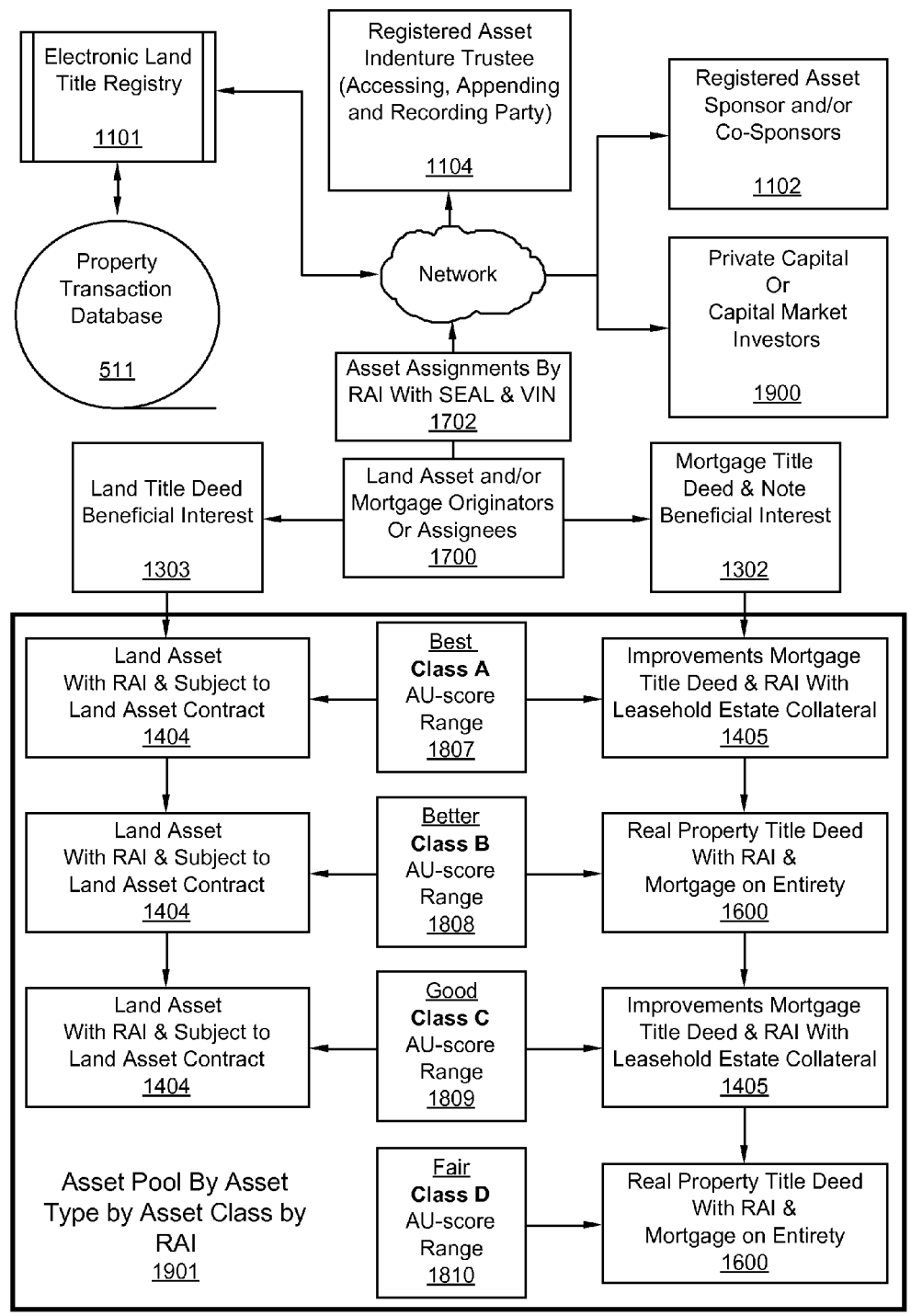
FIG. 19 is a block diagram illustrating how land asset and/or mortgage loan originators might organize an assorted pool of real property beneficial interests and register the beneficial interests assigned to the pool over a computer network connecting the electronic real estate registry system in association with database resources in preparation for future assignments to capital market participants in accordance with a further illustrative embodiment.
Figure 20:
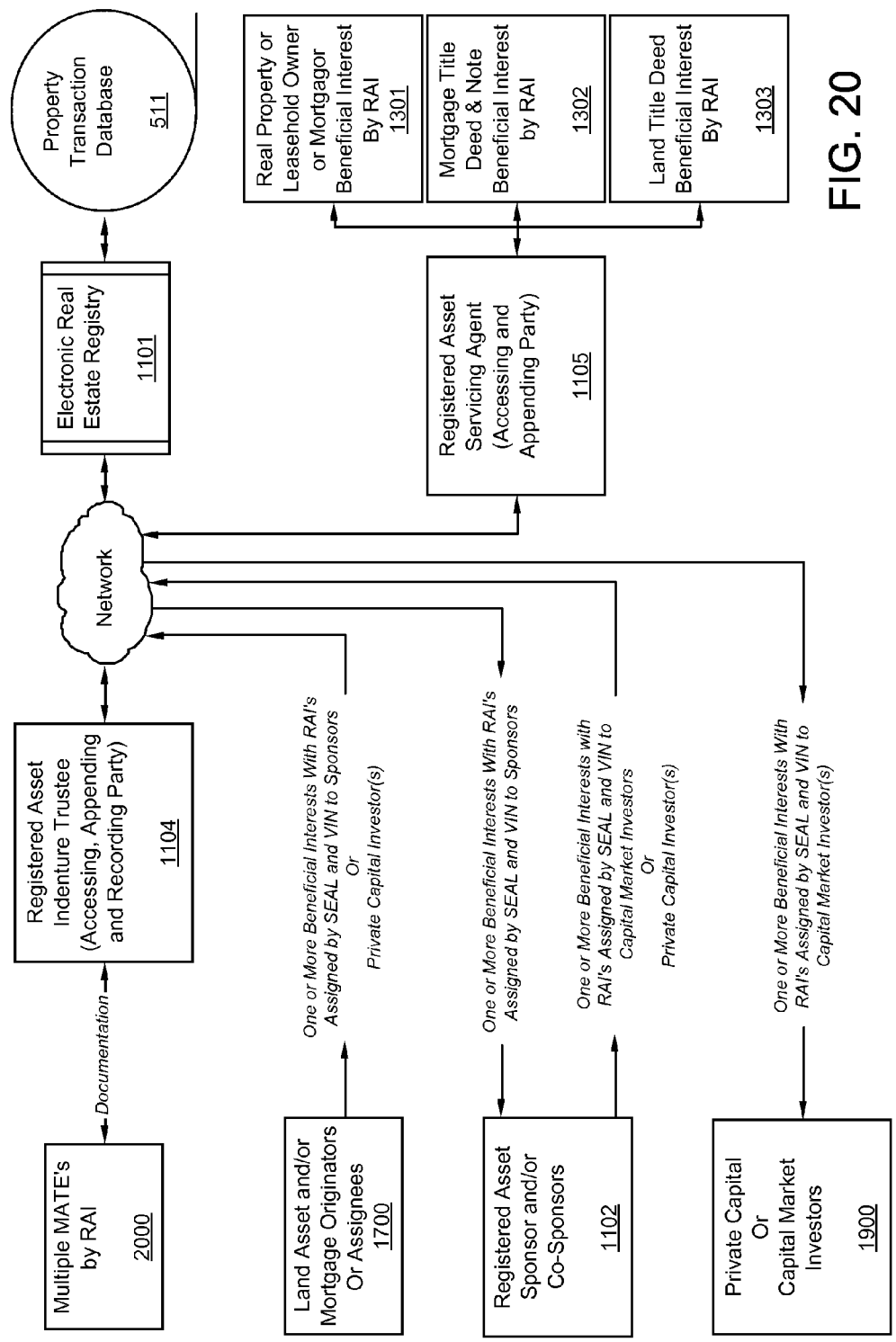
FIG. 20 is a block diagram illustrating how multiple real property assets held or owned by multiple MATE's having each registered asset with each mate identified by an RAI and registered to an electronic real estate registry system in association with a SEAL and VIN by a real asset originator for assignment to a sponsor, who can pool registered assets by type for sale or resale or to private capital or capital market investors, with such transactions transmitted via a computer network connecting a land title registry system in association with database resources.

Among the embodiments of the present invention that reference the electronic real estate registry are: the "Expanded Use of Sequential Equity Allocation Liens (SEAL)" illustrated in FIG. 11; The Electronic Real Estate Registry Server Environment (FIG. 12); Asset Origination by Asset Type (FIG. 17); Asset Scoring and Asset Classification (FIG. 18A); Origination of MATE Assets in Pools for Market Delivery (FIG. 19); Managing "Private Label" Asset Pools (FIG. 20); Visualizing Real Estate Registry Data (FIG. 21C); Secondary Market Integration (FIG. 22); and Disbanding a MATE (FIG. 23).

Private Investors and Capital Market Investors

Figure 7A:
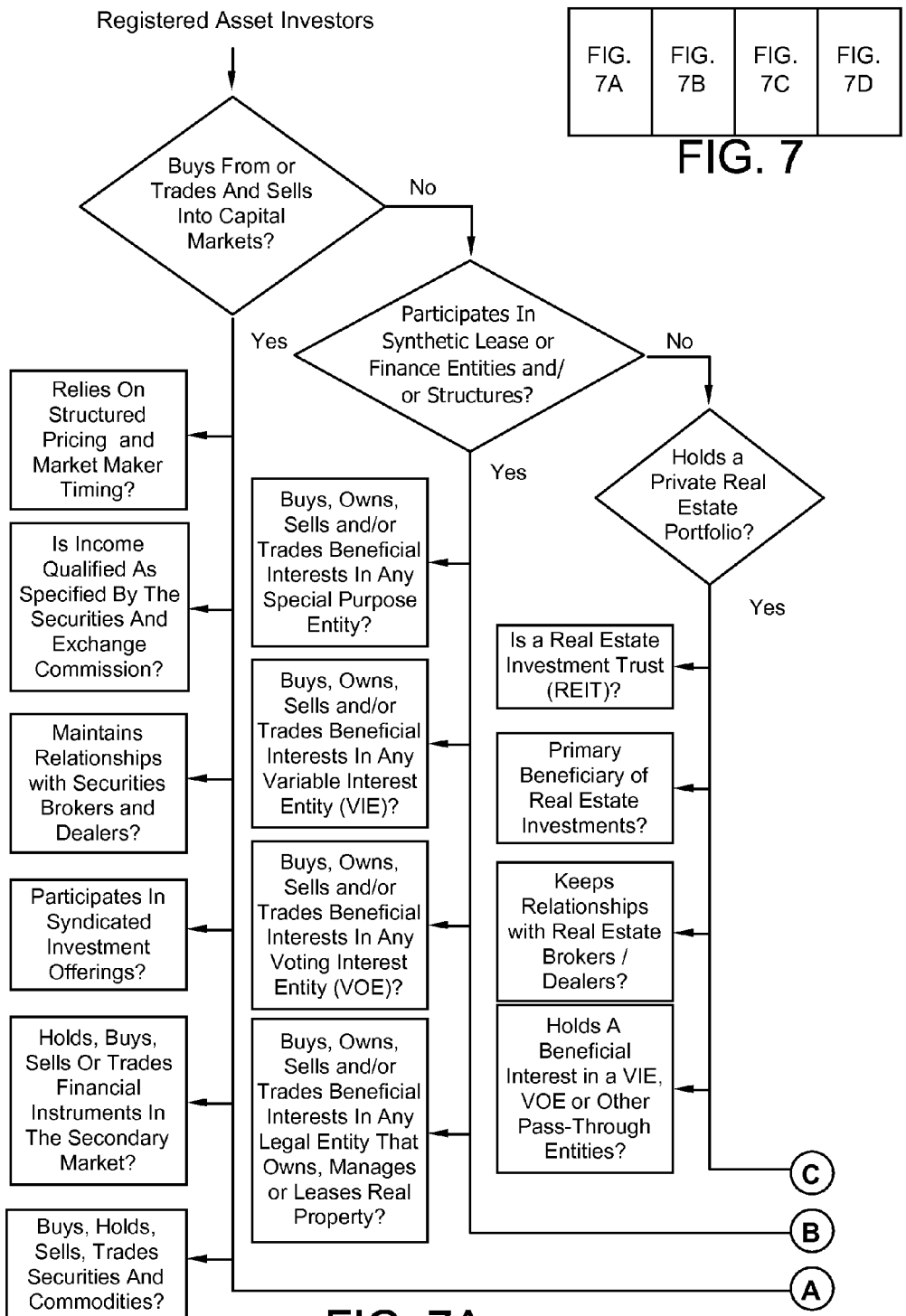
FIGS. 7-7D are collectively a block diagram illustrating examples of registered land asset investor qualifications and considerations.
Figure 7B:
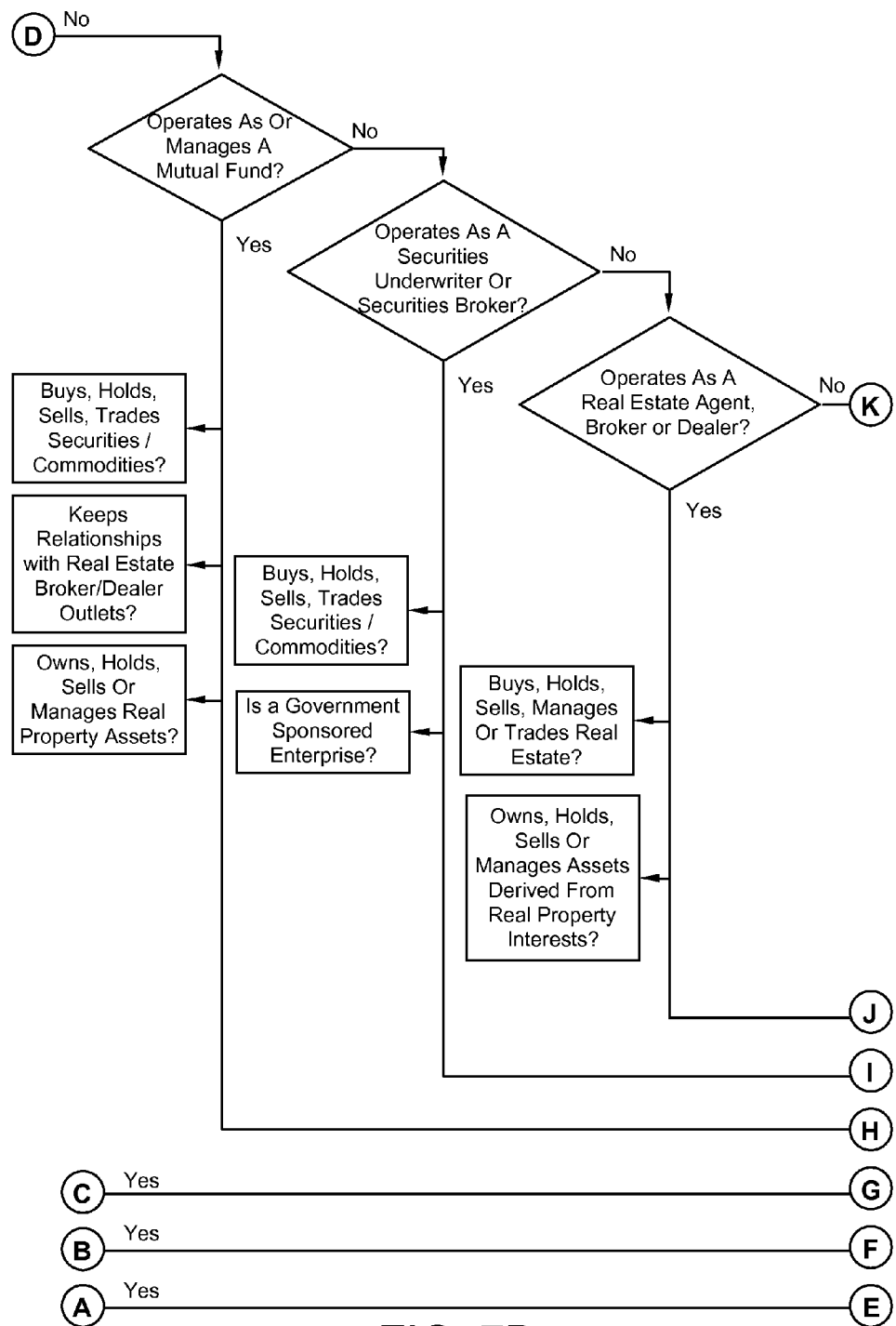
Figure 7C:
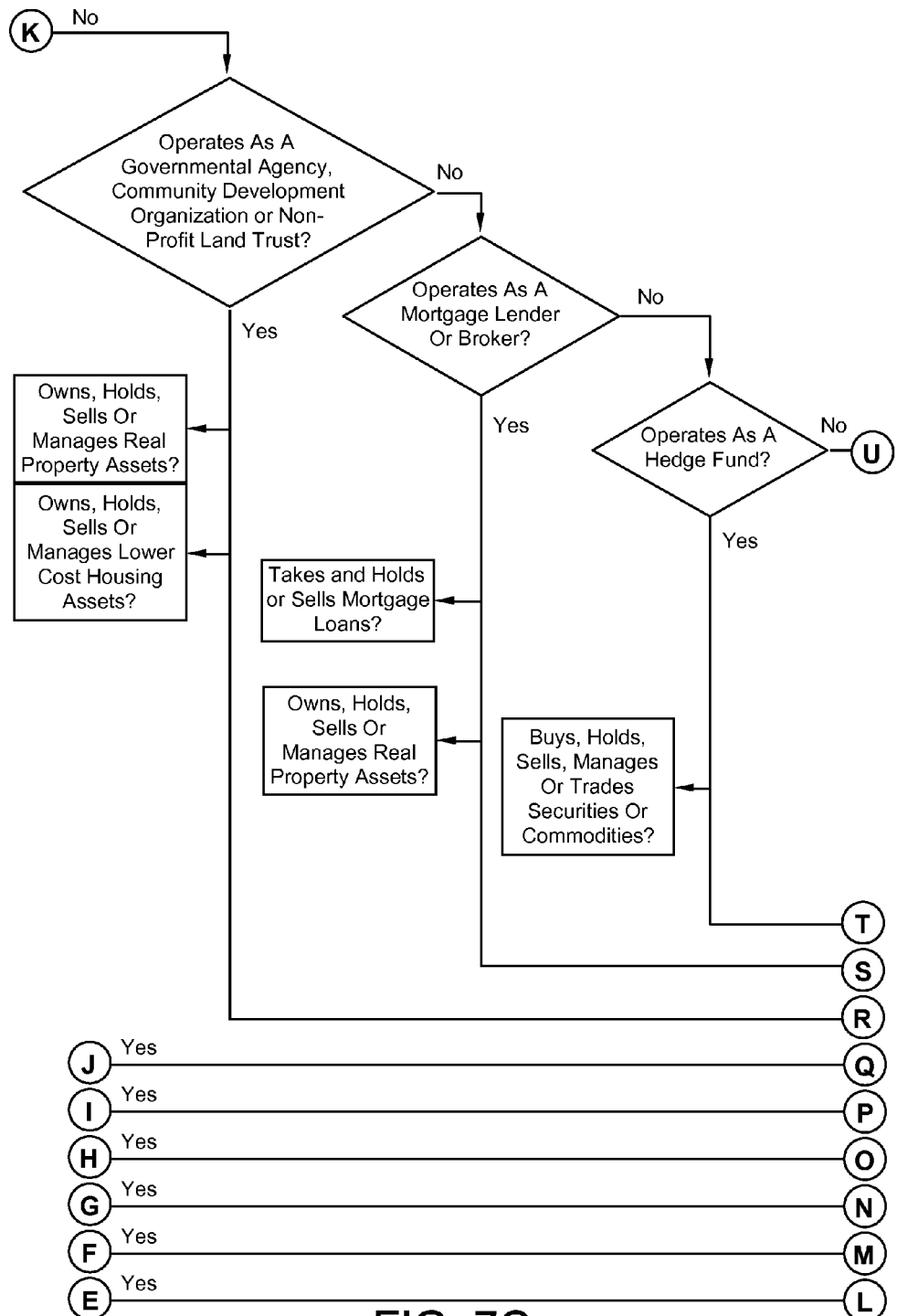
Figure 7D:
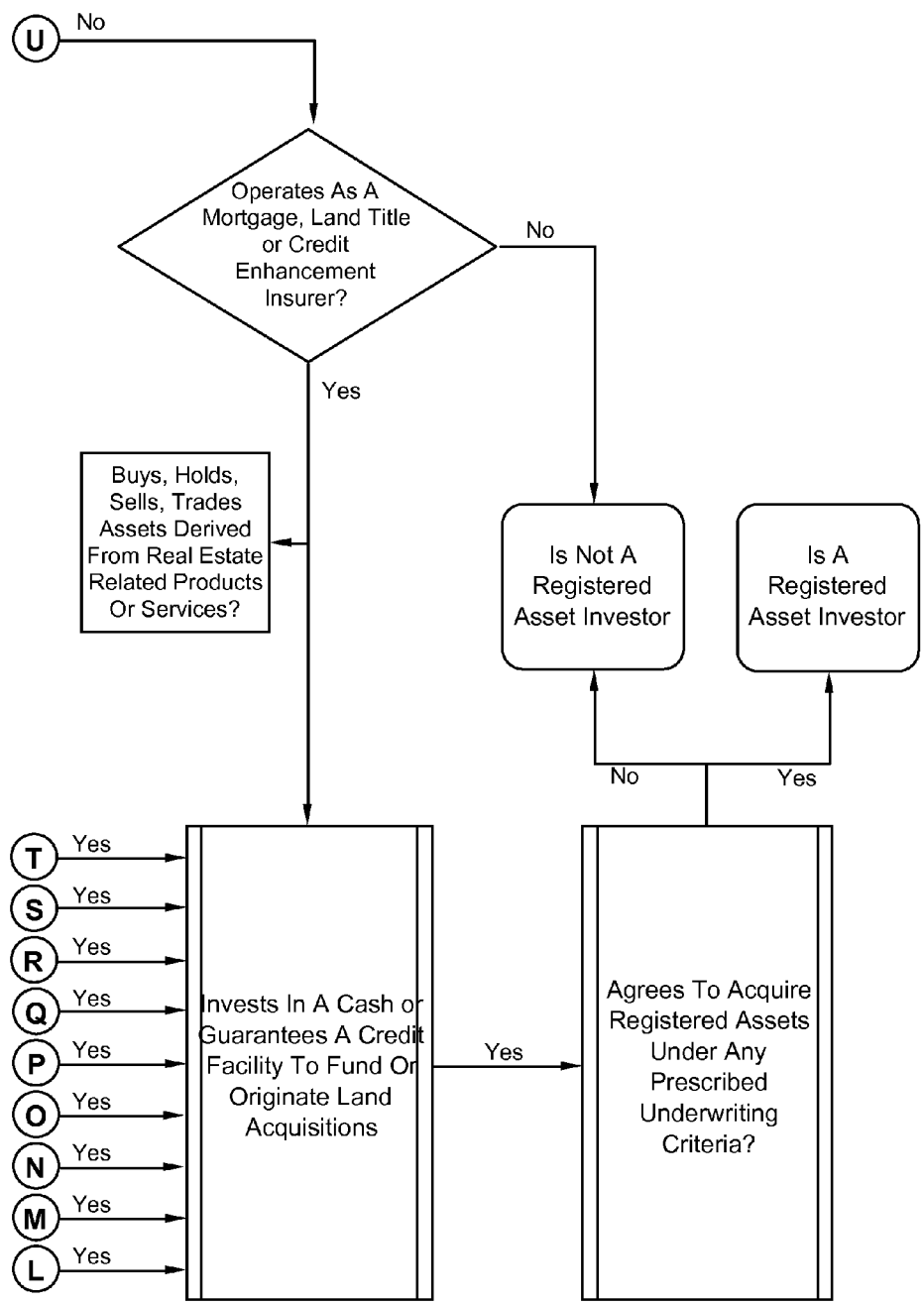

FIGS. 7-7D are collectively a block diagram illustrating what establishes an investor or entity as an investor in real property assets. The present invention applies its systems and methods to prepare and deliver to investors using a computer with access to a network, such as the World Wide Web, useful real property title and registered asset information together with information management systems and methods that deliver useful and timely information on selectable real property interests for evaluation.

Embodiments of the present invention enable high net worth investors that meet the definition of an "accredited investor" as defined in accordance with law, including but not limited to high net worth individuals and institutional investors such as insurance companies, pension funds, and mutual funds to buy and sell real asset interests either individually or in pools allocated by asset type in a manner typically associated with securities. Embodiments further enable home owners, smaller property investors such as real estate mortgagors, developers, and dealers in real property interests to publicly or privately engage in common activities such as like-kind real asset swaps and trades or other conveyances, trade, barter, assignment, purchase or sale of real property assets together with identified interests in such real property assets in a manner typically associated with securities or privately between individuals or entities on a "one-off" basis such as is customary in the real estate industry.

Sponsors and Co-Sponsors

Figure 8D:
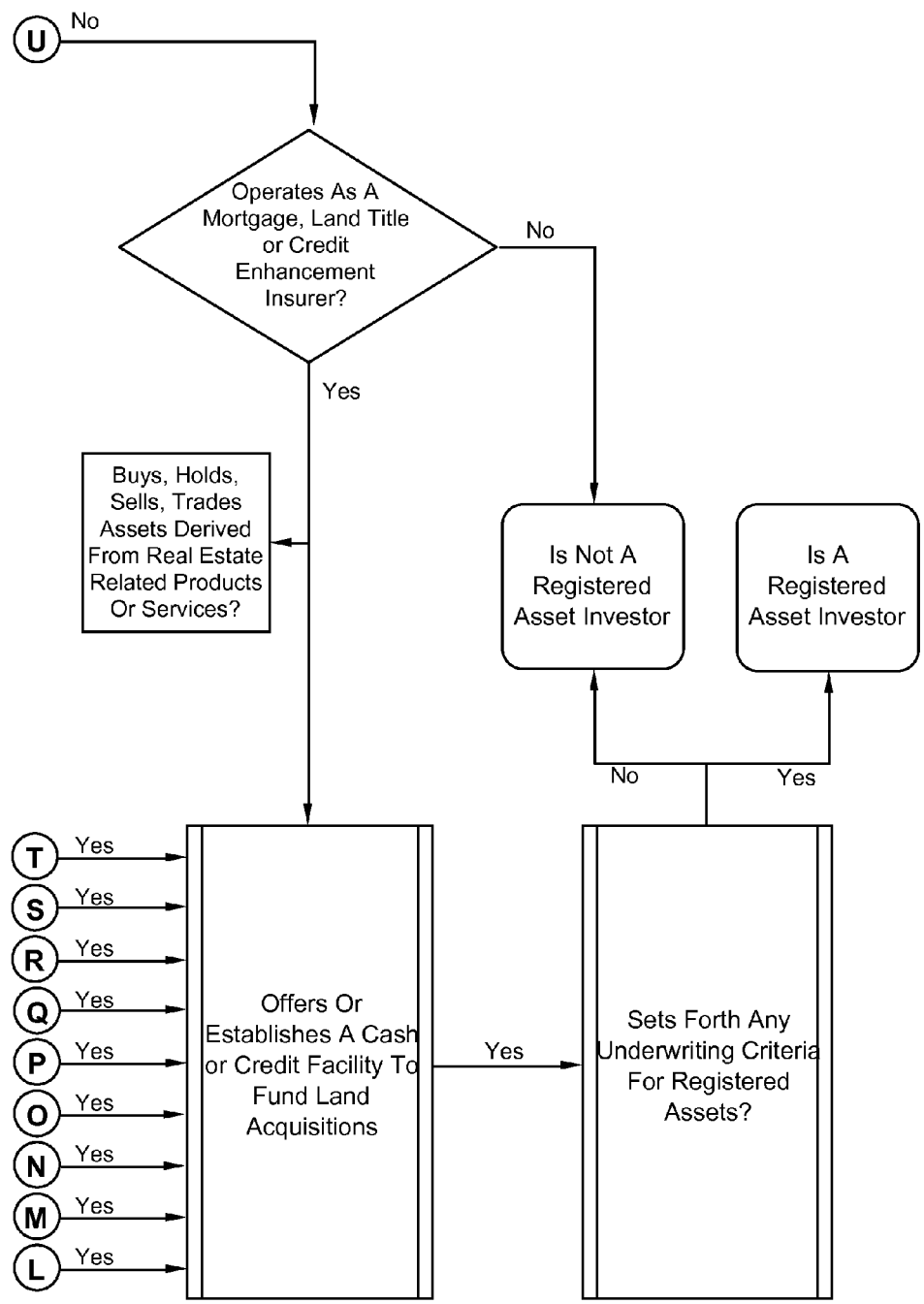

FIGS. 8-8D are collectively a block diagram illustrating qualifications and considerations relative to what constitutes a sponsor of real property assets. The present invention prepares and enables real property interests to be held in book entry form for exchange on an individual real asset basis. The electronic real estate registry enables the clearing of such transactions to occur by capturing, processing, storing, retrieving, transmitting and reporting useful and timely real property information, which includes various forms of trading, barter, assignments, buying or selling of real property beneficial interests between private investors, capital market investors and/or sponsors in a manner typically associated with securities.

The use of embodied systems and methods by sponsors enables an individual sponsor or entity that promotes one market participant to engage with another by providing capital and resources to consummate the conveyance between market participants of real property interests, such as interests associated with a registered land asset or various types of mortgage title deeds or other real property interests either as individual real assets or as collateral for securities such as bonds.

Embodiments of the present invention provide for systems and methods to prepare and deliver to sponsors and co-sponsors using a computer with access to communication networks, such as the world wide Internet, timely and useful title and real asset information relating to selectable real property interests, past and present exchange settlement data, together with information management systems and methods that deliver this useful and timely information on current market valuation and actual market trading prices for evaluation on an individual real asset basis or a range of real property assets and interests offered for sale by individual investors, capital market investors or other sponsors together with co-sponsors, engaged in the business of buying, selling, trading, or otherwise conveying real property interests for a money or other consideration such as like-kind exchanges of real assets.

Interim Pricing Method

Figure 9B:
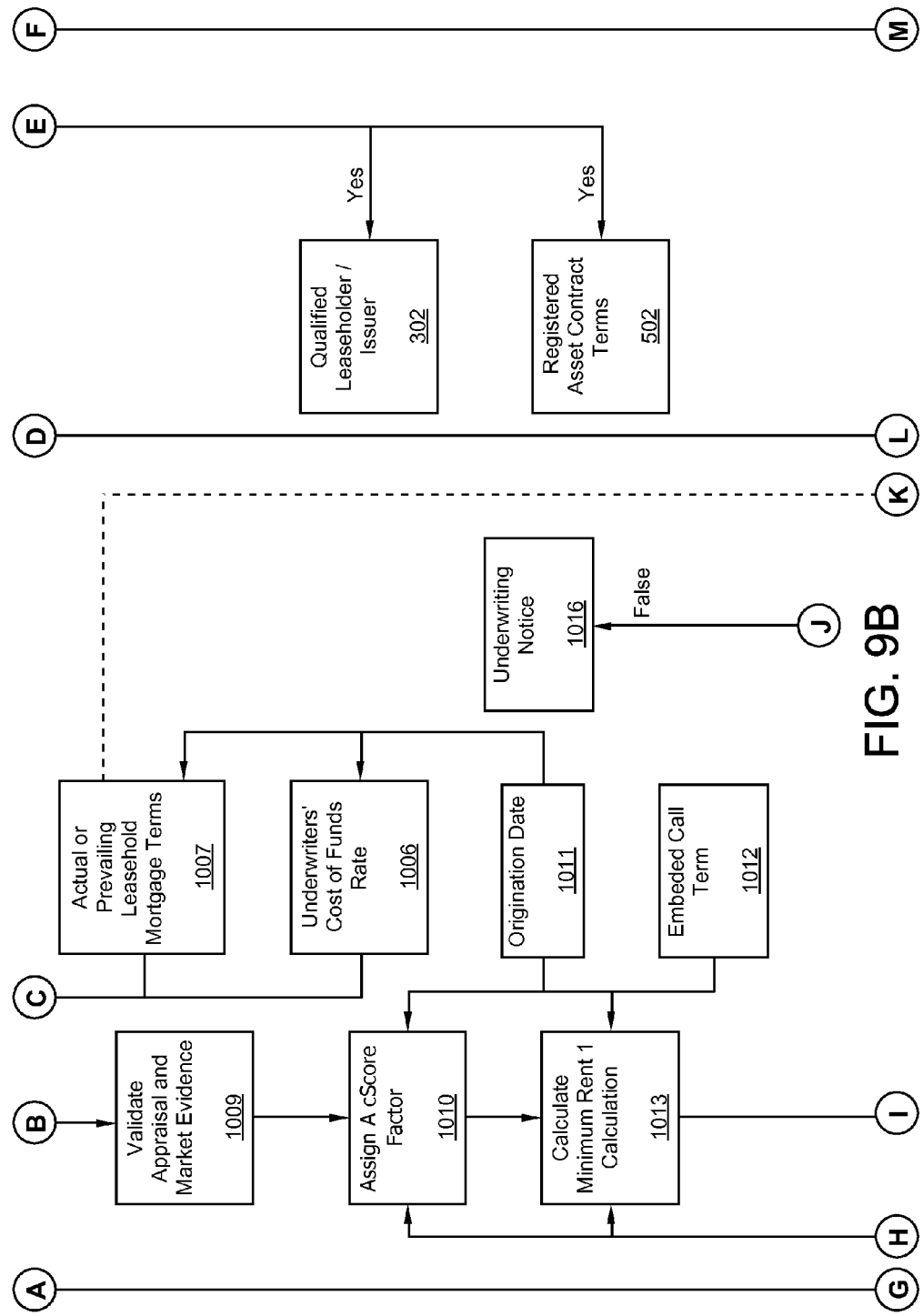
FIGS. 9-9D are collectively a flow chart illustrating an interim pricing method in accordance with another embodiment of the invention.
Figure 9C:
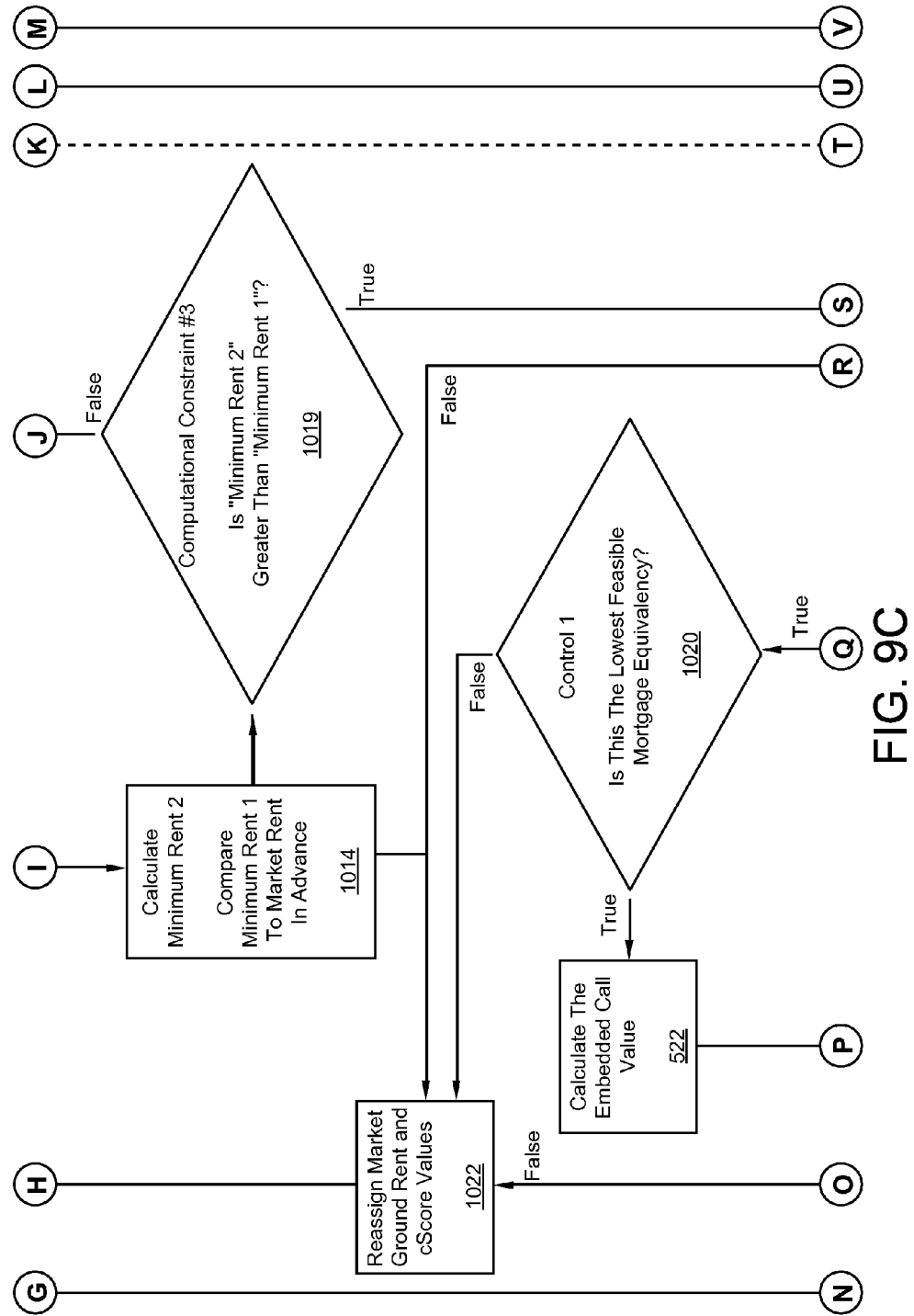
Figure 9D:
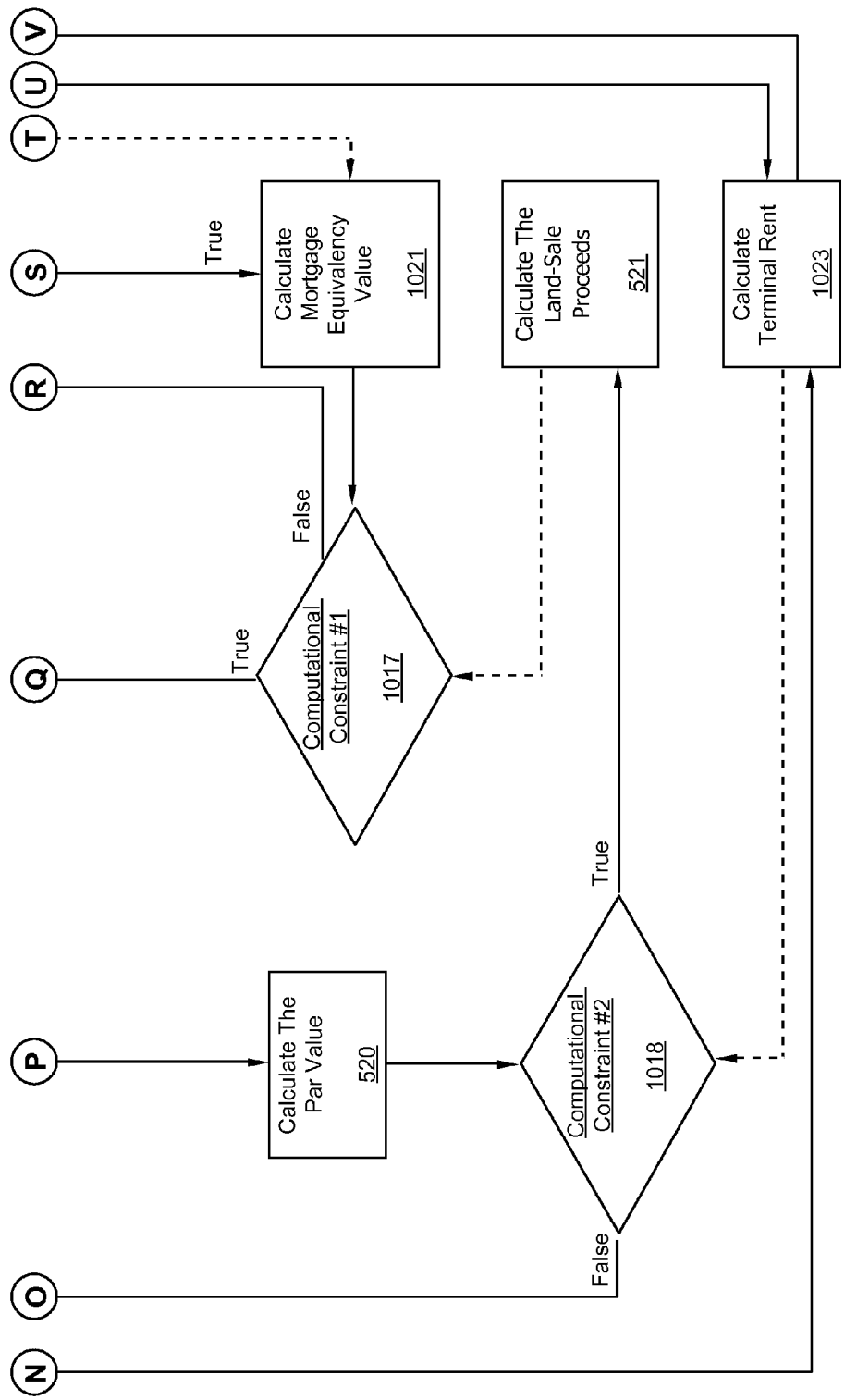

FIGS. 9-9D are collectively a flow chart illustrating an interim pricing method validating registered asset valuation information then calculating pertinent pricing that make registered interests in real property assets suitable for trade in a manner similar to the exchange and settlement of traded securities, while retaining the registered asset's underlying economic characteristics recognizable to real estate users and real property investors needing to measure value relative to the registered asset's fixed geographic location.

The interim pricing computer code operating algorithmic processes embodied within a computer server application (2105 in FIGS. 21A-21C described further below), such as computer software, are a part of a computer program mechanism to determine product usefulness, which is a criteria in determining an registered asset underwriting score that is a further embodiment of the present invention described below and illustrated in FIGS. 18A-18B collectively. The present invention employs computer server applications to expand the functionality of the Interim Pricing Method to create a more robust community scoring (1010) as detailed within a further embodiment of the present invention entitled: Visualizing Real Estate Registry Data (see FIGS. 21A-21C). Detailed formulaic mathematics described in the corresponding embodiment "Interim Pricing Method" of U.S. Pat. No. 7,693,765 and incorporated by reference herein, are summarized as follows:

The mathematical calculations used to create the interim pricing and cScore are recursive in nature, meaning the formulas are best suited to multiple computer-driven iterations that continuously render variables that are subject to multiple constraints until constraint criteria are satisfied, thereby establishing that the leaseholder/borrower is suitable (302) and the product offering is useful for the intended financing purpose. Such determinations produce an allowable registered asset contract with terms (502), otherwise registered asset underwriting processes deny or reject registered asset contract (223) terms.

The objective function, decision variables and computational constraints (1001) can be pre-set or the real asset originator can adjust the settings from time to time, but any such adjustments are embedded as part of the resulting AU-score. In addition to the objective function, decision variables and computational constraints (1001), the real asset underwriter can adjust the land value appreciation rate (1008) to modify the output of the pricing mechanism; any such adjustment embeds into the resulting AU-score.

Marketplace information (1002) derived from a land value appraisal report (501) provides the market fee simple land value (1005) and the market net operating income (NOI) and market ground rent (1003) findings, from which the market land capitalization rate (1004) can be derived. The processor needs any two of: a market land value, a market ground rent or a land capitalization rate for land associated with the registered asset from which the other can be calculated. These factors are validated by the available data in location characteristics data base (514) and the property transaction database (511). The real asset originator provides the actual or prevailing mortgage terms (1007), the cost of money to the real asset originator (1006), the date of origination (1011) (which further ensures the appraisal date and data used for validation are consistent), and the likely land purchase date (1012) that best suits the prospective borrower's economic circumstances.

Marketplace information (1002) is used to validate appraisal and market evidence (1009), before the processor assigns an interim pricing factor (1010) to process the value assigned to "minimum rent 1" (1013) and passing the results to the processor in block (1014), where "minimum rent 2" is calculated and compared to "minimum rent 1" (assumes rent is paid at the beginning of the month in advance).

The rental comparison process (1014) is a true or false result, wherein the false result hands the process off to determine if a new market rent and interim pricing factor (1022) are appropriate and if so, handing off the process back to blocks 1010 and 1013 where the process introduces different beginning (1011) and end dates (1012) as one of several possible adjustment to recalculate and retry new rents. This can become a recursive loop where the rent comparison process (1014) iterates until satisfied, whereupon a true result hands off the process to computational constraint #3 (1019) where tests determine if "minimum rent 2" is greater than "minimum rent 1" relative to pre-set computational constraints (1001).

If computational constraint #3 (1019) is false, an underwriting notice (1016) is made to the real asset originator suggesting a change to one or several decision variables or computational constraints be made (1001). If true, the processor runs a mortgage equivalency test (1021), which determines if the qualifying rent, after conversion into a mortgage loan amount at prevailing mortgage rates and terms (1007), is better used to pay a loan principal and interest. This is one of several "product usefulness" tests to ensure that the land pricing offers greater economic efficiency than a mortgage loan and the test serves to ensure that the real asset originator terms are consistent with the intended purpose for the financing.

The mortgage equivalency test (1021) is a true or false result, wherein the false result passes the process back to adjust the prevailing mortgage terms (1007) and related financing pricing factors to reprocess the rents (a second recursive loop) until the mortgage equivalency test (1021) result is true. Upon a true determination, the process is handed off to computational constraint #1 (1017) where a true or false state is evaluated against a pre-set constraint (1001), whereupon a false result would pass off the process to again reassign ground rent and interim pricing factor (1022), or if true, passes the process off to Control 1 (1020) to determine by way of a separate sub-process if the mortgage equivalency determined previously can be reduced further through rental re-pricing. This validation is yet another check on product usefulness. If the mortgage equivalency (1020) is found not to be suitable (false), the process is handed back to have the rent recalculated (1022). If the mortgage equivalency (1020) is found suitable, the process enters another process that determines the land repurchase price (522), and subsequent to this calculation the process calculates the registered asset par value (520), which is what the investor will pay for the registered asset when and if the registered asset is offered for sale. The land repurchase price (522) and the registered asset par value (520) are passed through computational constraint #2 (1018), which tests the results against pre-set constraints (1001) by a true or false determination, wherein a true finding calculates how land sale proceeds are to be distributed at settlement, which is cannot be modified unless rejected by the real asset originator. Such a rejection hands the process off to reassign market ground rents (1022) and that activates a revalidated of the NOI (1003) data, which can also involve a need to recalculate the results given slight changes to the capitalization rate (1004), the land value (1005), changes to prevailing terms (1007), underwriting cost of funds (1006) or changes to the originations date (1011) or purchase option term (1012).

Finding the NOI valid the process is fed to the processor for calculation of a terminal rent (1023) (adjusted for contract duration) and the results are fed back to computational constraint #2 (1018) to be tested for a pass (true) or fail (false) state. If a true state is found, the process passes off to calculate the final contract settlement price (523), which is fed to the underwriter for acceptance (1024), together with all pertinent criteria used to determine the reported pricing conclusions. Acceptance will generate reports with related finding of borrower/leaseholder suitability (302) and related terms that correspond to that suitability (502) and product usefulness as determined under the mortgage equivalency test (102) for example. Alternatively, a rejection will report that the real asset originator did deny the issuance of a registered asset contract together with data in support of conclusions (223).

System for Exchanging Registered Real Assets

Figure 10B:
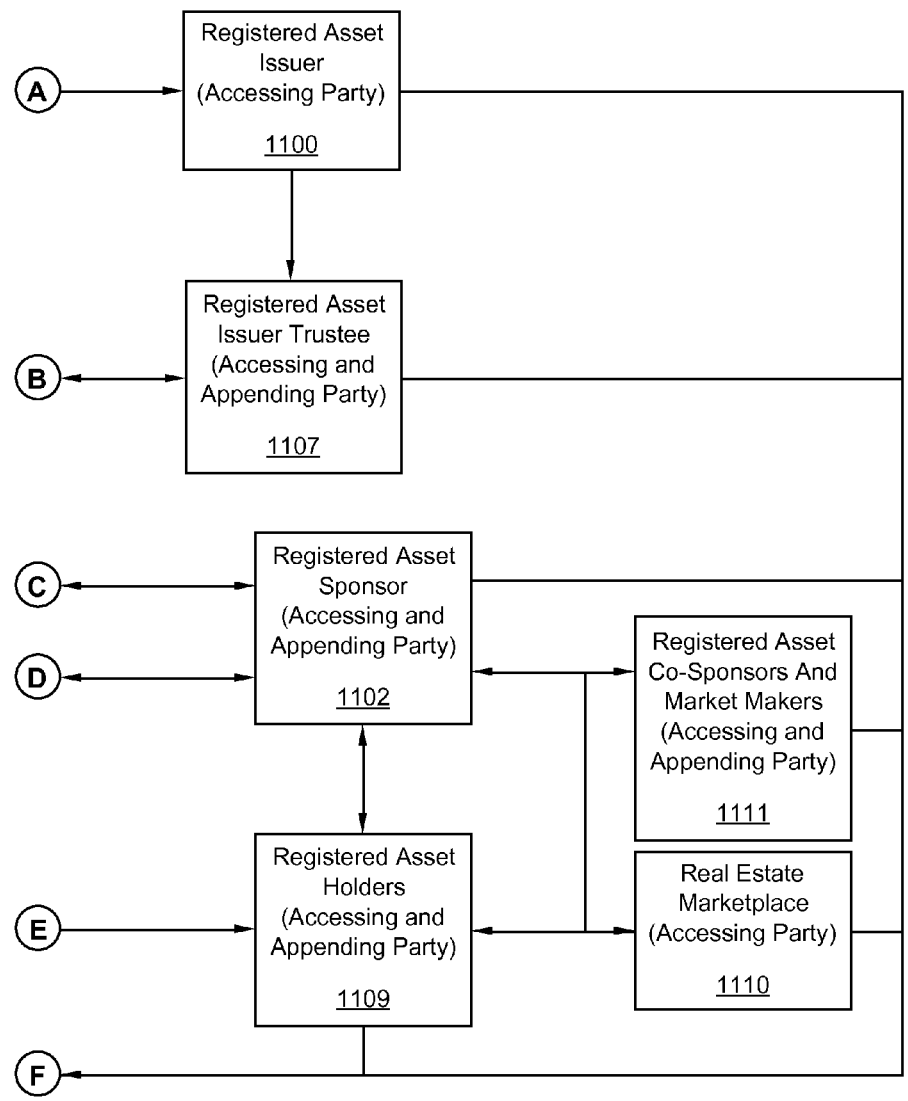

FIGS. 10-10B are collectively a block diagram illustrating a system for providing market participants access to the electronic real estate registry (1101) and corresponding database devices storing property transactional data (511) and location characteristics data (514) in communication over a computer network connecting computerized market participants each holding privileges as accessing parties, appending parties, recording parties, wherein each can hold various access rights that combine accessing, appending or recording privileges as described in greater detail within several embodiments to include: Expanded Use of a Sequential Equity Allocation Lien (SEAL) (See FIG. 11); The Electronic Land Title Registry Server Environment (See FIG. 12); Managing "Private Label" Asset Pools (See FIG. 20); Visualizing Real Estate Registry Data (See FIGS. 21-21C); and referenced within various other block diagrams and flow charts corresponding to the present invention.

The electronic land title trustee (1106) manages the electronic real estate registry (1101). The electronic land title trustee appoints various agents or trustees (1104) to cooperatively record transactions to the electronic real estate registry following prescribed protocols that ensure all recordings are consistently entered and remain auditable. Recording parties have rights to access, append, and record transactions to the electronic real estate registry.

Real asset originator's (1103), registered asset servicing agents (1105), registered asset sponsors (1102) and registered asset cosponsors (market makers) (1111) hold accessing and appending rights provided to them by the electronic land title trustee (1106). Such rights enable these parties to post pending transactions to the electronic real estate registry, to include book entry transactions awaiting clearing. Pending transactions require a recording party, such as the land title trustee (1106) or an agent or trustee (1104) to post an approved SEAL corresponding to pending documentation into the electronic real estate registry's record keeping system as a permanent recording. Registered asset issuer trustee (1107) and registered asset holders (1109) also hold accessing and appending rights granted to them by the electronic land title trustee. A registered asset issuer trustee (1107) is typically a registry trustee approved attorney representing either a lender of an individual holding beneficial interests in registered assets recorded to the electronic real estate registry. Registered asset holders (1109) are typically institutional investors or large individual investors who qualify to transact the exchange of beneficial interests on their own account.

Registered asset issuers can be individuals holding a limited number of beneficial interests in real property recorded to the electronic real estate registry. These parties have accessing privileges granted to them by the electronic land title trustee for as long as they remain in good standing. Among other parties with accessing privileges are in general real estate marketplace participants (1110), which can include governmental regulators, researchers, consumer protection advocates, and others who participate in real estate related activities that benefit the general public. The general public (1108), on an individual basis, can be granted accessing privileges by the electronic land title trustee provided such privileges and access rights are managed judiciously and without malice or adverse consequences to beneficiaries or the general integrity of the computer infrastructure to include software and hardware systems.

Expanded Use of a Sequential Equity Allocation Lien (SEAL)

The administrative roll of the electronic land title trustee (1106) as illustrated in FIG. 11 includes responsibility for maintaining the technological environment controlling the electronic real estate registry system, to include, illustratively, all server applications (2015), registered asset performance scoring computer software (2102), registered asset underwriting scoring software (1112), data processing and Web services (1204) and the vendor identification or VIN server (1203), which is one of several mechanisms that can be employed by the system to certify and track all transactions generated by a plurality of appending parties, accessing parties and a more limited number of recording parties.

The electronic land title trustee also manages and maintains the Sequential Equity Allocation Lien (SEAL) and electronic documentation server (1112) containing a library of electronic documents and forms used by appending parties and recording parties made accessible by a computing device connected to a network such as the world-wide Internet; documents that capture transactional data consistently to provide uniform data structures suitable for parsing data and for comparative analysis of content by internal data processing systems.

A SEAL is an electronic (i.e. numeric, alphanumeric, etc.) label used to identify an electronic document of any type that captures pertinent information relating to the associated document without a need to modify the original, for example an image depicting a property or a facsimile of archival documents, which makes it possible to archive all original and recorded documentation necessary to validate the authenticity of beneficial interest assignments to future holders. This can also be achieved through the use of a MATE described below in the embodiment titled "Creation and Optional Uses for a Managed Asset-Titling Entity".

FIG. 11 contains an illustration of a SEAL (1114) that an appending party of an electronic document will find attached, as a result of a computer process, automatically to become an embodiment upon a filing of record to the electronic real estate registry system. As the preparer uses a computer to complete prescribed document information fields in preparation for a filing, certain fields within the SEAL are automatically populated with data that are system assigned, while leaving other fields, such as the Claim Abstract or the Reviewing Parties fields, to be annotated by the document preparer, reviewer or recording party, wherein certain recording information or amplifications can be recorded to become a permanent log and part of the document's audit trail by way of the SEAL. Each electronic document has a type code that determines the SEAL identification number. In addition to a SEAL identification number, each SEAL captures certain required information, such as the preparing party identifier, appending party identifier, recording party identifier, etc., for a pending document registration to the electronic real estate registry system. The electronic real estate registry management under the direction of the electronic land title trustee may amend or add electronic documents, document type codes, and SEAL specifications.

Each registered real asset transaction illustratively generates a plurality of documents that appending parties will submit and recording parties will record to the electronic land title registry and associated database systems in association with an RAI. The registry and related database systems capture, process, store, retrieve for processing and subsequent display or generate reports on registered documentation in response to RAI postings by appending parties with a valid user identification code (1118) corresponding to a valid vendor identification number (VIN) (1117), and data displays or reporting in response to database queries by accessing parties assigned access privileges (1120). All appending and accessing party privileges require user certification and passwords (1122), which are served by the vender identification "VIN" server (1203) that the electronic land title trustee manages. As with any other "server" described herein the term should be taken broadly to include one or more computing devices. Alternatively a "server" can be defined as the processing and data-handling functionality of a portion of one or at least a portion of each of a plurality of distributed and interconnected computing devices.

The electronic land title trustee is responsible for maintaining all SEAL type codes (1115), which serve as transaction identifying labels. SEAL type codes together with a property specific RAI codes can form a vast numbering system to accommodate billions of transactions. In addition, the electronic land title trustee maintains the electronic documentation library and the corresponding "document type" code reference table (1116). This cataloged library of electronic documentation is available to appending and recording parties to manage data capture ensuring consistent and relevant content. The document type code causes a computer process (i.e. electronic hardware and/or software processes) to automatically generate the appropriate SEAL (1114) to ensure the documentation submitted can be reconciled with future document filings that will be necessary to clear a prior claim or notification. Thus, every document filing has one SEAL that will, in chronological sequence, eventually have a second off-setting document registration having another SEAL that updates or cancels the initial and corresponding SEAL registration. The SEAL identification number is sequenced to correspond to situations where multiple document types, each with a separate SEAL, are necessary to cancel out one initial document type with SEAL. SEAL identification numbers (with sequencing) enable automated matching of documentation types by SEAL identifiers.

A SEAL discharge code (1119) is applied for by an appending party to clear a prior SEAL (associated with an identified document), using a particular documentation type designed to identify specific encumbrances or claims of record to a beneficial interest, that captures facts and evidence supporting the discharge. A SEAL discharge code is a system-assigned number that only a recording party can generate, such as an agent or trustee (1104). The recording party must authenticate the pending discharge of a prior SEAL by recording specified information and findings related to the pending discharge into the electronic discharge form that generates a SEAL discharge number, which in turn automatically populates the discharge number field of each SEAL associated with examined documentation. This audit trail makes it possible to forensically reconstruct any release that is challenged and makes an estoppel certificate (1121) worthy of title insurance when issued to certify the discharge of each and every recorded SEAL.

An illustrative, but basic, operational example of SEAL usage, pertaining to a series of electronic real estate registry recordings made to facilitate the identification, acquisition and aggregation of identified real assets for the purpose of a securitization, is as follows:

1. Assume some number of registered land assets is currently registered to the electronic real estate registry system each in association with a unique RAI and all belong to a single asset class (asset classes are explained in greater detail below). Each registered land asset with unique RAI would have a SEAL corresponding to a land title deed document type, which would identify the initial holder of this beneficial interest. The registered land asset can be a sub set of a larger arrangement of real property interests that could be held or owned by multiple parties or a single entity or private party.
2. A sponsor deliberately chooses a geographically diverse grouping of properties by RAI (see below the embodiment: "Visualizing Real Estate Registry Data") and offers to acquire the beneficial interests consisting of the land title deed associated with each RAI. The sponsor plans to pool these registered land assets as collateral for a future private label security offering. The sponsor may follow common practice and create a special purpose entity (SPE) as the grantee to own each and all the registered land asset beneficial interests identified by RAI. Each seller (grantor) would have prepared, for each respective conveyance of interests in a registered land asset corresponding to an RAI, a "land title deed" document type and SEAL bearing all pertinent data, whereupon a financial settlement could occur between the grantee and each grantor. The conveyance documentation would identify the RAI, the beneficial interests being assigned, the grantor party, the grantee party (the SPE), and other details required by the electronic land title trustee under governing law. Upon recording of these several registrations to the electronic real estate registry, authorized and executed by a recording party such as the electronic land title trustee (1106), each registered land asset would have a second SEAL recorded to the electronic registry with corresponding entries to the property transaction database (511) in association with each RAI.
3. Once the recordings are complete, the SPE will hold the beneficial interests in each land title deed associated with each RAI. The sponsor may then appoint a trustee with authority under an indenture agreement granting the trustee management of the registered land assets for the benefit of investors. To establish a security offering a nine-character CUSIP number that uniquely identifies the sponsor, the SPE and collateral, the trustee, etc. to a particular security, as prescribed by the Committee on Uniform Securities and Identification Procedures.
4. Finally, the sponsor, as an appending party, would need register to the electronic real estate registry the appropriate electronic document type with attendant SEAL to associate the CUSIP and the indentured trustee with each registered land asset in the pool, thereby eliminating the possibility of an intervening filing that might encumber pool collateral and conveying to the indentured trustee the right to convey each and all registered land assets as grantor from the pool to any grantee by simply causing the registration of the appropriate electronic document and SEAL to the electronic registry.

The process to securitize a single land title deed, for example of an expensive commercial site, is basically the equivalent to the above example, but in such case the above example is typically a greatly simplified scenario in that the number of beneficial interests being conveyed and desiring registration is reduced to one in the example, while in the case of a commercial transaction this number is somewhat larger.

The electronic land title trustee is responsible for assigning vendor ID codes (1117) linked to user identification codes (1118) that are linked to user passwords (1122) to create a mechanism that minimizes falsification of identity, all of which is processed by the vendor identification server (1203). VIN identifiers are a type of electronic signature that may be awarded to a vendor based on qualifying criteria. Vendor employees receive a user identifier (1118) and user password (1122) based on competence and other criteria set from time to time by the electronic land title registrar. The use of RAI and SEAL identifiers in combination with VIN identifiers and user identifiers allows the electronic land title trustee (1106) to quickly determine the who, what, when, and why of pending issues concerning any registered real property asset and/or pending issues concerning an identified MATE that might hold or own real property assets for the benefit of third parties wishing to own or convey SEAL-identified beneficial interests free of conflicting rights. The same mechanisms enable governing regulators to access and monitor activity to ensure fair and clear transactions by vendors and the registry system is auditable, transparent, and the underlying information is not misleading.

The Electronic Land Title Registry Server Environment

Embodiments of the present invention employ a real estate registration system together with supporting data processing mechanisms, software products, storage devices and serving technologies to capture, process, store, retrieve, transmit, report and visually display stored electronic real estate registry information and documentation to real estate marketplace (1110) participants that can include buyers and sellers of real property assets; licensed, independent property and credit analysts (1202) that might include real estate brokers, attorneys, survey engineers, title and mortgage insurers, property insurance risk analysts, real property inspectors and market value appraisers; real asset originators (1702) who assist current owners, prospective buyers and borrowers offer and convey real property rights for money; risk rating agencies (1201) that might use registry data to independently evaluate the quality of registered assets used to underlie security offerings; private capital or capital market investors (1900) who can in a prescribed manner exchange, assign, or trade real assets registered to the registry and rely on registry data resources to measure and access capital risks associates with such real asset investments; and registered asset sponsors (1102) who can aggregate real assets by type into pools that collateral securitization offerings to capital market investors. All of whom work independently or in collaboration to prepare, validate, finance, settle, clear and convey real property interests quickly and efficiently, to record the resulting transactions as prescribed by governing law, and to subsequently register real property interests to the electronic real estate registry system by way of a registered asset indenture trustee (1104) or agent who will identify, tag, register and safeguard individual or bundled real property rights, which are linked to real property assets, that the registry system makes suitable for rapid electronic exchange and settlement between grantees and grantors much in the way these same parties might trade securities.

The interactive relationship between market participants as illustrated in FIG. 12, is one where the electronic real estate registry system hosts data processing and web services via a network such as the world-wide Internet to enable accessing, appending and recording parties an ability to interact with others in a collaborative manner while enabling individuals to act severally with the web hosted portal using personal computer devises to access, retrieve and display registered real property information relating to real property interests that they might buy, trade, exchange or in some manner convey for money certain beneficial interests in identified real property that they own or might own.

As will be explained in greater detail in the embodiments to follow, the systems and methods that comprise the present invention generate and communicate usefulness information of high quality that is timely. Current information is material to investor decision making and empowers investors to make decisions based on near-term facts rather than independent third party analysis employing mathematical models and methods that process historic and often unverifiable data to measure registered asset quality or predict market activity; methods that remain opaque to most capital market are real property investors.

Creation and Optional Uses for a Managed Asset-Titling Entity (MATE)

Figure 13:
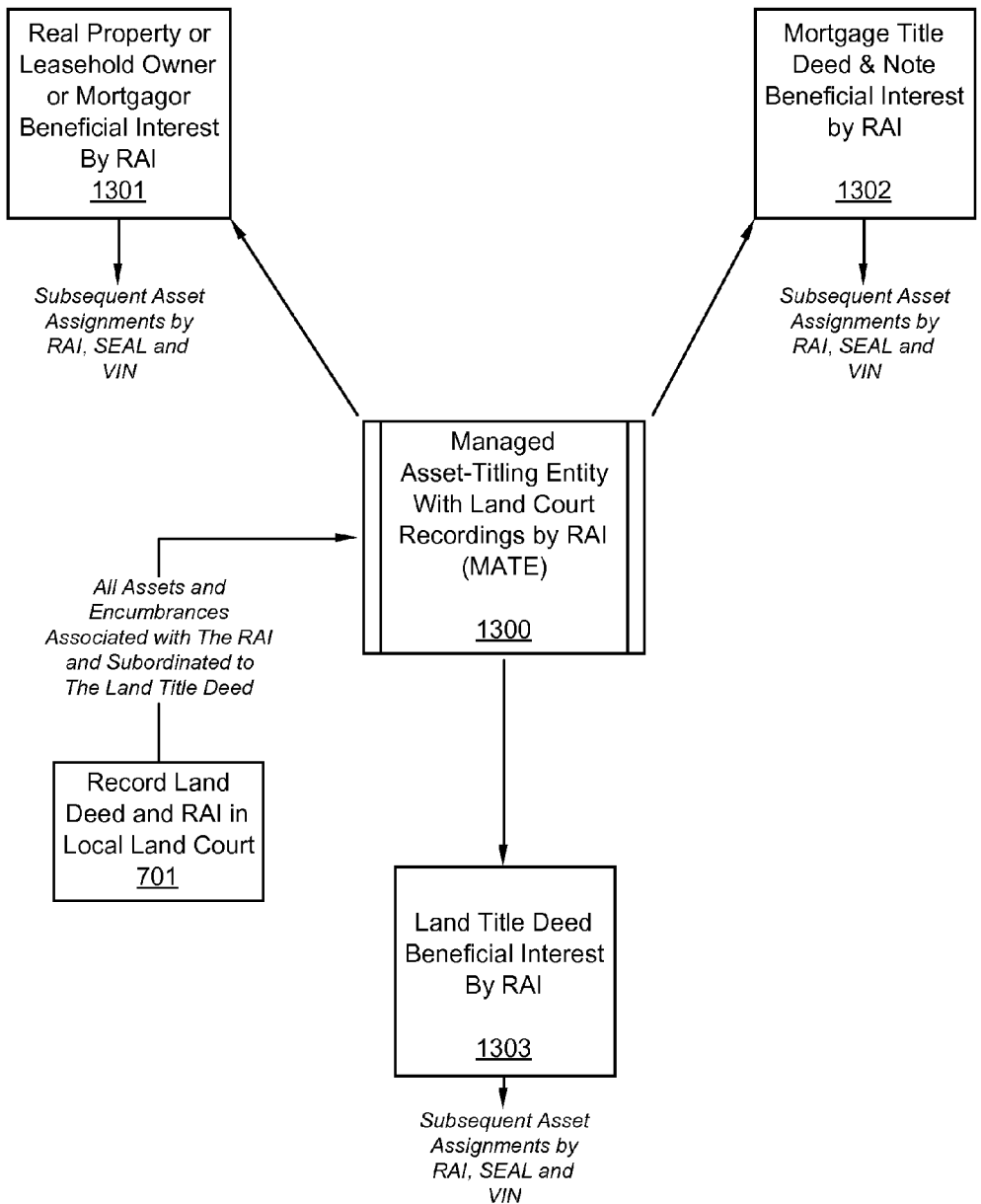
FIG. 13 is a flow chart illustrating three of a number of potential beneficial interests in real property that a managed asset-titling entity (MATE) can serve and protect in accordance with an illustrative embodiment.

Embodiments of the present invention employ an electronic real estate registration system in association with an RAI that can, at the discretion of counterparties to a conveyance of real property, be further associated with a mechanism hereinafter referred to as a managed asset-titling entity (MATE) (1300), which is a legal structure devised to hold or own real property assets remote from activity for the benefit of creditors under a bankruptcy, intervening liens and other encumbrances that might restrict registered asset liquidity. A MATE is governed under an indenture agreement or other contract agreements that provide an agent or trustee powers to manage and dispose of property held or owned by the MATE for the benefit of one or several third party beneficial owners of identified MATE assets. FIG. 13 illustrates for example, a prospective real property buyer can transfer or assign its real property purchase rights to a MATE and, as a condition of title conveyance, offer a creditor a purchase money mortgage collateralized by registered assets held or owned by the MATE. The borrower holds the beneficial interests (1301) and the creditor the legal interests (1302) as of the time of the settlement. Following the financial settlement, the creditor (mortgagor) records to the electronic real estate registry, using the appropriate electronic document type and corresponding SEAL, its collateral interests in the real property thus diminishing the interests registered to the mortgagee and the property rights available for further distribution by a MATE. For instance, if a land asset investor were offered and wants to buy the beneficial interests in the land title deed (1303) held or owned by a MATE and does so before a mortgage loan is given, this would diminish the property rights available in the MATE and the beneficial interests held by the offering mortgagee, thereby limiting the remainder interests in the real property available to a creditor as loan collateral. A MATE holds or owns real property assets resulting from a specific conveyance of real estate to include all attendant title deeds and financial instruments recorded to the jurisdictional local land court records in association with a prescribed RAI, which further serves to identify the MATE that can hold or own the real estate assets at the time of its creation. The MATE servers several business purposes; among these are documentation management in association with electronic transactional information, segregating of taxation records, registered asset management, and among other purposes, the MATE serves to protect real property assets associated with the MATE from third party claims. The MATE is an independent entity legally structured and managed to shield its real property and related chattel holdings from legal challenges, such as, for example, a legitimate claim by creditors seeking recovery from a beneficiary under a bankruptcy or from creditors seeking to encumber the property of a beneficiary with a lien or judgment (2300). Such matters are kept external to the MATE and made attributable to one or several beneficiaries with rights to certain MATE assets when the agent or trustee validates judgments or liens on interests held by beneficiaries and records to the electronic land title registry the appropriate SEAL in response, which either redirects cash flows or encumbers specific beneficial interests until such time as the judgment or lien is satisfied by the beneficiary, when the appropriate SEAL is registered in evidence of satisfaction, or the underlying MATE assets are disposed of by the agent or trustee who reapportions real property rights or allocates cash proceeds to beneficial SEAL holders in exchange for discharges (2301) as a mechanism to perfect the titles of registered assets for conveyance out of the MATE.

Variation of Underlying Asset Types

Figure 16:
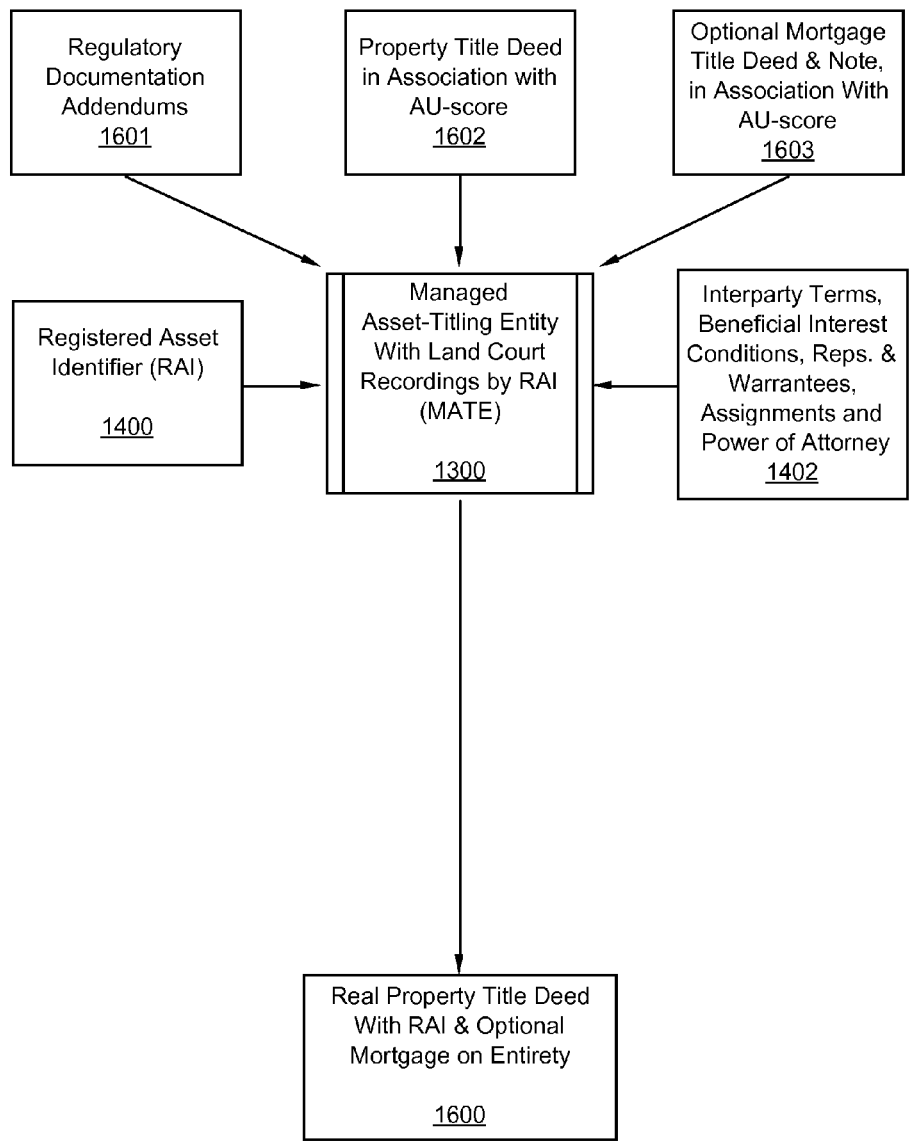
FIG. 16 is a flow chart illustrating how a an undivided real property interest can be held or owned by a MATE together with the appropriate contractual documents that make MATE-held or owned real property interest individually assignable to third parties as personal property at any time.

As will be explained in more detail below, real estate assets can offer a wide range of assorted rights, and such rights can be distributed to multiple holders with each holder retaining different or even shared rights. The potential variety of real estate assets that can be held or owned by a MATE (1300) forces the use of a selected few examples of registered asset types to describe the systems and methods of the present invention. For example, a landowner can sell its real property interests to a prospective buyer who can pay all cash or could among other mechanisms finance the real property purchase with some combination of cash from savings and money borrowed from creditors. FIG. 16 for instance, illustrates how many residential real property buyers borrow funds to supplement cash from savings by offering creditors a mortgage loan collateralized by the entire property (land and improvements thereon) (1602). These "whole loan" type transactions, herein referred to as real property mortgage title deeds and notes (1600), can be recorded in association with an RAI, a SEAL and a VIN to be held or owned by a MATE (without a MATE necessitates the electronic registration of local land court recording facsimiles each assigned a specific electronic document type in association with a SEAL) to the electronic real estate registry thereby evidencing the registry basis of a note and mortgage title deed that conveys the legal interest in the land and the improvements thereon as loan collateral (1603) to the creditor, typically retaining for the borrower a beneficial interest in the entire property title deed by identifying such interests as a right to occupy, to maintain, and the right to pay off the note over a set time frame, wherefore the borrower receives from the creditor the fee simple interest in the entire property upon satisfaction of the note. Until such time a mortgage title deed and note (1603) are satisfied, the beneficial interests in mortgage loan assets owned by a creditor may be held in a loan portfolio or assigned by the creditor to sponsors or others who aggregate loan pools as collateral for bonds or securities that usually are sold to capital market investors, which enables the creditor to recover its operating capital to make another mortgage loan.

Similarly, should a property buyer or fee simple owner decide to issue a land asset contract, as illustrated in FIG. 5 incorporated by reference herein, they generally covey just the land title deed encumbered by contract land rights granting the leasehold estate land lease rights and/or an option to purchase the land at some future time and price (1405). FIG. 14 illustrates how a property buyer or fee simple owner receives from the seller two deeds, wherein they can sell the land title deed (1404) interest (separate from an improvements title deed (1405) interest) to either a real estate investor, a land asset sponsor, or a creditor who then conveys money to the property seller in exchange for the land title deed portion. The property buyer purchases or a fee simple owner retains, as the case can be, a separate improvements title deed together with certain contract land rights, which can be pledged as collateral for a mortgage loan (1403) that is typically smaller than a real property mortgage title deed and note (1600). In practice, for example, an all cash buyer can elect to sell its land title deed interests for cash so to reduce the capital outlay necessary to own the utility of the above ground real assets claimed by the improvements title deed. Alternatively, FIG. 15 illustrates how a leasehold estate owner can also own the separate land asset without a mortgage loan, thus holding the fee simple interest in the land title deed subject to the lease and purchase option rights that flow to the leasehold estate (1500), which is available to be offered separately as mortgage loan collateral.

Asset Origination by Asset Type

Real asset originators (1700) (creditors) cause the origination of many types of real property-backed assets, and as illustrated in FIG. 17, among these are a land asset subject to a land asset contract (1404), an improvements mortgage title deed collateralized by a leasehold estate (1405), or a real property mortgage title deed and note collateralized by land and building thereon (1600), wherein each "asset type" is conveyed in association with an RAI (1400). In addition, the land title deed originates in association with an AU-score (1401), each improvements mortgage title deed originates in association with an AU-score (1403) and each real property mortgage title deed and note collateralized by land and building thereon originates in association with an AU-score (1603). Origination of other registered asset types, to name several, can include certain identifiable leasehold interests, identifiable fee simple interests with or without encumbrances, or a purchase option right to an identified real property interest, also require an association to an RAI.

Real asset originators record to the jurisdictional land court all requisite documentation for each real property conveyance to preserve and protect the interest of all parties, together with an RAI in association with each deed (1701), and each real property conveyance can name the agent or trustee (1104), illustrated in FIG. 10 and incorporated by reference herein, as the real property title nominee and as the appointed fiduciary engaged to manage the MATE (1300) that is legally established at the time of origination to hold or own the real property assets, following the approval of a regulating party, for example, the electronic land title trustee, (1106) authorizing a subsequent registration to the electronic real estate registry system (1101), which is in communication over a computer network that extends communication to a location characteristics database (515) and a property transactions database (511), (also see illustrations FIGS. 4A and 9A incorporated by reference herein), to which the MATE is registered and registered by the identical RAI that as was recorded to the local land court with jurisdiction over the real property conveyance. The MATE holds or owns the real property and attendant chattel assets associated with the RAI linked to the deed that the real asset originator previously recorded at the local land court. Subsequent to the land court filings, real asset originators assign to the newly created MATE the rights and title to the deed(s) (1401) (1501) (1602), mortgage title deeds and notes (1403) (1603), lease (603) and purchase right contracts (602) (if applicable), land asset contract addendums (601), illustrated in FIG. 5 and incorporated by reference herein, or other prescribed regulatory documentation (1601) and interparty terms, beneficial interest conditions, representations and warrantees, assignments and a power of attorney given by each beneficiary the MATE agent or trustee (1402), which conveys to the agent or trustee the necessary rights to dispose of any or all registered assets under its management that the holds or owns.

Asset Scoring and Asset Class Creation

Illustrative embodiment herein accommodate the electronic storage and handling of various types of new real property-backed investment types, which offer investors diversity through disparate capital risks. Real property "asset types" can be very different, even those that share very similar features such as can be found in a pool of mortgage loans sharing nearly equal terms. Pooling mortgage loans can mitigate some investment risks if the pool contains a discernible mix of registered asset qualities. Generally, the absence of transparent information necessary to measure registered asset quality has brought about the use of registered asset groupings commonly referred to as tranches. Tranching uses a rather complicated mix of risk mitigating strategies principally methods that allocate riskier instruments into registered asset sub-pools sorted and mixed by such features as cash flow characteristics, or geography, or ranking by loss exposure potential, or by lender underwriting standards, (using names like "No Doc", "Liar Loans", Sub-Prime, "Alt-A", Conforming, Non-Conforming and other terminology that can easily be misconstrued by an investor).

Financial institutions satisfy their capital requirements by investing in securities (which can include mortgage-backed securities) that received favorable ratings by one or more of the recognized and regulated rating agencies such as Moody's Investors Services, Standard & Poor or Fitch. Investors too rely heavily on rating agencies to analyze and rate mortgage pools. Investors can utilize information from a single agency or from multiple rating agencies. Investors expect credit rating agencies to provide objective information based on sound analytical methods and accurate statistical measurements and that the securities comply with rules and regulations set forth by governing bodies. The theory is that these rating agencies are better equipped than are financial institutions or investors to scrutinize mortgage pool diversification and tranche risk based on certain favorable and not so favorable characteristics of the registered assets that comprise the pool and related tranche positions. Agency ratings follow a somewhat complicated risk-ranking nomenclature beginning with the rating of "AAA", the highest ranking given to any bond. The three major credit ratings agencies all use this three-letter code to denote that a bond is as safe as any bond can be. Moody's ranks bonds with the following codes: Aaa, Aa, A, Baa, Ba, B, Caa, Ca, C. Fitch and S&P use the following codes: AAA, AA, A, BBB, BB, B, CCC, CC, C, D. All three major agencies sometimes use "intermediate" scores such as BBB or BBB-. Characteristics such as loan to value, duration, quality of documentation, or cash flow play a role in how rating agencies view and rank pools of mortgage loans that are aggregated by tranche and used as collateral for mortgage bonds that are sold into the capital markets. As ratings descend from AAA, so do the favorable risk characteristics. To offset higher risk, investment yields rise and investors choose investments based on their tolerance for risk.

Investors love certainty, the "Holy Grail" (i.e. long-felt need) of investment information is accessible data that is useful, timely, relevant and reliable. Unfortunately for investors, real property assets are a heterogeneous mix that trade infrequently making the measurement of market value a more tenuous concept then say exchange traded equities. For creditors and mortgage insurers who need to measure credit risk, measuring property value is understanding what the property might sell for to the second-highest bidder should liquidity become necessary following a loan default and the creditor needs to exercise its rights conveyed under the mortgage title deed. The idiosyncrasies that are a part of every real property transaction are elusive and automated valuation models, which employ econometric models to estimate the influence on price that a buyer or seller attaches to a particular feature or characteristic, can easily produce misleading valuations.

Automated valuation models (AVM) are dependent upon the use of accurate, comprehensive, and in timely data, which has been difficult to gather and validate. Data issues can include incomplete public records, insufficient sales of properties with comparable features within a specified geographic area, and a lag between the time when the market data are current and the AVM uses the data to generate an estimate of value. In addition, AVMs cannot be used to determine the physical condition and relative marketability of a property. And, perhaps their most important weakness is that AVM's can never fully incorporate the breadth of knowledge and judgment of a skilled appraiser.

Embodiments of the present invention capture land pricing when the creditor verifies its real property, market value appraisal as of a date that is nearly concurrent to a likely property conveyance settlement date. A standard residential property appraisal form (most typically convey electronically) allows the appraiser to value the land separately from the improvements. Illustrated in FIG. 4 and described in the corresponding embodiment "Property Valuation and Registered Asset Pricing" of U.S. Pat. No. 7,693,765 and incorporated by reference herein, the appraisal assignment that would best suit the present invention asks the appraiser to support their land value opinion with reproducible market information. Acceptable are direct comparable sales or opinions that are mathematically derived using generally accepted land residual value techniques based on rents or sales of comparable property transactions that can be verified. Certain properties will require language in the valuation assignment requiring man-made improvements associated with the improvements title deed to include an opinion of reproduction cost new, adjusted for physical and functional obsolescence. Data supporting this value opinion approach will require either comparable sales analysis and/or an income approach to value that offers appropriate support for value conclusions. The market value appraisal of the land and the improvements above the land are one of several variables used in developing the AU-score, the usefulness of the verifiable information used in the report and the comments of the creditors' review appraisal report all contribute to the AU-score of appraisal compliance (1804).

Figure 18B:
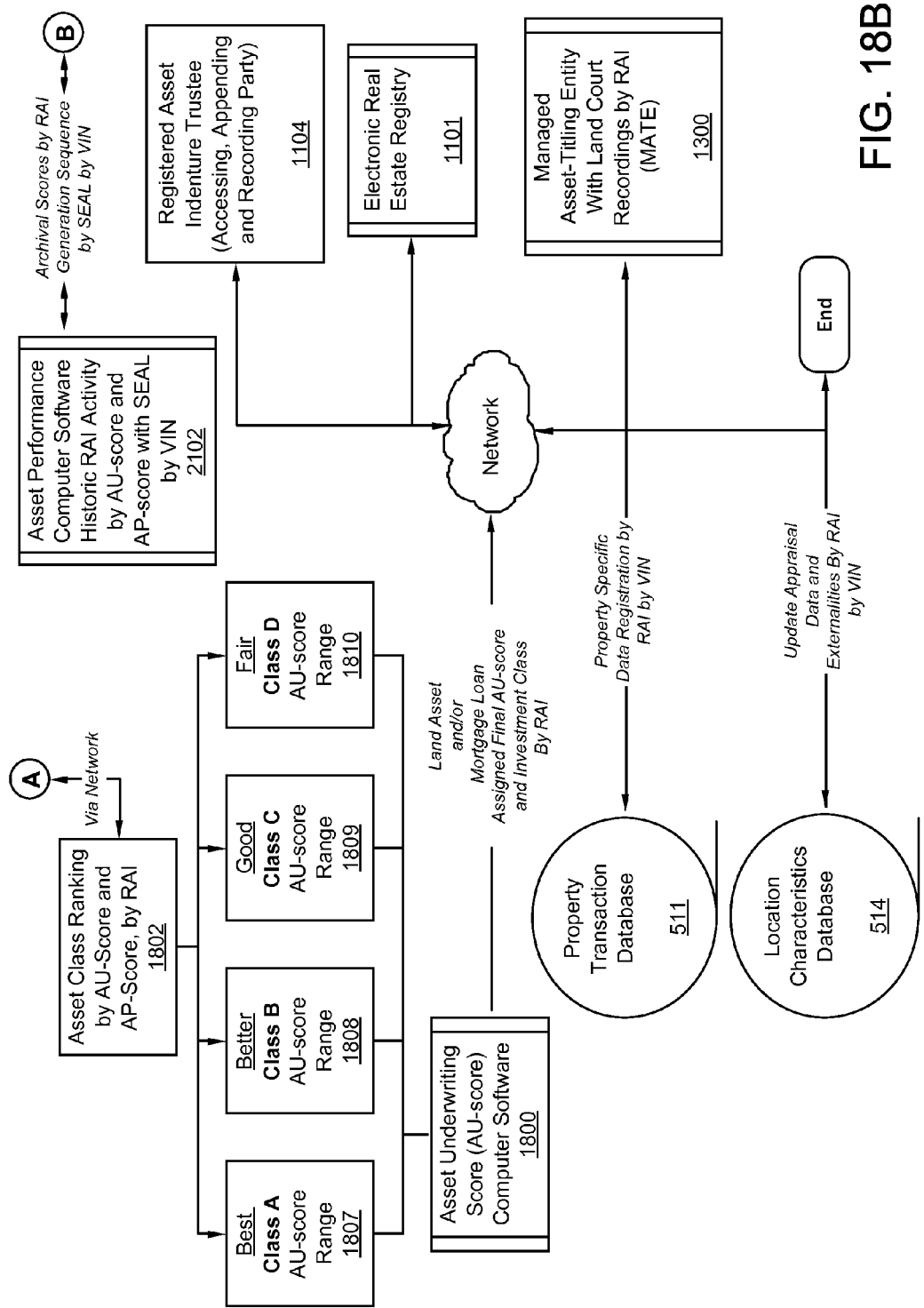

Further embodiments of the present invention, FIGS. 18A and 18B collectively illustrate a computer program product (1800) for use on a processor for determining quality and usefulness of information associated with real property assets includes a computer usable medium having computer readable program code thereon. The computer readable program code includes program code available via a computer network that captures information related to each real property asset by type at the time of its origination through the use of electronic forms that retrieve data consistently from one origination to the next (1803) by real asset originators, wherein the software product processes the captured information by tagging and encrypting the data records for transmission over a network such as the Internet where it is stored to a property transaction database (511) in association with the RAI (1400) assigned by the real asset originator (1700) to the origination documentation, which will be recorded upon origination with a generation sequencing number in association with the land title deed at the local land court with jurisdiction over the property conveyance (1701). The software product qualifies captured information to determine if data is material to investors seeking to measure or mitigate different investment risks by way of a common set of systems and methods that present invention follows to capture, process, store, retrieve, transmit and report underwriting information by registered asset type. A computer software process the captured data in association with the RAI to provide the computer software multiple data retrieval criteria, for example, four could be: the RAI and sequence number, which can include a Universal Transverse Mercator (the "UTM") grid code other similar/equivalent geospatial coordinate or reference that represents a given point in time in association with a fixed location on earth, the registered asset type being underwritten, the date of registered asset origination, and archival AU-scores and AP-scores by RAI with generation sequencing numbers (2103). These four data points enable the software to search associated databases, for example as illustrated in FIG. 4 and in FIGS. 18A-18B, databases that store property specific data (511) and a location characteristic databases (514) linked to public database resources accessible over the Internet containing site specific factors (519), community factors (518), county SMA (Statistical Metropolitan Area) factors (517), state factors (616), and regional, national and international factors (515), and collect and store relevant, timely and reliable data in association the RAI for the specified registered asset type. Data related to the RAI sequence, time of origination, all archival scoring, and the registered asset type are temporarily stored to the property specific database in association with the RAI until the improvements value appraisal (1805) and the land value appraisal (503) data are submitted by the real asset originator or the licensed real estate appraiser in association with the assigned RAI captured, processed and transmitted through the use of electronic forms and software that ensure the quality of captured information is consistent from one appraisal to the next (1804) by tagging and encrypting the data records for transitions over a network such as the Internet where the retrieved data is stored to a property transaction database in association with the assigned RAI. Asset Underwriting Score Software (1800) retrieves the stored information for further processing, at such time archival information associated with the RAI sequence number, which is appended in increments of one each time the land title deed registered in association with the unique RAI originates anew, is introduced and used to create a new AU-score. The registered asset underwriting software assigns the resulting AU-score an Asset Class Ranking (1802), which is an AU-score range ranked in any manner or number of categories that can change from time to time, for example from "best" (1807) to "fair" (1810), with each category representing a hierarchical ranking that delineates for a user of the classification system the ability to determine likelihood of the identified fixed-income land assets or mortgage debt obligations, held individually or underlying securities, will be able to meet the contractual obligations with respect to the underlying asset in the context of the underwriting process quality, the usefulness of the valuation process and the history of the registered asset given its geographic influences and prior performance over recorded activity by sequential RAI, by SEAL, by VIN (2102).

Further embodiments of the present invention will detail the applicability of the AU-score and classification systems and methods through illustrations that describe and depict computer software (1800) systems and methods that capture relevant and reliable registered asset underwriting data (1803) and real property appraisal data (1804) and comparable registered asset performance data (2102) by RAI and corresponding sequence number to process and store (511) the resulting data computation in association with an registered asset type in further association with the RAI assigned to a registered asset by the real asset originators or assignees (1700) as a mechanism to establish the corresponding sequence number and registered asset class by type (1802) and investment risk class (1807, 1808, 1809, 1810) by AU-score. The resulting real property information, upon an actual conveyance and financial settlement of the identified transaction, is processed and registered to the electronic real estate registry (1101), which initiates the creation and identification of a MATE in association with the assigned RAI further assigned an appropriate sequence number, wherefore the documentation created as a result of the origination and financial settlement information gets stored for future retrieval, transmittal and reporting to the general public (1108), mortgage creditors (1100), banking, securities, and governing regulators, capital market sponsors (1102), capital market co-sponsors (1111) and capital market and real estate market investors (1110) and others wanting to perform informed investment analysis and/or need rapid access to useful and timely information to execute and register computerized public assignment(s), exchange(s), swap(s), or trade(s) of real property investment interests in association with identified registered assets held or owned by the MATE.

An embodiment of the current invention provides systems and methods for a computer program product for use on a processor for calculating an AU-score (1800) to analyze the underwriting of a land asset or a mortgage loan with criteria (1803) that can change from time to time and differ by registered asset type. The manner by which a real asset originator (1700) processes a loan application, processes borrower information, processes and employs appraisal information, writes the terms of the note, the term of the mortgage contract, and constructs the language of disclosures and the clarity of associated disclosure documentation, to name a few, all influence loan outcomes and consequently the AU-score. Since the mid-1990s, automated underwriting systems have been available in the United States. Automated underwriting systems strive to limit underwriter judgments which can vary from one underwriter to another. While mortgage underwriting system can speed up the loan generation, most lack the benefit of statistical analysis that can inform the underwriter of the potential consequences of underwriting choices and the underlying history of the property offered as mortgage collateral, which can be an indicator of future loan performance.

Asset underwriting scores serve to promote a liquid primary and secondary mortgage market for investors (1900), creditors and the general welfare of the mortgage financing public. An AU-score is a direct result of data collection based in part on measuring credit risk taken by the real asset originator for each mortgage loan and based on a mix of such factors as: loan-to-value ratios; credit enhancement and/or over collateralization; owner occupied vs. non-owner occupied; debt-to-income and income quality; borrower(s) credit score; degree of loan documentation and completeness; and, among other factor, the degree to which real asset originators collect data in a form that can be parsed for completeness and quality. The higher an AU-score the more marketable the corresponding registered asset becomes, therefore it behooves the real asset originator to transmit useful information for analysis and scoring.

For single family mortgage loans for example, the AU-scoring system typically gathers the mortgage data on the date of origination (the final origination data) and the data collected is selected to limit the collection of borrower identity information. Certain regulations limit the collection of borrower information, for example, debt to income ratios while required information to be collected as an indicator of borrower suitability, rounding off the ratio helps to protect the privacy of the borrower. However, taking into account the information that is already available on the Internet or in other ways, a balance between high transparency standards for investors must be put in balance with the privacy of consumers. Lender identity, however, is very important to investors and for the methods used to determine AP-scores. For example, if a series of loans or land asset originations registered in association with a corresponding RAI are made by a particular lender each evidenced by a matching SEAL and VIN and registered to the electronic real estate registry show a relatively high frequency of poor outcomes, such information is material to investors and to regulators.

Determining the purpose for a mortgage loan or the issuance of a land asset is vital in determining if the financing is useful for the intended purpose. A determination whether the loan is a purchase money mortgage loan or a refinance, for example, offers potential insight about the property derived from AU-scores in association with an RAI that can have a rather high corresponding sequence number, which might indicate a borrower is revolving debt to stay current with other obligations or is simply being a smart borrower seeking the lowest possible borrowing cost. Refinance loans are parsed for data to segregate suspicious activity form prudent borrower behavior.

The AU-score strives to determine if borrower information is reliable and complete and that the refinancing was done with borrower suitability as a priority. Borrower suitability begins by capturing income data such as: the date on which the refinanced loan originated; the identity of the creditor on the refinanced loan and the unpaid principal balance of the refinanced loan that was repaid by the new loan; the credit score or scores that the creditor used, and the entity that supplied each; the debt-to-income ratios, including the ratio of the total debt of the borrower and co-borrowers, expressed as a monthly payment amount to the total current and expected future income of the borrower and any co-borrowers, expressed as a monthly income amount and whether the borrower or any co-borrower has stated an intent to reside in the property as a principal residence. In addition, the ratio of the first scheduled payment on the loan, expressed as a monthly payment amount to the total current and expected future income of the borrower and any co-borrowers, expressed as a monthly income amount; and the total value of borrower assets not including the value of the collateral or the down payment needed to pay settlement costs and deposit helps to measure the reliability and solvency of the borrower.

The principal amount of the loan is compared to the appraisal report value and the characteristics of the interest rate on the loan are captured, for example, if the interest rate adjusts at any time over the loan term and if so what is the index and margin and if that data is made known to the borrower. The type of mortgage insurance relating to the loan, including who pays it, and the amount and scheduled payment dates of any premiums and whether flood insurance is required in connection with the loan, and if so, the amount and timing of premiums. Whether the loan has an escrow account and if so, the amount of the initial deposit into the escrow account and the amount of the monthly payments scheduled to be deposited into the escrow account the amount of points, fees, and settlement charges paid to originate the loan, including the amount of any compensation paid to a mortgage broker, and who paid it; whether the borrower or borrowers have any payment assistance at origination, such as government or private subsidies or buy downs, and if so, the amounts, terms, and timing of such assistance; and the address of the real property securing the mortgage loan. Also, the terms and limits of any permissible adjustment, including, if applicable, when the rate can adjust, and any caps or floors on any such adjustment, whether or not the principal can increase under the loan terms at origination, the terms and limits of any permissible increase, including when the increase or increases can occur, how the amount and timing of any increase is determined, and if there are any caps on any such increases. If the payment amount can adjust, independently of a rate adjustment or of an increase in the principal amount, the terms and limits of any permissible adjustment, including when the adjustment can occur, how the amount and timing of any adjustment is determined, and any caps or floors on any such adjustments. Other loan terms are captured if applicable, such as if the borrower is required to pay any prepayment penalty, and if so, the potential amount and timing of any such penalty. Capturing the loan origination date, the loan maturity date and if there are any permissible grace periods determining late fee amounts under the loan terms are calculated. Also, whether the loan is assumable under the loan terms at origination and if so, the conditions on which any assumption can be denied.

For multifamily mortgage loans, mortgage data includes the number of dwelling units in each property securing each loan; the rent on each dwelling unit; the occupancy status of each dwelling unit; whether the rent is subsidized by any government agency and, if so, in what amounts, under what terms and conditions, whether or not the property is professionally managed, meaning that a real estate management is under contract to attend to the physical property and the financial affairs to include tenant management and for what period of time; whether the rent on the units is current, and if not, how many days or months the rent for each unit is delinquent; and all of the information prescribed for single family loans.

As described in yet another embodiment of the present invention, FIG. 12 discussed above, illustrates in context how server applications employ systems and methods to extend data processing and Internet services used by Asset Performance software (2102) to capture servicing data generated for land assets and for all mortgage loans, store and processes the data in association with an RAI in the real estate registration system where it can be retrieved over a computer network for analysis, display and reporting. Beginning the day after the date of origination of the land asset or mortgage loan, and reported not less frequently than monthly thereafter until the land asset or mortgage loan ceases to exist, the amount and date of rent payments or mortgage payments received each month, including; whether each payment is received by the due date or within a grace period, and if a payment is received after the scheduled due date, how many days past due; the amount of any payment deposited into an escrow account; amounts paid for other loan charges, with an identification of the amount and type of such other charge; and the amount of any prepayments; for land assets or mortgage loans on which any payment or partial payment is overdue, the number of days since the land rent or mortgage loan payment was current; whether property taxes, hazard insurance, liability insurance (naming the MATE as additional insured) premiums, and any flood insurance premiums required in connection with the land asset or mortgage loan are paid by the borrower or borrowers as required, and if any such item is not paid as required the number of days since the payment was required, and the amount of the missed payment; whether the servicer or other party on behalf of the servicer paid property taxes on the property, and in what amount; and whether the servicer or other party on behalf of the servicer force-placed hazard or flood insurance, and if so, the amount of the premium and the identity of the insurer; the amount of any interest paid to the borrower on any escrow; the type and date of any actions taken by or on behalf of the servicer due to default, including nonpayment default, and the amount charged to the borrower or borrowers as a result of the action or actions; and if the mortgage lender, the servicer, or the MATE agent or trustee is aware of any damage to the property securing the loan, the type and extent of the damage and of any repairs, the amount of insurance proceeds paid, the amount of such proceeds disbursed or paid to the borrower, and the amount held by the servicer, and the date and results of any inspection done by or on behalf of the servicer.

FIGS. 18A-18B how the Asset Performance computer software integrates performance data with separately captured registered asset underwriting data and then, in conjunction with a registered asset classification process, the AU-score software arrives at an Asset Class Ranking (1802) for each registered asset type under origination. Delineated by overall score, each registered asset type under origination is assigned a class ranking, which are for illustration purposes are: Best (1807), Better (1808), Good (1809) and Fair (1810). The Asset Class Ranking is then assigned to the RAI with a generation sequence number in association with the AU-score and the VIN, which identifies the real asset originator or assignee responsible for the origination. The corresponding AP-score and the associated performance history is continuously updated based on current servicing information and remains permanently linked to the RAI which never changes, unlike AU-scores that change each time the land title deed identified by a particular RAI is newly underwritten at which time the RAI's generational sequence number increases by one.

Origination of MATE Assets in Pools for Market Delivery

FIG. 7 illustrates what person(s) or entity qualifies as an "Investor" and FIG. 8 illustrates what person(s) or entity qualifies as a "Sponsor", with both investors and sponsors described throughout U.S. Pat. No. 7,693,765, which is incorporated by reference herein. Embodiments of the present invention employ the electronic real estate registry system (1100) in association with a property transaction database (511) to store information transmitted over a computer network in between an agent or trustee (1104), a registered asset sponsor (1102), private capital or capital market investors (1900), and/or real asset originators or assignees (1700) each engaged independently or collaboratively in the business of originating, marketing or investing in real estate assets. Real asset originators generate, in the normal course of business activities, a variety of real property investment products, some of which will be held in portfolio and others organized by registered asset type (1302), (1303) and subsequently ranked by AU-score, from high to low, into investment risk classes (1807), (1808), (1809), (1810) and made available over a computer network such as the Internet for assignment, exchange, trade, or other form of conveyance to sponsors and private capital investors or capital market investors.

Real asset originators vary widely in terms of capital capacity and can from time to time package and sell real property investment products such as for example, land assets (1404), improvement mortgage title deeds and notes (1405), or as real property mortgage title deeds and notes (1600) to sponsors who aggregate real property investment products as collateral for bond securities and subsequently sold to private capital investors and/or capital market investors, or alternatively, real asset originators can choose to sell the accumulated portfolio of real property investment products directly to private capital investors and/or capital market investors.

As detailed in prior embodiments of the present invention, a real property conveyance occurs and immediately following the financial settlement a transfer agent records documentation memorializing the conveyance to a jurisdictional local land court in association with an RAI. Real asset originators record to the jurisdictional land court all requisite documentation for each real property conveyance to preserve and protect the interest of all parties, together with an RAI in association with each deed (1701), and each real property conveyance can name the agent or trustee (1104) as the real property title nominee and as the appointed fiduciary engaged to manage the MATE (1300) that is legally established at the time of origination to hold or own the real property assets, following the approval of a regulating party, for example, the electronic land title trustee, (1106) authorizing a subsequent registration to the electronic real estate registry system (1101), which is in communication over a computer network that extends communication to a location characteristics database (515) and a property transactions database (511) to which the MATE is registered and registered by the identical RAI that as was recorded to the local land court with jurisdiction over the real property conveyance.

FIG. 19 illustrates how a real asset originator or their assignees (1700) can originate and afterward hold for profit certain beneficial interests in identified real property assets held or owned by a MATE, or the real asset originator or their assignees can elect to sell, assign, trade or otherwise transfer its identified beneficial interests in real property together with attendant chattel rights held or owned by a MATE via a computer network system, such as the Internet that is in communication with the electronic real estate registration system in further association with data storage devices, thereby assigning rights to identified real property asset in association with an RAI with a corresponding sequence number, a SEAL, and a VIN to one or several sponsors (1102) and/or private or capital market investors (1900) as an registered asset pool comprised of one or several registered asset classes (1901) or individual registered assets by type.

Managing "Private Label" Asset Pools

Systems and methods of the present invention permit a real estate registry system to associate with multiple managed asset-titling entities (2000), wherein each individual MATE, among the many individual MATE's registered to the electronic real estate registry, was recorded in association with a unique RAI to the real estate registry system (1101) with a corresponding generation sequence numbers to chronicle the occurrences of past and current assignments, conveyances, trades or other transfers of the real property rights and interests held or owned by a MATE in association with an RAI. MATE beneficiaries, as FIG. 20 illustrates, are third parties who can be, for example, a real property leasehold owner or a mortgagor holding a beneficial interest in a home (1301), a creditor holding an interest in a mortgage title deed and note (1302), or an investor holding a beneficial interest in a land title deed (1303), all of whom hold beneficial interests recorded to the real estate registration system in association with a SEAL and a VIN recorded by an appending party, which can be a real asset originator (1700), a registered asset servicing agent (1105) acting in its capacity, or an agent or trustee (1104) acting at the bequest of a third-party beneficiary communicating over a computer network connected to the agent or trustee in association with the electronic real estate registry system, which is in further communication with data storage devises (511) that store material information relating one or several MATE's, one of which is linked to the RAI corresponding to the beneficial interest held by the beneficiary.

The real asset originator can pool identified beneficial interests in real property together with attendant chattel rights to suit the individual need of one or the needs of multiple sponsors and private capital or capital market investors (1900). A real asset originator, who has been granted authority to append the electronic real estate registry system by a regulating authority such as the electronic land title trustee (1106), can assign beneficial interests in identified real property assets, held in association with an RAI with a corresponding sequence number, by appending the RAI currently registered to the electronic real estate registry with a SEAL, and a VIN listing one or several sponsors (1102) and/or private or capital market investors (1900) beneficial interests in an individual registered assets of a particular type, an registered asset pool comprised of multiple registered assets of a single type or one or several registered asset classes (1901) comprised of multiple registered asset types. Any authorized user of the electronic real estate registry system holding a unique vendor identification number (VIN) granted by the regulator of the registry can append a record in association with an RAI. Also illustrated in FIG. 12, all appendages are finalized by a recording party such as the agent or trustee (1104) responsible for the MATE corresponding to the appended RAI. A sponsor can be an appending party (1102), as can a registered asset servicing agent (1105), a registered asset originator (1103), a registered asset cosponsor (1111), and certain qualified institutional holders of beneficial interests can be among those qualified with a VIN to append an RAI recorded to the electronic real estate registry. However, only recording parties such as an agent or trustee (1104) or an electronic land title trustee (1106) can permanently record or amend information associated with an RAI stored to property transaction database in association with the electronic real estate registry.

All recording parties, appending parties, and accessing parties, which can be a current beneficiary with access privileges, can communicate with the electronic real estate registry via a computer network system, such as the Internet or other network in communication with the electronic real estate registration system and in link with data storage systems holding data archives associated with a MATE identified by the RAI that has been recorded to the jurisdictional land court (701) with the property title deeds that are held or owned by the MATE (1300).

Sponsor can hold for profit beneficial interests in identified real property assets held or owned by a Mate, or aggregate a pool of beneficial interests by various registered asset types and classes, which are suitable for collateral to back securities sold, often in collaboration with cosponsors, to private capital or capital market investors for profit. For example, a debt-free pool of land assets would be free of credit risk since no land asset is collateral for mortgage debt. Pools of mortgages are susceptible to wider range credit risks, interest rate risks, and collateral depletion, meaning the improvements deteriorate unlike land, which does not depreciate. Since a pool of mortgage loans offer investors a fairly wide range of loan-loss risks, this justifies a higher return on capital invested.

Currently, a sponsor will accumulate multiple mortgage title deeds into a pool and diversify risk into tranches based using a somewhat arbitrary credit-quality criteria and sell bonds to investors backed by the pool of mortgages, which provides bond holders income and bond collateral but little insight into the underlying registered assets. Generally, sponsors assemble common types of real estate assets into pools as the principal mechanism to dilute potential risks.

The present invention provides a sponsor a mechanism to accumulate a mix of registered asset products by type, each having distinctly different risk profiles, for example a land asset is a capital asset (land title deed) with a fixed land rent backed by a lender, where a leasehold mortgage is a smaller loan backed by an improvements mortgage title deed and a land lease, while real property mortgage title deeds and notes (1600) are generally larger, are backed by mortgage deed on both land and buildings, and typically have a higher loss severity than leasehold mortgages.

Varying registered assets by type, which are then sorted by risk class with each class providing verifiable risk based on a transparent measure of certainty in balance with investment return and, through the use of AU-scores combined with historical AP-scores and each registered asset having an RAI to provide geography relevance, the present invention provides investors greater investment clarity through easily retrieved, detail underwriting information of sufficient quality to analyze each registered asset product individually or by class. Furthermore, securities collateralized by pooled registered assets backed by the real property interests held or owned by a MATE, access to the documentation needed to validate ownership of a registered asset in the event of foreclosure is guaranteed, unlike millions of lost mortgage documents currently paralyzing the housing industry.

Visualizing Real Estate Registry Data

Figure 21A:
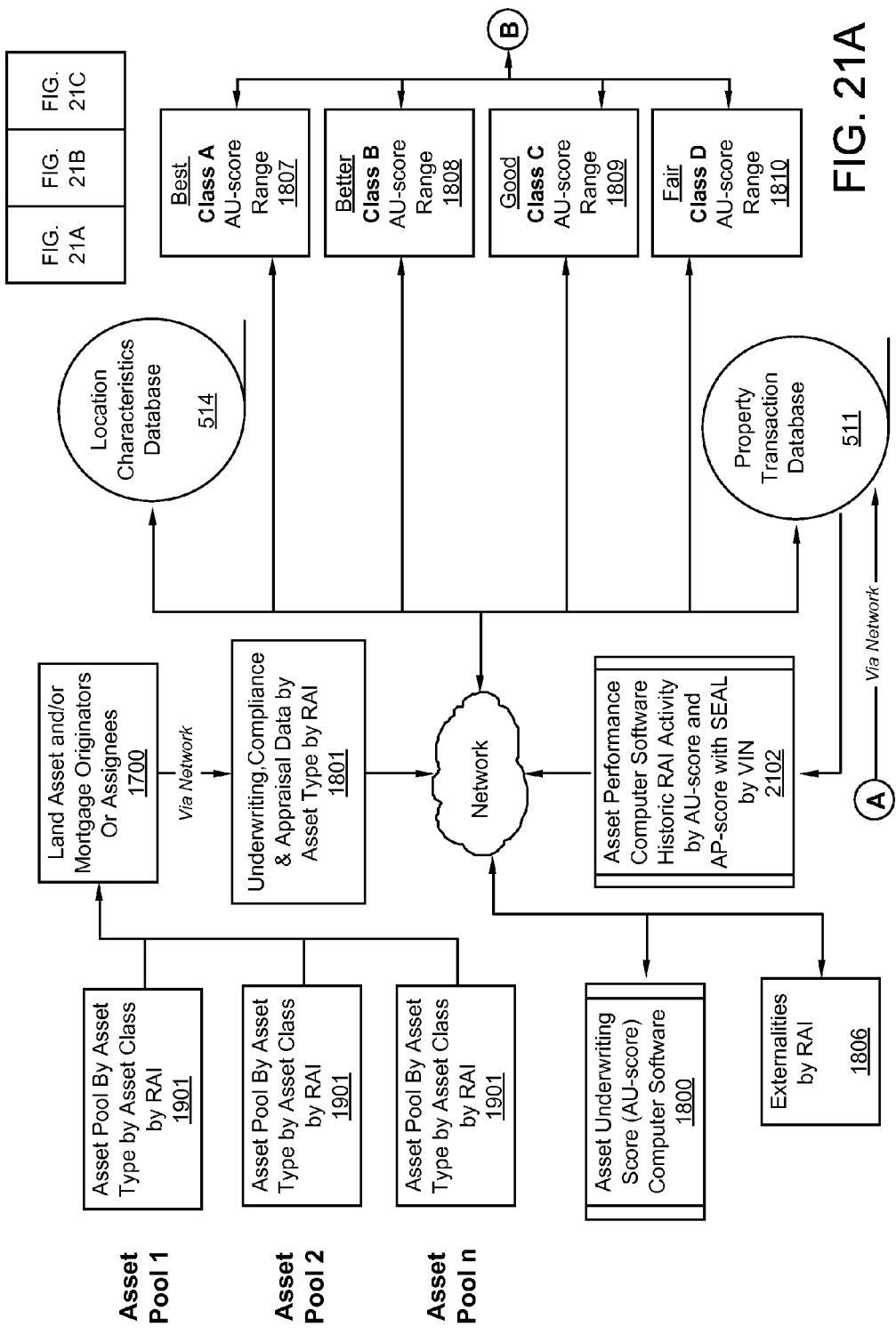
FIGS. 21A-21C are collectively a block diagram illustrating the relationship of multiple registered asset types that originate, settle and over time are sold, only to re-originate creating a series of historic events captured by RAI sequenced by origination and recorded to a database by registered asset performance software that generates an Asset Underwriting Score (AU score), and an Asset Performance Score (AP-score) calculated by computer software code also able to aggregate AU-scores with AP-scores into an Asset Class Ranking, a score-based ranking system that is registered to the real estate registry system database resources linked to a plurality of real property assets, each with an AU-score and an AP-score in association with an RAI, to produce registered asset underwriting-to-performance analysis based on repeat registered asset sale cycles over a user-specified timeframe and geographic range and compiled into visually accessible investment informational displayed by way of a graphical user interface on the computer accessible to capital market and real estate market participants and governmental regulators connected to a computer network in communication with the real estate registry system in association with database resources.
Figure 21B:
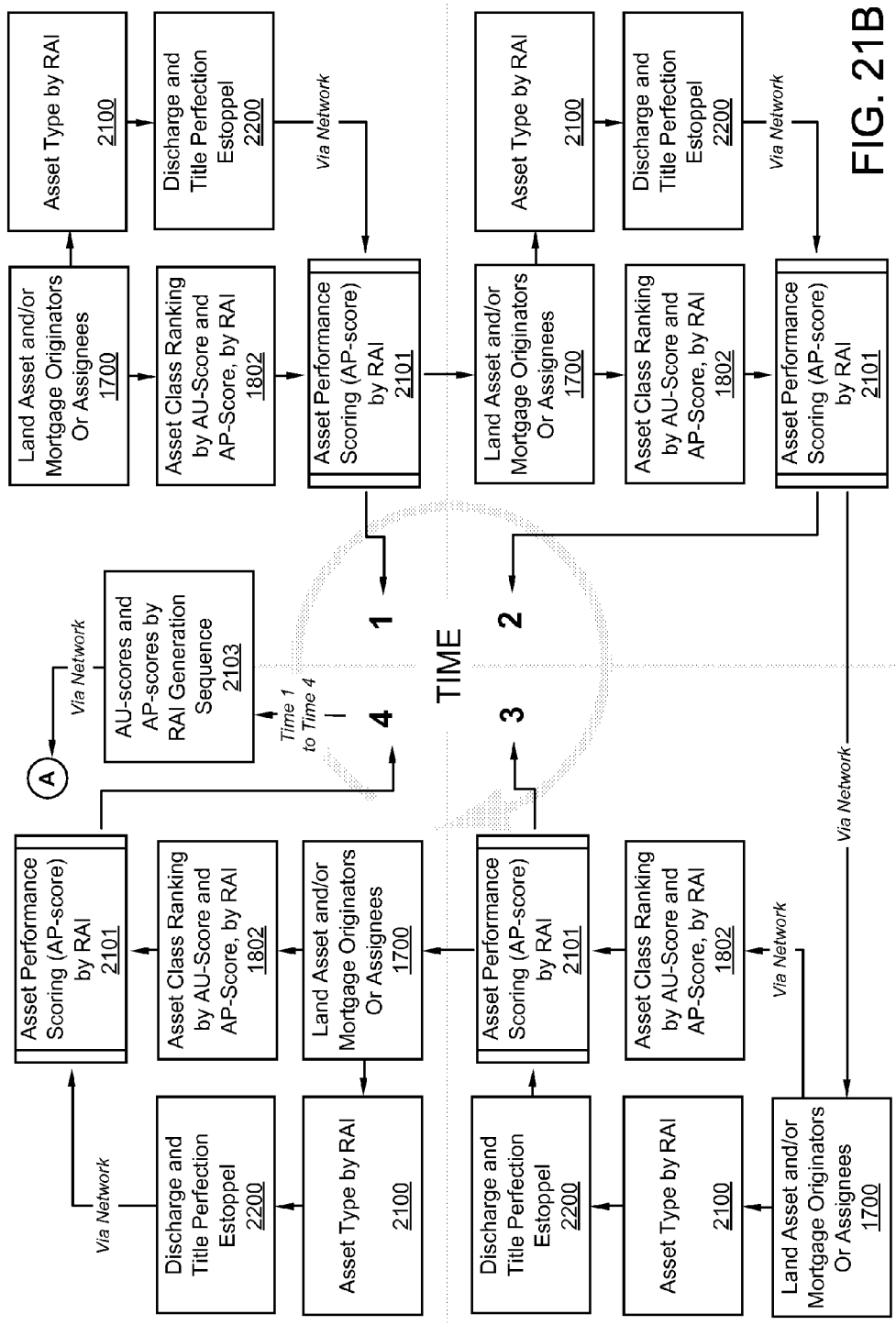
Figure 21C:
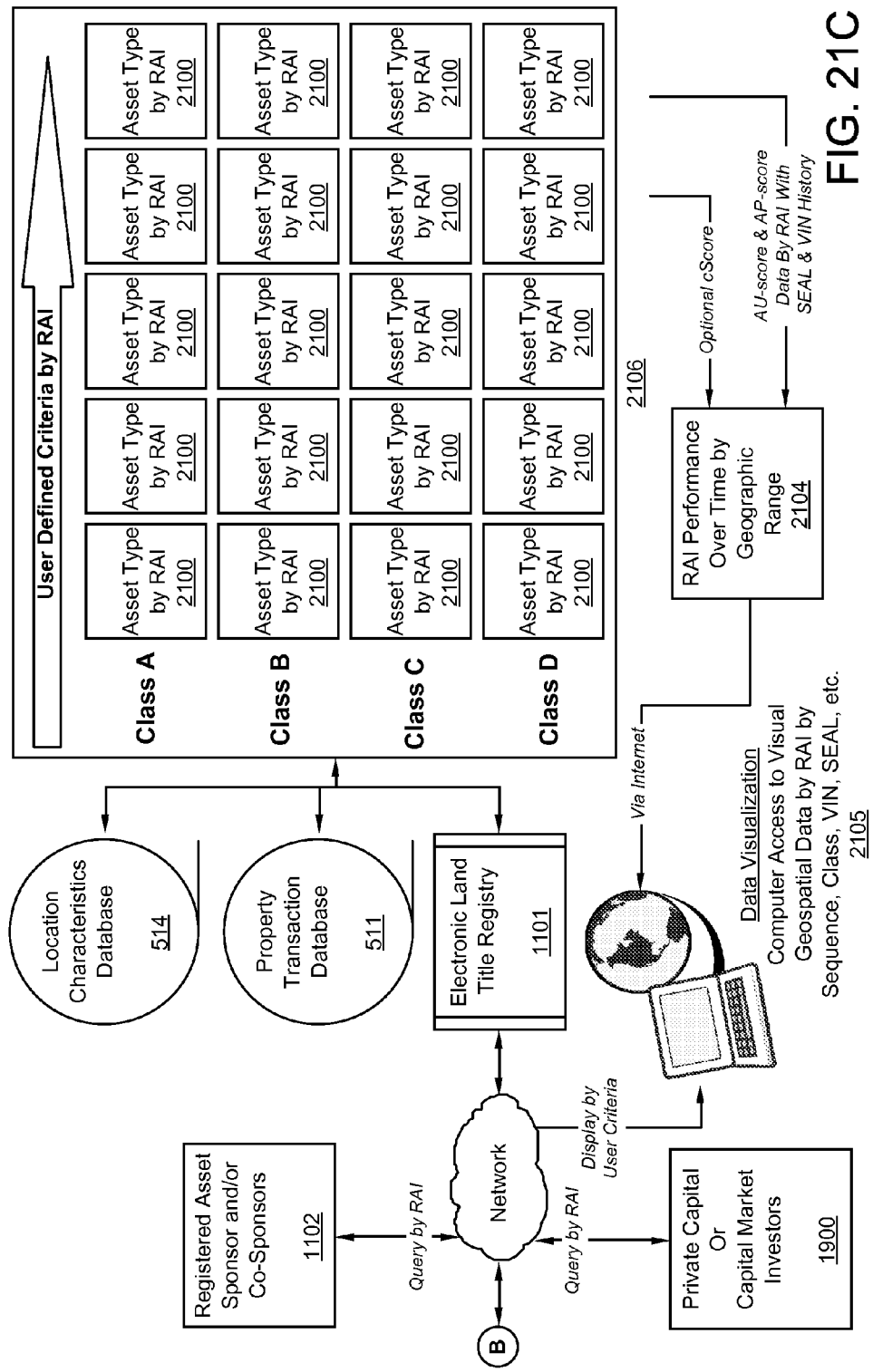

In accordance with another embodiment of the present invention and as illustrated in FIGS. 21A-21C, computer systems and methods generate a relationship among multiple registered asset types that originate, settle and over time are sold, only to re-originate at some future time enabling machine operated computer code to capture and process this series of historic events linked to each registered asset by a corresponding RAI that is numerically sequenced by origination and recorded to a database by registered asset performance software (2102) that generates an Asset Underwriting Score (AU score) and an Asset Performance Score (AP-score) calculated by computer software code that is also able to aggregate AU-scores with AP-scores into an Asset Class Ranking (1802), a score-based ranking system able to produce a variety of registered asset classes (1807), (1808), (1809), (1810) that are assigned to each registered asset with an AU-score and/or an AP-score in association with an RAI (1400) and I recorded to the real estate registry (1101) and this system's Location Characteristics Database (514) and Property Transaction Database (511), thereby linking each registered asset to a plurality of real property assets, available to produce registered asset underwriting-to-performance analysis based on repeat registered asset sale cycles over a user-specified timeframe and geographic range that can be compiled into visually accessible investment information displayed by way of a graphical user interface, such as an Internet browser on a computer and accessible to capital market and real estate market participants and governmental regulators that are connected to a computer network in communication with the real estate registry system in association with database resources.

The life cycle of a real property asset type begins with a real estate owner that sells to a property buyer. The new buyer is now an owner who will hold title to the real property asset and eventually sells the real property to a second property buyer, who will in turn, eventually sell the property, which will perpetuate the cycle. The present invention captures specified information each time the registered asset type conveys from an owner/seller to a buyer/owner employing the services of real asset originators or assignees (1700). The initial origination transaction that employs the present invention causes the originator to memorialize the land with a unique RAI (1400), which is, upon completion of the financial settlement, recorded to the local land court incorporated into the description of the land title deed (1701) and subsequently to the electronic real estate registry system, wherein the RAI is permanently linked to all registered asset types deriving an interest in the land title deed and documentation relating thereto, which the MATE may, at the discretion of counterparties the real property conveyance, hold or own. As described in prior embodiments the RAI is a geospatial reference or an alphanumeric identifier that never changes. An AU-score is calculated each time a creditor employing the present invention underwrites a loan or a land asset transaction and enables underwriting compliance (1803) data and appraisal compliance (1804) data by registered asset type and RAI (1801) to be captured, and upon completion of a conveyance settlement to include the creation of a MATE, the AU-score is recorded in association with the RAI to the electronic real estate registry together with a SEAL and VIN corresponding to the appending party (the creditor) registering the transaction.

Historic information detailing financial events is captured each time a conveyance of a beneficial interest requires a discharge and title perfection (2200) from an agent or trustee responsible for such actions, whereby forensic accounting of factual past events are captured and processed by registered asset performance software (2102) to measure and score the economic and legal performance between counterparties relating to a specified beneficial interest in association with an RAI, which is appended in increments of one for each land title deed registration generation in association with the unique RAI. Collectively, AU-scores in combination with the AP-scores (2103), if an AP-score from a prior discharge exists, contribute to the present generation of registered asset class ranking (1802). Archival scores by RAI with appended generation sequence numbers, each with an appending party SEAL and VIN and a recording party SEAL and VIN are transmitted via a computer network to the property transaction database (511) in association with the electronic real estate registry, whereupon the registered asset underwriting score computer software (1800) processes data generated by the registered asset performance software (2102) to generate the current registered asset class ranking (1802) weighted by the historic AU-scores and AP-scores related to RAI generation sequence numbers. In addition, other identified historic data, such as externalities (1806) that were previously identified in prior generation AU-scores that still impact real property values, are factored into the current generation AU-score and thus impacts the current registered asset class ranking.

Previous embodiments of the present invention described and FIG. 19 illustrates the creation of registered asset pools by registered asset type (1901) in association with an RAI that real asset originators or assignees (1700) can offer to sponsors and private capital or capital market investors (1900). A variety of registered asset types can be made available, which fall within predefined registered asset classes for example, best (1807), better (1808), good (1809), and fair (1810), based on cumulative scoring methods that measure the originating creditor's underwriting and appraisal compliance employed at the time of registered asset creation. Capturing accurate, comprehensive, and an timely data using the systems and methods described herein to create an AU-score in conjunction with the systems and methods to create an AP-score, the invention incorporates the decisions made by an "at-risk" creditor with the breadth of knowledge and judgment of a skilled appraiser responsible for reporting the present state of the underlying real asset. The overall score resulting from the information analysis process qualifies a particular registered asset type for a particular registered asset class that sponsors and private capital and capital market investors can rely upon because the underlying information used to arrive at the overall score is reproducible and accessible over a computer network through software that supplements a computer browser. The data analysis process is consistent, objective and available immediately upon a recording of a MATE or a separate real property interest to the electronic real estate registry in association with an RAI by a recording party (1104) registering the information provided by an appending party relative to the separate real property or registered assets held or owned by the MATE identified by the RAI. This is particular importance when the underlying real asset is in a heterogeneous neighborhood where data is thin, and property condition can vary greatly between real assets of a similar type.

Systems and methods of the present invention make the data necessary for spatial visualization of material information useful to real estate market participants who must make investment decisions based on the most available and timely information accessible to them. An embodiment of the present invention is computer readable program code that operates on a computer device connected to an electronic network in communication with the electronic real estate registration system (1101) in association with data storage devices (511), (514). The computer readable program code works collaboratively with other program code available via a computer network that captures real asset underwriting information (1800) related to each real property asset by type at the time of its origination caused by real asset originators or assignees (1700) and captures data generated by registered asset performance software (2102), which operates upon discharge and title perfection of an registered asset type performed by a recording party such as an agent or trustee, to measure and score the economic and legal performance issues experienced by counterparties over the duration of their business relationship relative to a specified beneficial interest in association with an RAI, which is appended in increments of one for each land title deed generation registered in association with the unique RAI.

The computer readable program code employs an Internet browser (2105), one that allows terrestrial views of the earth such as a Firefox, Safari, or Bing browser, to locate, navigate and explore geographic data on a 3D globe, for example Google Earth, or using a 2D display, for example Google Maps on a web browser thereby enabling a computer user to view specified real property data related to geospatial RAI references recorded to the electronic real estate registry system.

Such data can include related financial instruments and documentation that identify with a unique RAI in association with a real property registered to an electronic real estate registry in association with identified data stored in connected data storage devices. For Example, the integrated software supplements the Internet browser enabling the browser to display data associated with an RAI and associated data retrieved from data storage devices such as a Property Transaction Database (511) and/or a Location Characteristics Database (514) or other storage devices containing data in association with one or several RAI specified land title deeds. Such software can also display current AU-scores and AP-scores for any selected RAI or geographic range of RAI identified real properties, whereby other land title deeds and/or mortgages registered in the electronic real estate registration system by an RAI within the proximity of the users selected geographic range can be displayed with supplementary data and associated AU-scores.

FIG. 21A illustrates how a user can benefit from the software's non-transitory computer-readable program code (program instructions) by aggregating multiple RAI references and associated criteria such as AU-scores and AP-scores across a user-defined geographic range of RAI references to form a community of identified investments, which can be rendered further by registered asset class, or VIN or by SEAL type, for example. The server application systems severs software to process select data within a user-defined geographic range in association with corresponding RAI, SEAL and VIN references that can be further correlated with additional user-defined criteria, perhaps by class, by registered asset type, and by date of origination, to create a Community Score (cScore) (1010) that corresponds to the community of RAI data points selected, which can be viewed by an investor or sponsor operating a computer running a Web browser that supports a geographic information system (GIS) interface such as Google Maps or Google Earth, as examples. The cScore illustrated in FIG. 9B, incorporated by reference herein, illustrates how server applications might incorporate and process similar information metrics as illustrated above for investors and sponsors, to price land assets or measure the reliability of underwriting information or reported appraisal valuations by registered asset type. These methods and systems enable land asset investors and mortgage holders, sponsors, private capital or capital market investors, bondholders, regulators and others unparalleled geo-referenced information transparency regarding one or several land title deeds or mortgages underlying capital investments registered by RAI within the electronic real estate registration system and associated database storage devices. For example, a sponsor offering as collateral a pool of registered assets by type for investment, such as illustrated in FIG. 19, might process a cScore by employing several various scoring mechanisms, according to embodiments herein, to quantify and qualify for investors the quality and reliability of the information in support of the underlying real assets by registered asset class that comprise the pool. Justice Louis D. Brandeis once said, "Publicity is justly commended as a remedy for social and industrial diseases. Sunlight is said to be the best of disinfectants; electric light the most efficient policeman." Ready access to useful and relevant real property investment information is sunlight to investors in real property and the speed of data gathering and exchange between market participants' computer systems is the policeman offering enlightenment over opacity.

A regulator for example, can use a computer mouse or other pointing device to identify borrower abusers by selecting a geographical range on a map displayed on a computer operating a browser to retrieve a series of RAI references and to display registered asset performance criteria by SEAL and VIN, which could incorporate AU-scores and supporting documentation in support of the performance data in association with the appending real asset originators' VIN to include dates that the corresponding data was recorded to the electronic real estate registry by RAI. The present invention provides unparalleled transparency to real estate investments created in association with an RAI.

Secondary Markets Integration

Real asset originators and capital market sponsors can collaborate or independently (illustratively, through the electronic system) sell or pledge mortgage title deeds registered to the electronic real estate registry in association with an RAI, or deliver or assign electronically registered beneficial interests in real property assets held or owned by a MATE in association with an RAI to private capital or capital market investors (1900), federal or state bond issuers (2200) able to pool real property assets as collateral for municipal or state bond securities, or to the U.S. Treasury (2101), this would include government-backed agencies such as FHA, Fannie Mae, Freddie Mac and, The Federal Home Loan Bank System to name several agencies that can insure or enhance the investment quality of assigned beneficial interests in real property registered in association with electronic real estate registry (1101).

Figure 22:
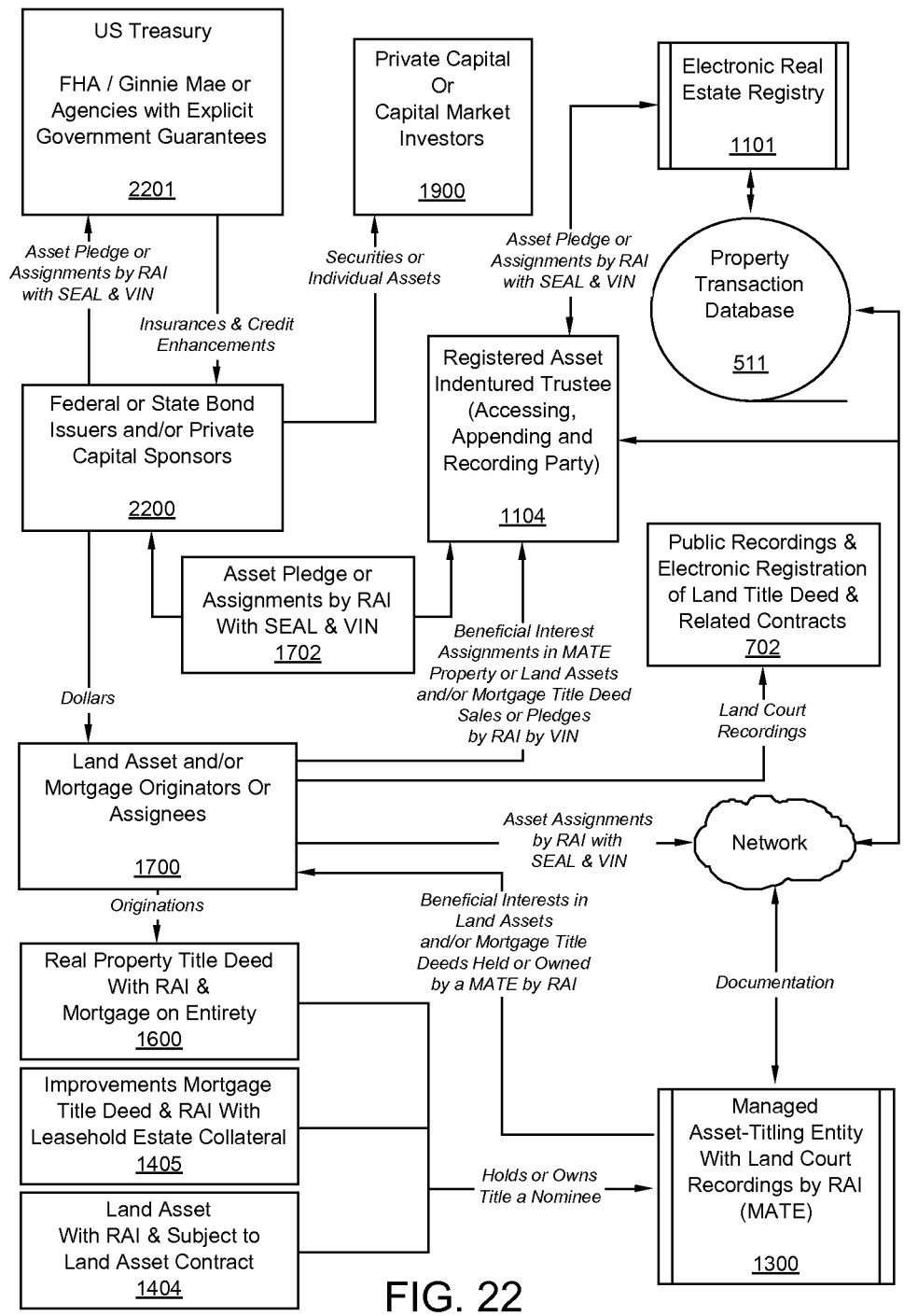
FIG. 22 is a flow chart illustrating one of several ways real asset originators and capital market sponsors might collaborate to deliver or assign registered beneficial interests in registered assets belonging to a MATE to private capital or capital market investors, federal estate bond issuers capable of bonding registered assets as collateral for securities, or the U.S. Treasury, to include government-backed agencies such as FHA, Fannie Mae, Freddie Mac and The Federal Home Loan Bank System to name several agencies that can ensure or enhance the investment quality of assigned beneficial interests.
Figure 23:
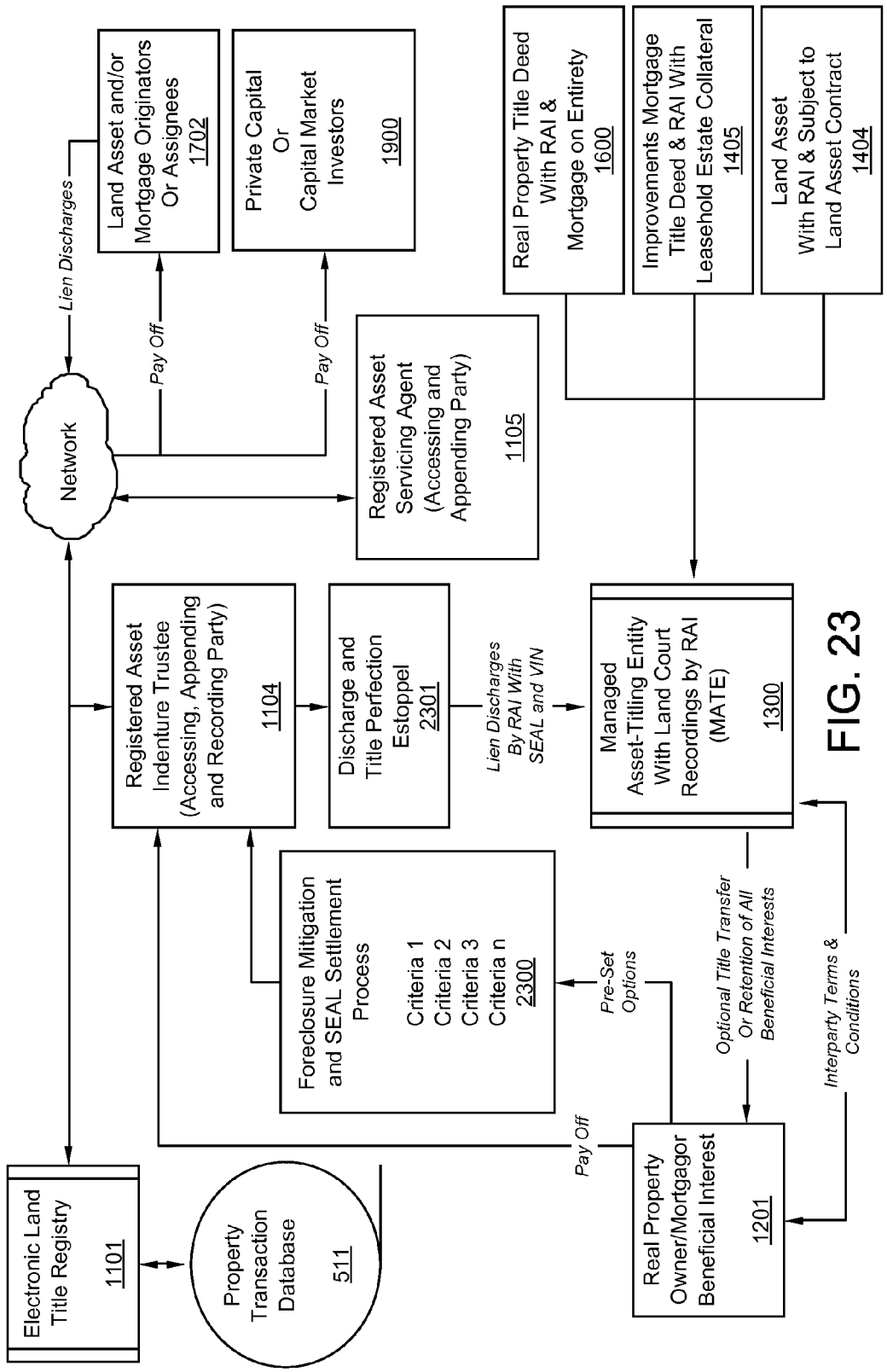
FIG. 23 is a block diagram illustrating an optional mechanism to terminate a MATE.

FIG. 22 illustrated how the systems and methods of the present invention will support the assignment of any registered asset type held or owned by a MATE and registered to the electronic real estate registry in association with an RAI, a SEAL and a VIN that can be recorded over a computer network by a recording party into a the related property transaction database (511).

Disbanding a MATE

In accordance with another illustrative embodiment and as illustrated in FIG. 23, systems and methods enable authorized recording party to discharge any outstanding SEAL registered to the electronic real estate registry in association with an RAI and VIN that claims an interest in the real property title(s), such as a real property title deed (1600), the improvements mortgage title deed (1405) or a land asset (1404), held or owned by a MATE. The SEAL discharge process (2302) conveys a clear title to identified beneficial interests owned by a real property owner or mortgagor (1201), together with any attendant chattel interests claimed by the SEAL-encumbered title as registered to the RAI linked to the SEAL, whereby the process delivers an unencumbered real property beneficial interest, which can be sold free of competing claims enabling the cleared title to qualify for property title insurance under the same conditions and limitations as when the title(s) were first conveyed to the RAI-identified MATE (1300) by the real asset originator (1702).

An agent or trustee (1104) as a recording party can issue an estoppel certificate evidencing the discharge of any or all SEAL's recorded to the electronic real estate registry in association with an identifying VIN and RAI that are linked to the MATE. The discharge and title perfection estoppel (2301) can be issued by a recording party, which can be an electronic land title trustee (1106) following a foreclosure mitigation and SEAL settlement process (2300) prescribed by interparty terms and conditions (1402), to clear claims by way of a settlement-SEAL registered in chronological sequence to the electronic real estate registry system in association with the corresponding RAI assigned to the MATE. Counterparty settlements follow prescribed methods set under the governing indenture agreement or other contract agreements that provide an agent or trustee powers to manage and dispose of property held or owned by the MATE for the benefit of one or several third parties, which can be other holders of beneficial interests in real property held or owned by the MATE.

An agent or trustee, empowered by an indenture agreement or other contract agreements, has the fiduciary obligation to all registered holders of beneficial interests in MATE property to ensure claims between counterparties are resolved in a manner that is consistent with the indenture agreement or other contract agreements. For instance, a creditor can hold a beneficial interest in a mortgage title deed that is the property of the RAI-identified MATE and the counterparty borrower who owns the beneficial interests in the real property title held or owned by the RAI-identified MATE, is delinquent. The creditor appends electronic real estate registry system with a SEAL to initiate a foreclosure action, which is its lawful right under the law and under the terms of the mortgage contract between the parties. The agent or trustee must acknowledge and record the creditor's SEAL to ensure the foreclosure mitigation process prescribed within interparty agreements is properly followed. This would be true for a beneficial interest held as collateral for a bond or security, wherein the servicing agent (1105) must follow the process prescribed under its indenture or other contracts so to enable the recording party, which can be the agent or trustee, to rightfully authorize a SEAL discharge.

The MATE serves and protects the borrower (1201), real asset originators (1702), and private capital or capital market investors (1900) by standardizing documentation, data transparency, servicing practices and stakeholder relationships evidenced by interparty terms, beneficial interest conditions, representations and warranties, assignments and power of attorney granted an agent or trustee (1402) to act as a fiduciary responsible to multiple beneficiaries of real property held or owned by a MATE rent (1300). The interparty agreement sets a clear and fair contractual process to mitigate counterparty deficiencies or defaults. For example, Borrowers and creditors follow prescribed practices to proactively manage loss mitigation as a pre-condition to foreclosure. These practices include pre-defined loan modifications and workout alternatives that complement state-by-state laws. Homeowners hold interparty agreement rights to receive deficiency notification, (pre-set) monthly payment reductions, fixed-term redemption rights that include rights to reacquire title to their home, rights to negotiate deficiency costs, and third-party accounting of foreclosure sale proceeds with prompt release of any sale surplus to the Borrower. A pre-set course to remediate deficiencies and defaults limits creditor and Borrower foreclosure abuses.

It should be clear that the above-described system and method affords users and other interested parties with an efficient, transparent and highly desirable modality for engaging in real estate and other equivalent transactions and for subsequently verifying asset status, characteristics and value.

The foregoing has been a detailed description of illustrative embodiments of the invention. Various modifications and additions can be made without departing from the spirit and scope of this invention. Each of the various embodiments described above may be combined with other described embodiments in order to provide a multiplicity of embodiments, each with various feature sets. Furthermore, while the foregoing describes a number of separate embodiments of the apparatus and method of the present invention, what has been described herein is merely illustrative of the application of the principles of the present invention. For example, it is again noted that any of the client, server and/or communication functions/methods described (or contemplated herein) can be implemented using electronic hardware, software consisting of a non-transitory computer-readable medium of program instructions or a combination of hardware and software. Likewise, the client devices employed herein to conduct transactions and/or access data from servers can be a variety of active or passive (e.g. "dumb terminal") computing and/or information devices, including, but not limited to, desktop personal computers (PCs), laptop personal computers, tablet computers and/or so-called "smart" phones. Accordingly, this description is meant to be taken only by way of example, and not to otherwise limit the scope of this invention.

What is claimed is:

1. A method for administrating an electronic real estate registry configured to facilitate exchange of real property assets, the method comprising:
    the electronic real estate registry controlling, via a computer network, each of:
        i) capture, processing and storage of real property information;
        ii) retrieval, transmission and reporting of real property information;
        iii) electronic registration, trade, assignment, transfer, settlement and clearing of at least one registered real asset;
        iv) certification, preservation and perfection of registered asset titles; and
    conveying an interest in or right to the registered real asset from a grantor to a grantee via at least one registration mechanism associated with the electronic real estate registry.

2. The method according to claim 1, further comprising:
    obtaining, via the computer network, at least one of:
        i) registered identifier (RAI),
        ii) a real property origination,
        iii) a real property owner or buyer qualification,
        iv) a real property underwriting procedural adherence,
        v) a real property appraisal process, methodology and report, and
    calculating an underwriting score representing economic impact of externalities.

3. The method according to claim 2, wherein calculating the underwriting score further comprises:
    measuring the impact of the external social, economic, governmental, and environmental factors influencing property value at a time of origination, wherein the external influences comprise external economies and diseconomies.

4. The method according to claim 3, further comprising:
    relating registered asset identifier (RAI) data in association with at least one real property type registered to the electronic real estate registry by RAI and to quantify and qualify the quality and reliability of the data relating to the underlying real property rights and interests, whether singularly or within the class of registered assets comprising a pool of similar or dissimilar assets respectively as individual assets to establish the underwriting score.

5. The method of claim 1, further comprising:
    controlling, via the computer network, access to the electronic real estate registry via at least one of:
        a vendor identification number (VIN);
        a sequential equity allocation lien (SEAL);
        a registered asset identifier (RAI) in association with at least one sequence number.

6. The method of claim 1, further comprising:
    bifurcating interests and rights of real property in association with a registered asset identifier (RAI); and
    creating a land title deed separate from ownership of improvements residing upon land subject to the land title deed;
    creating an improvements title deed claiming rights and interests in the improvements residing upon the land associated with the land title deed;
        registering via the computer network, to the electronic real estate registry in association with the registered asset identifier (RAI), a sequence number, a sequential equity allocation lien (SEAL) incorporating a date, a time of registration, and a vender identification number (VIN), the land title deed.

7. The method of claim 6, further comprising registering, via the computer network, a land title deed purchase contract in association with the improvements title deed.

8. The method of claim 6, further comprising:
    generating a market value for the land title deed associated with the registered asset identifier (RAI) on the basis of information from a property transaction database and a location characteristic database;
    calculating a price for the land title deed in association with the registered asset identifier (RAI); and
    providing a real property financing mechanism for the land title deed subject to rights and interests associated with the improvements title deed.

* * * * *